US 6,588,995 B2

(12) United States Patent
Wills et al.

(10) Patent No.: US 6,588,995 B2
(45) Date of Patent: *Jul. 8, 2003

(54) METHOD AND APPARATUS FOR ALIGNING KEYS FOR CUTTING

(75) Inventors: Phillip R. Wills, Alpharetta, GA (US); Roger F. Kromann, Atlanta, GA (US); Norman N. Axelrod, New York, NY (US); Wesley A. Schroeder, Seville, OH (US); James A. Berilla, Highland Heights, OH (US); Bryce Burba, Cleveland Heights, OH (US)

(73) Assignee: The Hillman Group, Inc., Cincinnati, OH (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/855,615

(22) Filed: May 13, 1997

(65) Prior Publication Data

US 2001/0033781 A1 Oct. 25, 2001

(51) Int. Cl.⁷ .............................. B23C 3/00; B23Q 3/00
(52) U.S. Cl. .................. 409/131; 409/81; 409/225; 269/106; 269/119; 269/142; 269/155; 269/226; 269/227; 269/329
(58) Field of Search .............................. 382/100, 218; 409/80, 81, 82, 83, 131–132, 220, 225; 76/110; 296/142, 225, 226, 227, 329, 134, 140, 155; 29/560.1

(56) References Cited

U.S. PATENT DOCUMENTS

| 40,480 | A | * | 11/1863 | Hill | .............................. | 269/119 |
|---|---|---|---|---|---|---|
| 288,300 | A | * | 11/1883 | Borowsky | ................... | 269/119 |
| 1,059,545 | A | * | 4/1913 | Kunze | ........................ | 269/258 |
| 1,674,291 | A | * | 6/1928 | Malone | ....................... | 269/119 |
| 2,728,251 | A | * | 12/1955 | Turner | ......................... | 269/140 |
| 2,860,884 | A | * | 11/1958 | Sloan et al. | ................ | 269/227 |
| 3,245,149 | A | * | 4/1966 | Haggstrom | ................... | 409/81 |
| 3,602,092 | A | * | 8/1971 | Richens | ........................ | 409/83 |

(List continued on next page.)

FOREIGN PATENT DOCUMENTS

| AU | B-44911/89 | * | 5/1990 | ................... | 409/81 |
|---|---|---|---|---|---|
| DE | 2951065 | * | 12/1985 | ................... | 409/82 |
| EP | 133091 | * | 2/1985 | ................... | 409/81 |
| EP | 614717 | * | 9/1994 | ................... | 409/82 |
| FR | 2489535 | * | 3/1982 | ................... | 409/83 |
| NL | 7903-835 | * | 11/1980 | ................... | 409/82 |

OTHER PUBLICATIONS

Del Toro et al., Principles of Control Engineering, 1960, pp. 9–12.*

*Primary Examiner*—A. L. Wellington
*Assistant Examiner*—Erica E Cadugan
(74) *Attorney, Agent, or Firm*—Finnegan, Henderson, Farabow, Garrett & Dunner, LLP

(57) ABSTRACT

An apparatus and method for determining a bitting pattern of a key comprising a housing used for optically outlining at least the profile of the blade of the key so as to form an image. The image is digitized and information created therefrom, including information about the width of the blade of the key at a plurality of selected longitudinal positions along the length to include the width of the blade at the location of at least one cut of the bitting pattern. The information about the bitting pattern of the key digitized can then be used to cut the bitting patten into a key blank. Alternatively, the information can be compared to stored information and the detected width of the blade adjusted at a location of at least one cut to be one of a plurality of predetermined widths from the manufacturer, thereby creating a regenerated bitting pattern of the key.

14 Claims, 46 Drawing Sheets

U.S. PATENT DOCUMENTS

| | | | | |
|---|---|---|---|---|
| 3,675,536 A | * | 7/1972 | Hungerford, Jr. et al. | 409/83 |
| 4,426,179 A | * | 1/1984 | Jefferson | 409/82 |
| 4,479,673 A | * | 10/1984 | Inaba et al. | 269/155 |
| 4,545,569 A | * | 10/1985 | Schroder et al. | 269/43 |
| 4,647,028 A | * | 3/1987 | Yang | 269/155 |
| 4,648,585 A | * | 3/1987 | Yang | 269/104 |
| 4,767,110 A | * | 8/1988 | Yang | 269/258 |
| 4,821,393 A | * | 4/1989 | Spigarelli | 269/224 |
| 4,899,391 A | * | 2/1990 | Cimino et al. | 382/100 |
| 4,909,892 A | * | 3/1990 | Quinn et al. | 269/119 |
| 5,083,759 A | * | 1/1992 | Pollak et al. | 269/134 |
| 5,127,532 A | * | 7/1992 | Cimino et al. | 211/120 |
| 5,128,531 A | * | 7/1992 | Fadel | 409/81 |
| 5,139,246 A | * | 8/1992 | Yakou | 269/329 |
| 5,271,698 A | * | 12/1993 | Heredia et al. | 409/82 |
| 5,314,274 A | * | 5/1994 | Heredia et al. | 409/81 |
| 5,330,168 A | * | 7/1994 | Enomoto et al. | 269/329 |
| 5,351,409 A | * | 10/1994 | Heredia | 33/539 |
| 5,429,202 A | * | 7/1995 | Millard et al. | 180/79 |
| 5,443,339 A | * | 8/1995 | Heredia et al. | 409/81 |
| 5,607,267 A | * | 3/1997 | Heredia et al. | 409/81 |
| 5,617,323 A | * | 4/1997 | Stansberry et al. | 235/375 |
| RE35,605 E | * | 9/1997 | Nomaru et al. | 269/242 |
| 5,676,504 A | * | 10/1997 | Mueller et al. | 409/83 |
| 5,997,224 A | * | 12/1999 | Beauregard et al. | 409/81 |

* cited by examiner

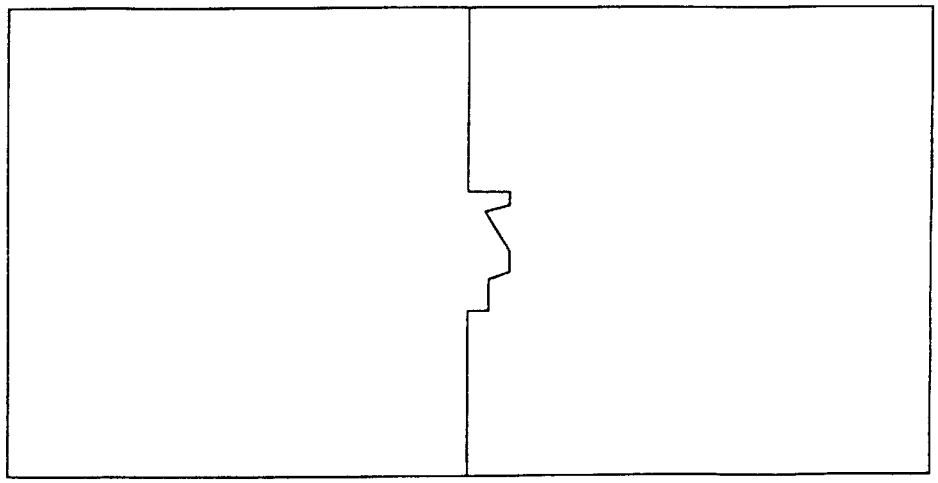
FIG. 7D
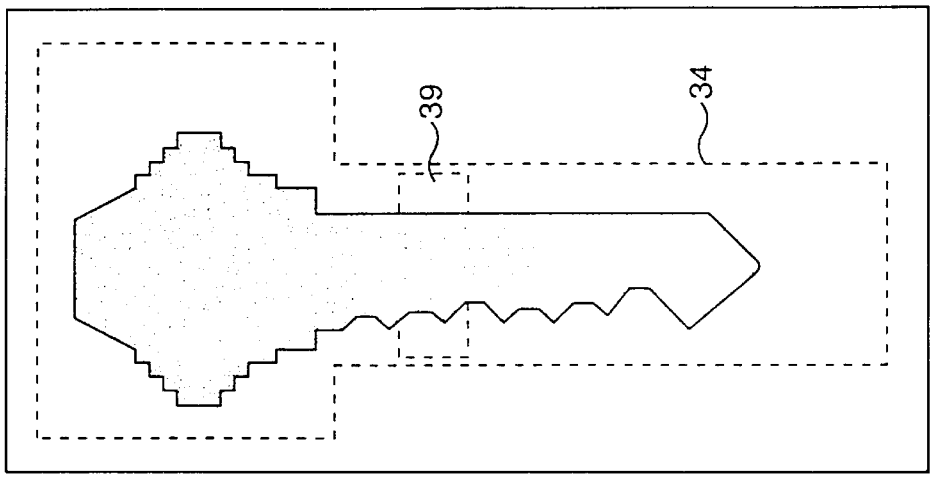
FIG. 7C
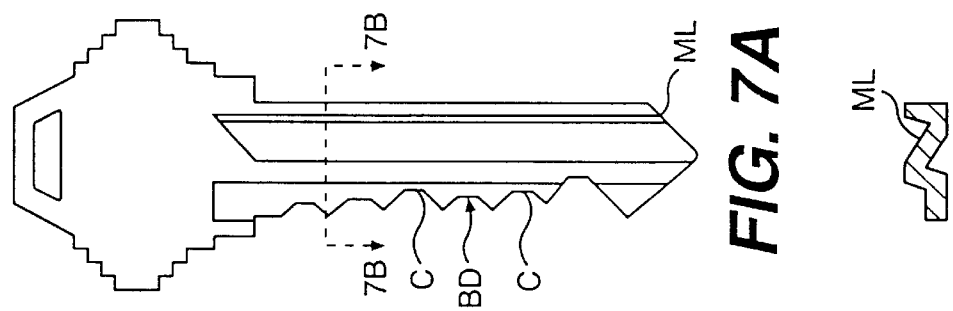
FIG. 7A
FIG. 7B

METHOD AND APPARATUS FOR ALIGNING KEYS FOR CUTTING

BACKGROUND OF THE INVENTION

1. Field of the Invention

The present invention relates to a machine to reproduce a key onto a key blank and, more particularly, to a key regenerating machine in which the master key is optically analyzed, the appropriate key blank determined, and the bitting pattern regenerated or duplicated onto the key blank.

2. Background Art

It is well known in the art to duplicate keys, referred to as master keys, onto a key blank. The process first involves the operator identifying the master key. This process can be difficult, particularly for someone with little training or experience in the art. For example, there is a choice of over three hundred key blanks to evaluate. Many of the differences between two key blanks can be very subtle, compounding the operator's difficulty. Thus, the possibility exists that even an experienced operator could chose the incorrect key blank to use for duplicating the master key.

Once the key blank is selected onto which the master key is to be reproduced, the pattern of the master key is usually traced while concurrently cutting the key blank. That is, a tracer or feeler gauge, which engages the bitting pattern of the master key, is mechanically linked to a cutting wheel, which cuts the bitting pattern into the key blank. As the tracer moves relative to the blade of the master key, the cutting wheel also moves, thereby duplicating the master key onto the key blank. The duplicate key will not be better than the master key although it could be worse. For example, if the linkage between the tracer and the cutting wheel for the key blank is off by a couple of hundredths of an inch, the duplicate could be inoperable. Also, the key could be worn from use so that the cut depths are no longer within factory specifications. These prior art key duplicating devices produce copies that are, at best, as good as the original and typically introduce duplication errors in the depths and/or spacing of the key bitting.

SUMMARY OF THE INVENTION

It is therefore an object of the present invention to provide an apparatus and method for improving the art of key reproduction. The present invention provides many improvements over the prior art to obtain this objective.

One aspect of the present invention is identifying the type of key blank onto which the master key is to be reproduced. The preferred embodiment determines the type of blank from a set of more than three hundred different types of blanks, and information about more than four hundred key silhouettes since each blank type may have multiple master key silhouettes. The preferred embodiment performs this by extracting information from digitized images of the master key and comparing the information to a database of key blanks. In the preferred embodiment, the information about the master key is obtained by backlighting the master key and digitizing the image and/or directing a substantially planar light beam, such as a laser, at a portion of the master key and digitizing the image of the intersection thereof. Algorithms compare the information of the master key to reference keys in the database and elimination those that are different, thereby leaving one correct match or a small subset of keys ranked by the likelihood of a match.

The result of the identification process is then conveyed to the operator who verifies the results of the analysis. If the operator does not agree with the determination, the present invention also presents the other likely matches, in order of likelihood of matching. Therefore, instead of trying to narrow down the type of key blank to use to duplicate a master key from over three hundred choices, the operator is presented with the most likely match. The present invention, accordingly, saves man-hours and improves accuracy.

Once the correct key blank is determined, the present invention then obtains information about the bitting pattern, which is the series of cuts in the blade of the master key. The preferred embodiment of the present invention preferably digitizes the information by backlighting the master key. The preferred embodiment also uses information in the database about each of the reference keys, such as manufacturers' information about the locations of the cuts and the depths of each cut (or the width of the key at the location of the cut).

The preferred embodiment of the present invention then uses this information to modify the measured information about the master key. That is, the depths of the cuts (or widths of the key at the location of the cuts) are modified to be the closest or most likely cut depth from the factory specifications. This adjusted information is communicated to the cutting algorithm that is used to cut the pattern of the bitting pattern into the key blank. Therefore, the master key is "regenerated" because the bitting pattern is cut into the key blank at the locations and depths that the key manufacturer establishes. Alternatively, if information is not in the database for the master key, then the cutting algorithms use the image of the master key to "duplicate" the pattern onto the key blank so that the bitting pattern is the same as that in the master key.

Other aspects of the present invention include using aligning jaws to place the key blank at a known position for cutting. Unlike devices in the prior art, the alignment jaws of the present invention can be moved independent of each other and be located at a predetermined position without continuous positional feedback.

Still another aspect of the present invention is using a gripper to hold the key at a predetermined position during cutting. The gripper holds most keys so that there is no lateral deflection during cutting, even when cutting the portion of the key blank farthest from the gripper. In the preferred embodiment, the gripper is biased to the closed position to hold the key, as opposed to a device using an actuator to force the portions of a gripping device together.

Other aspects and advantages of the present invention are explained in the Detailed Description of the Invention below, which references the Figures of the Drawings.

BRIEF DESCRIPTION OF THE FIGURES OF THE DRAWINGS

FIG. 7A is a top plan view of a master key to be identified by the present invention.

FIG. 7B is a cross-sectional view of FIG. 7A taken along line 7B—1B.

FIG. 7C is top plan view of the master key of FIG. 7A, in which the key is being backlighted.

FIG. 7D is a top plan view of a light beam, such as a laser, interfacing with the master key of FIG. 7A.

DETAILED DESCRIPTION OF THE INVENTION

The present invention is more particularly described in the following examples that are intended as illustrative only since numerous modifications and variations therein will be apparent to those skilled in the art. As used in the specification and in the claims, "a" can mean one or more, depending upon the context in which it is used. The preferred embodiment is now described with reference to the figures, in which like numbers indicate like parts throughout the figures.

OVERVIEW

The present invention, which is shown generally in FIGS. 2–22, encompasses a machine 10 to duplicate or regenerate a key blank from a master key. The term "master key" is used throughout to refer to a key that is to be reproduced using the present invention, as opposed to only a key that can be used to open multiple locks that normally require different keys. In most instances, the master key will be an unknown key that an operator of the machine 10 is to duplicate. For example, a customer would present a master key to the operator in a retail store and request a duplicate key.

The machine 10 determines the type of key from a set of more than three hundred different reference keys, the operator then verifies that the key blank is the same type of key as the master key, and then the machine 10 cuts the bitting pattern BP of the master key into the blade B of the key blank. In the preferred embodiment, the machine 10 will modify the depth of each cut C in the bitting pattern BP to the manufacturer's specifications when cutting the key blank. Thus, the customer's key is regenerated, as opposed to being duplicated, so that the customer has a key as good as or better than the master key. If manufacturer's specifications are not available for the particular master key, then the key blank will be duplicated to match the bitting pattern BP of the master key.

Figure 1A:
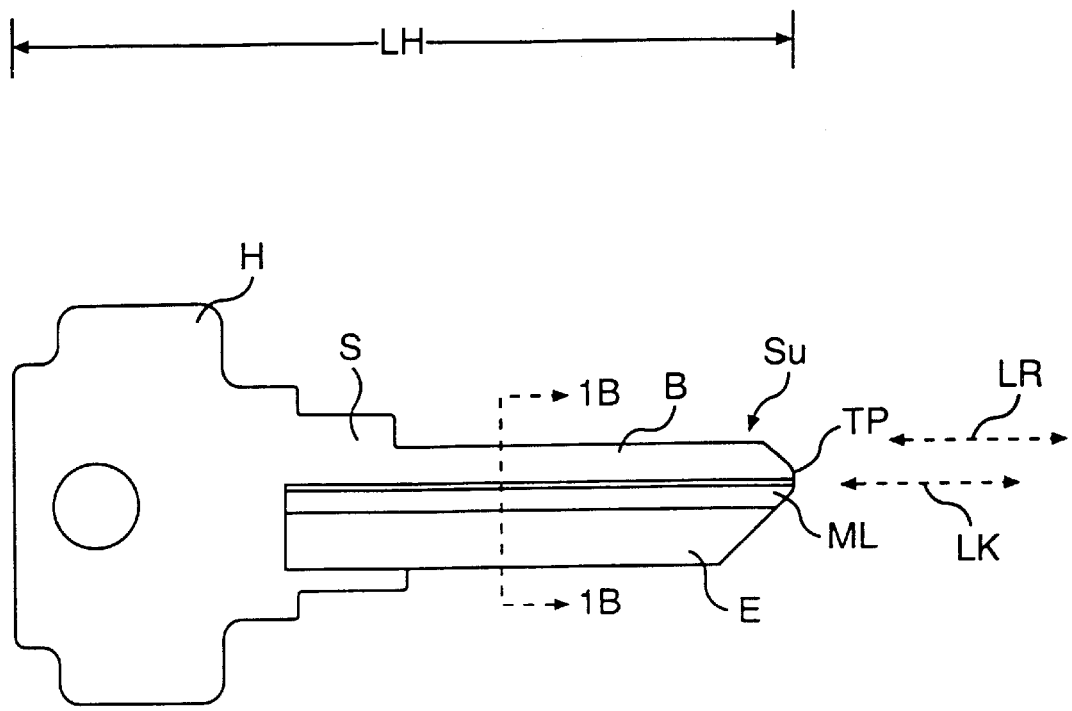
FIG. 1A is a top plan view of a single sided shoulder gauged key.
Figure 1B:
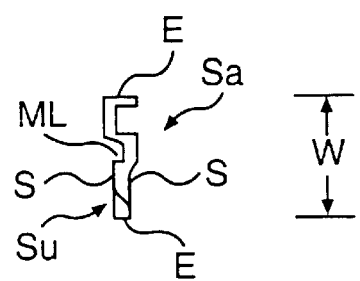
FIG. 1B is a cross-sectional view of FIG. 1A taken along line 1B—1B.
Figure 1C:
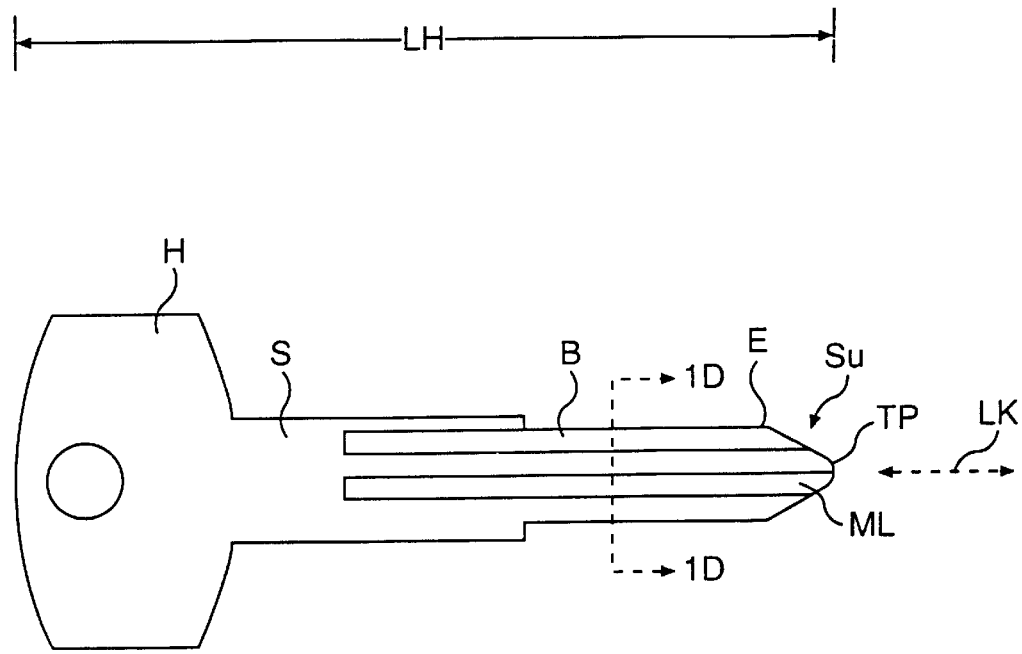
FIG. 1C is a top plan view of a double sided shoulder gauged key.
Figure 1D:
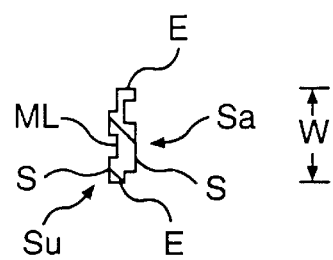
FIG. 1D is a cross-sectional view of FIG. 1C taken along line 1D—1D.
Figure 1E:
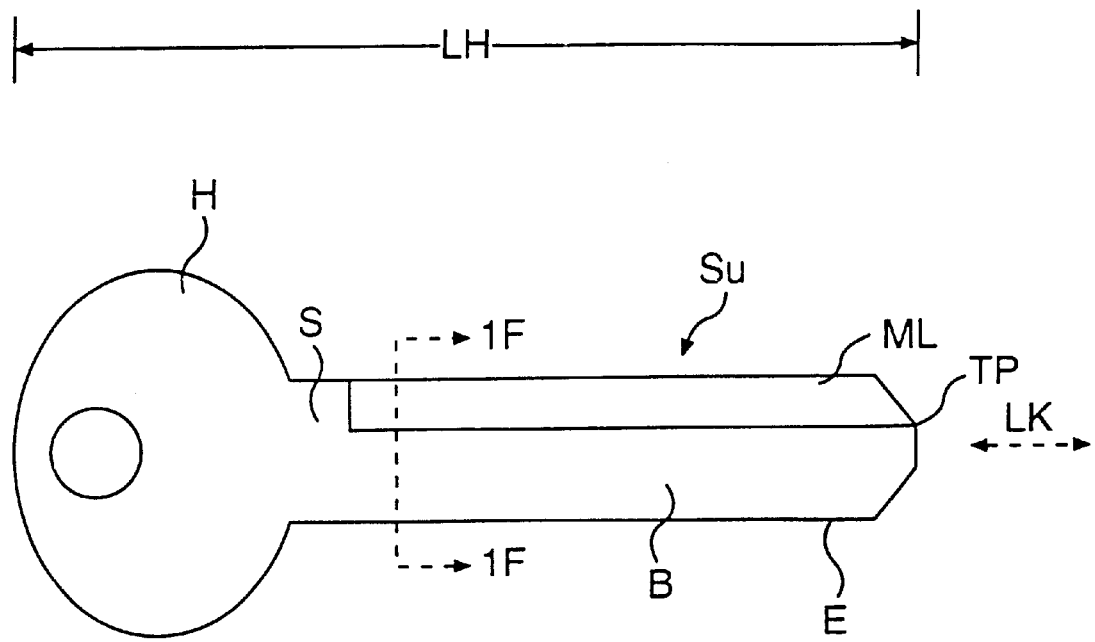
FIG. 1E is a top plan view of a double sided tip gauged key.
Figure 1F:
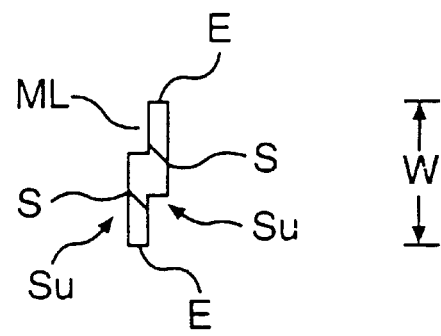
FIG. 1F is a cross-sectional view of FIG. 1E taken along line 1F—1F.

Referring to FIGS. 1A–1F, the keys discussed herein each have a head H, a length LH that is the combination of the head H and a blade B, and a longitudinal axis LK. More specifically, the length LH of the key extends from the tip TP of the blade B to the top of the head H. The key has opposed sides S, in which each side S in a plan perspective defines a profile of the key, which is shown in FIGS. 1A, 1C, and 1E. The key also has an edge E circumscribing the periphery of the key. The opposed edges E of the blade B define a width W therebetween, as shown in FIGS. 1B, 1D, and 1F.

The keys shown in FIGS. 1A–1F are key blanks because they do not have a bitting pattern cut into the blade B. A master key, shown, for example, in FIG. 7A, has a bitting pattern BP. The bitting pattern BP is defined by at least one cut C and, as shown in FIG. 7A, a plurality of cuts C. Each cut C of the bitting pattern BP has a depth, which corresponds to the width of material removed from the blade B to form the cut C. In reproducing a key, the bitting pattern BP of the master key is cut in the blade B of the appropriate key blank.

The keys discussed herein are categorized by two aspects. The first is whether the key is single sided or double sided. For a single sided master key, as shown in FIG. 7A, the bitting pattern BP is cut into only one edge E of the blade B and the depth of the cut C is the difference in the width W of the blade B without a cut C therein and the width W of the key at the location of the cut C. A double sided master key (not shown), in comparison, has a bitting pattern BP cut into both edges E of the blade B. The key blanks shown in FIGS. 1C and 1E are for reproducing double sided master keys and the key blank shown in FIG. 1A is used for reproducing a single sided master key.

The second aspect used to categorize keys is whether the key is shoulder gauged or tip gauged. The shoulder gauged keys have a "shoulder" SH, which is a portion of the key that laterally extends outwardly at a steep slope relative to the longitudinal axis LK of the key. The shoulder is located adjacent the intersection of the blade B and the head H of the key. The key blanks shown in FIGS. 1A and 1C have shoulders SH and, therefore, are shoulder gauged keys. The shoulder SH is a reference point from which bitting information is measured, which is discussed in detail below. The tip gauged key, shown in FIG. 1E, lacks a shoulder and the reference point is the tip TP of the key.

The keys also have a surface SU that forms the sides S of the key. A primary feature of the surface SU in most keys is the milling ML, e.g., a longitudinally-extending groove or grooves in the blade B. The present invention can use information about the surface SU of the master key to identify or assist in identification of the key. Surface information includes the aspects of the key that exist outside the plane formed by the longitudinal axis and lateral axis of the key. Stated differently, if the blade B and head H form x- and y-axes, then the surface information is in the z-axis.

Figure 2:
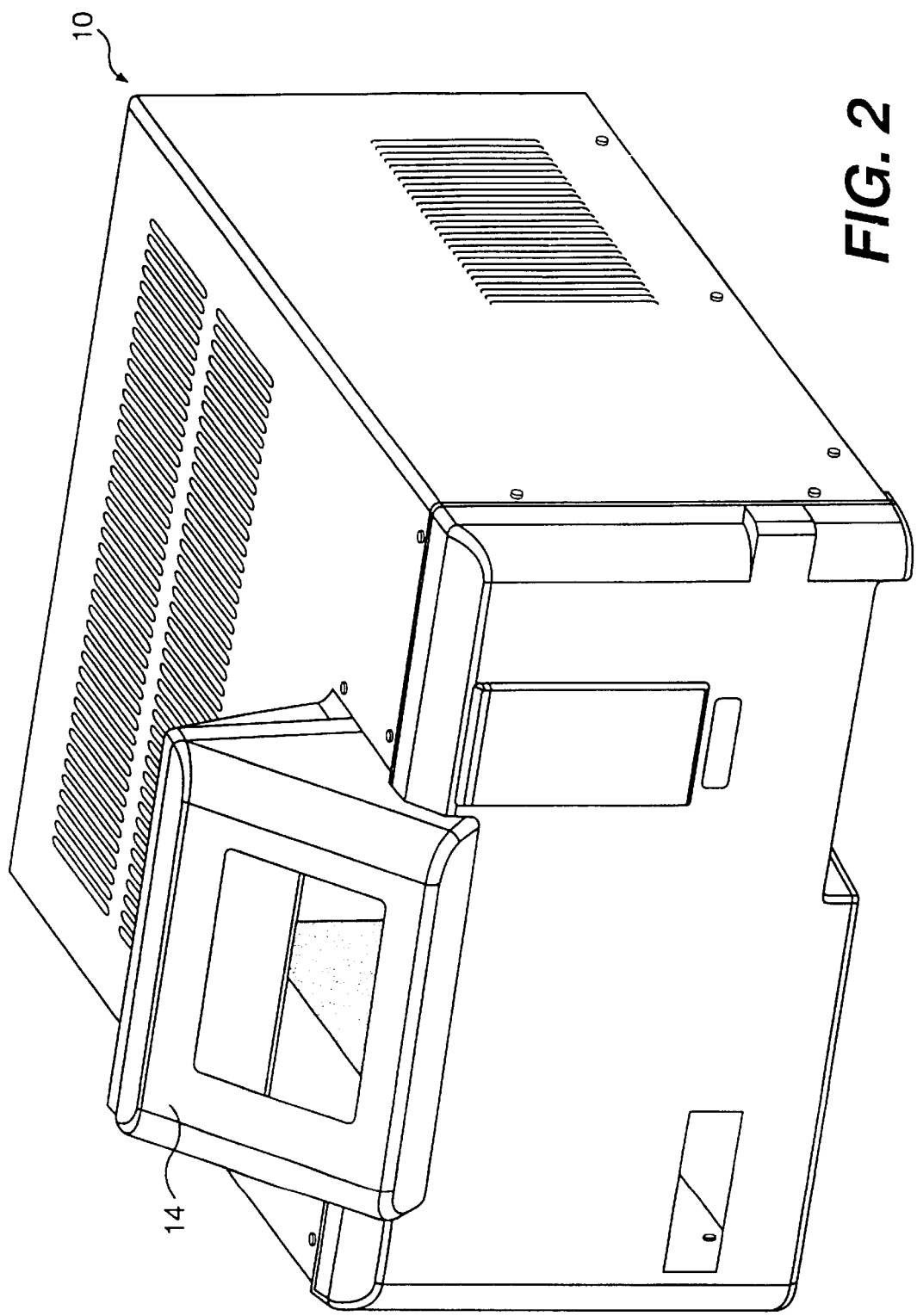
FIG. 2 is a front isometric view of the machine of the present invention with a cover over it.
Figure 3:
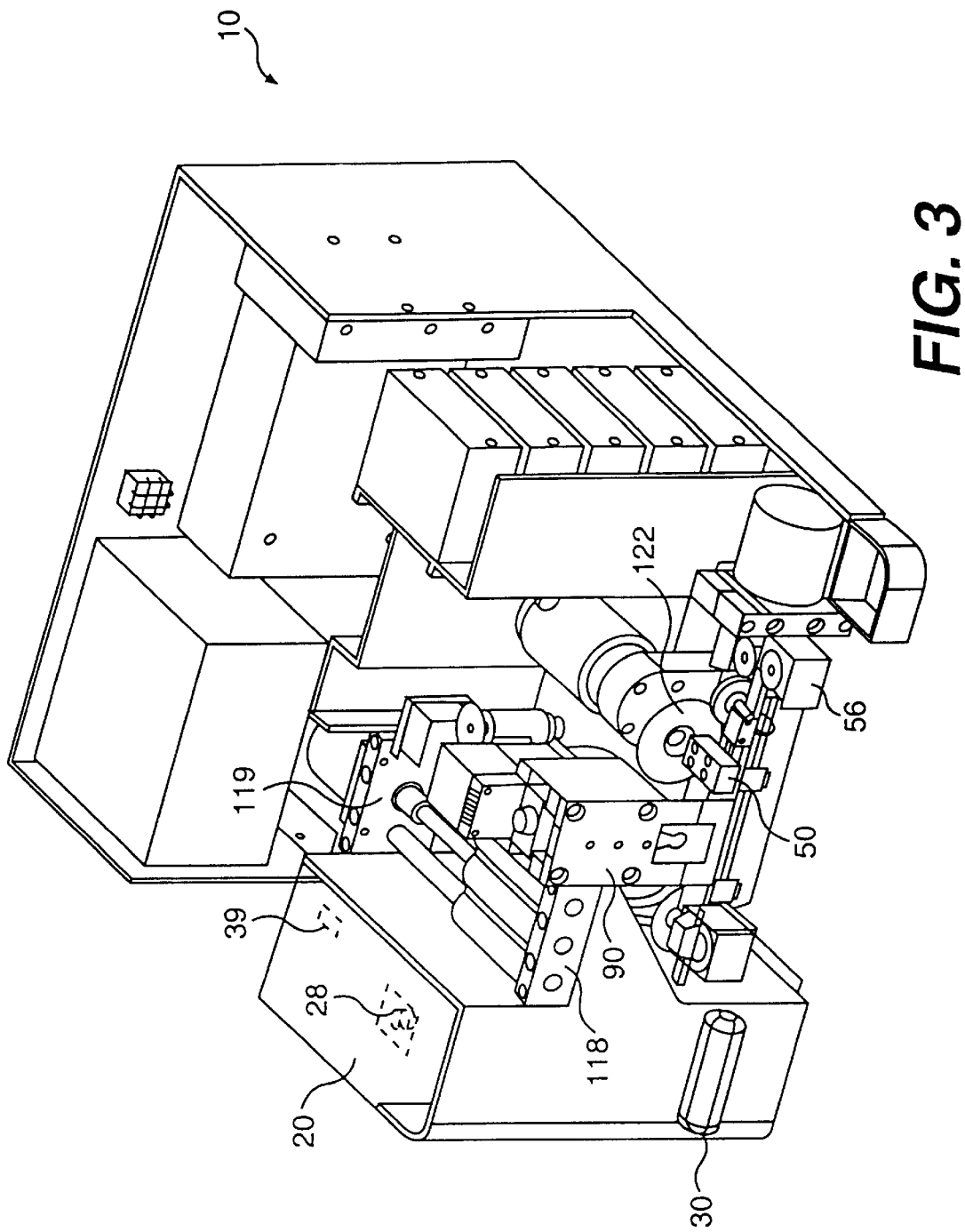
FIG. 3 is a front perspective view of FIG. 2, in which the cover is removed from the machine.
Figure 4:
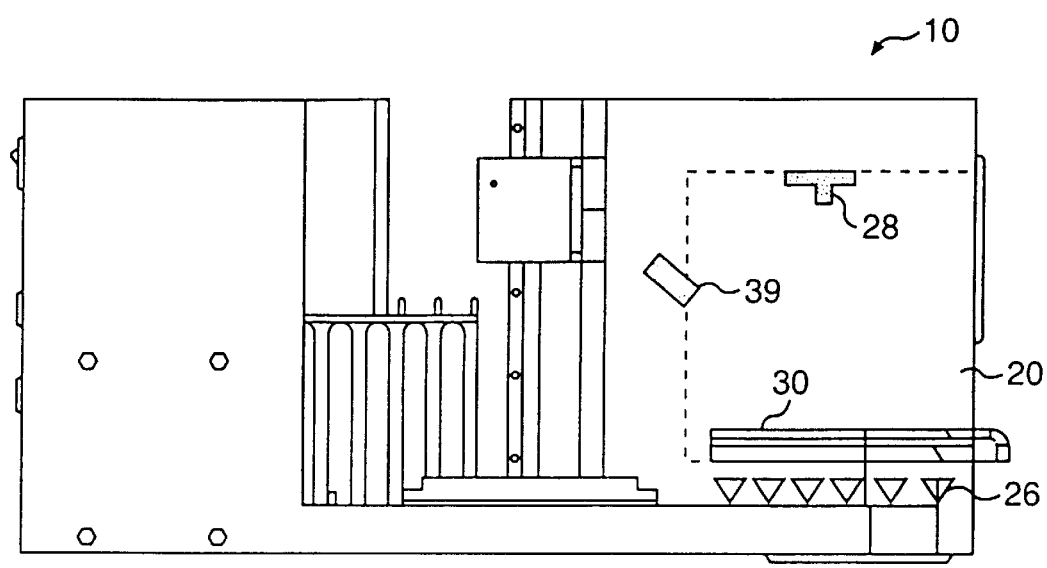
FIG. 4 is a side elevational view of FIG. 3.

Keys are identified in the machine 10, which is shown in FIGS. 2–4. FIG. 2 is the machine with a cover 12 and FIGS. 3 and 4 show some of the internal components. To use the present invention, the operator interfaces with the machine 10 by an output subsystem 14, shown in FIG. 2. In the preferred embodiment, the output subsystem 14 is a conventional LCD. Other contemplated embodiments include a CRT, a printout, or a series of signal lights. The output subsystem 14 also includes a means for the operator to respond to a prompt, such as pressing a particular button (not shown) on the face of the machine 10. An alternative embodiment is using a touch-sensitive screen to respond to the prompts. The output subsystem 14 is coupled to a computer subsystem 16.

Figure 5:
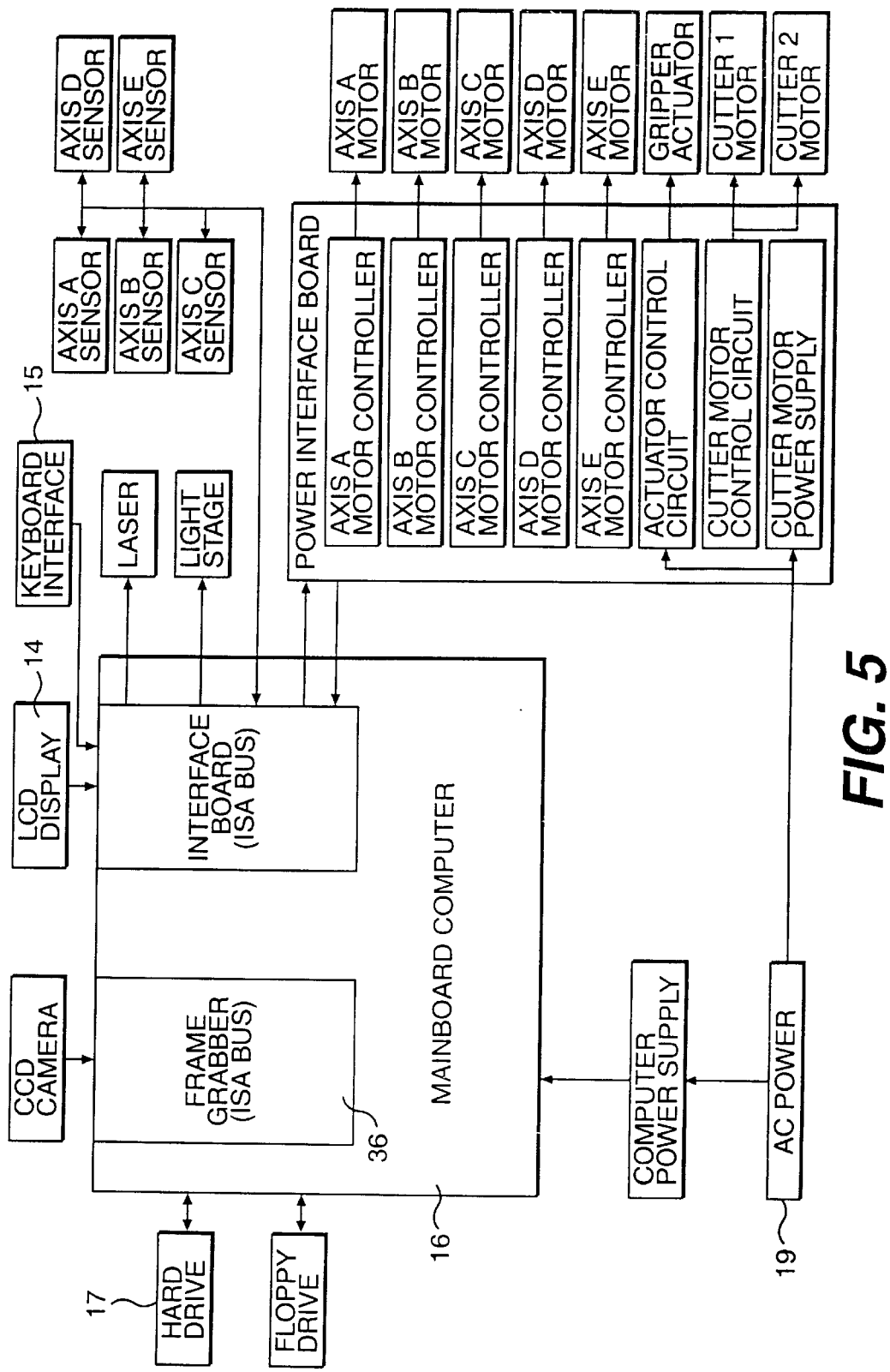
FIG. 5 is a block diagram of the power means of the preferred embodiment of the present invention.

Referring now to FIG. 5, the computer subsystem 16, or the main computer processing unit ("CPU"), makes the comparisons and decisions for the various processes of the present invention. The computer subsystem 16 uses a memory subsystem. The programs to operate the computer subsystem 16 are stored on a hard disk 17 in the preferred embodiment. Similarly, a database of reference keys to compare to information about the master key is also on a hard disk 17, whereas information about the master key itself is accepted in a random access memory.

Still referring to FIG. 5, the power means 19 used to power the electronic components in the present invention is preferably a 120V AC power source. The power means 19 can be connected directly to the interface board, converted to 30V DC, +/−12V DC, or +/−5V DC, depending on the electronic component. The power switch (not shown) is located on the back side of the machine 10.

KEY IDENTIFICATION PROCESS

The first step in the process of the present invention is to determine the type of master key so that the appropriate blank can be chosen to duplicate the master key. In the preferred embodiment, the backlit profile and light beam interface images of the master key are digitized and the extracted information is compared to a plurality of reference keys in the memory subsystem.

Backlighting Process

Figure 6:
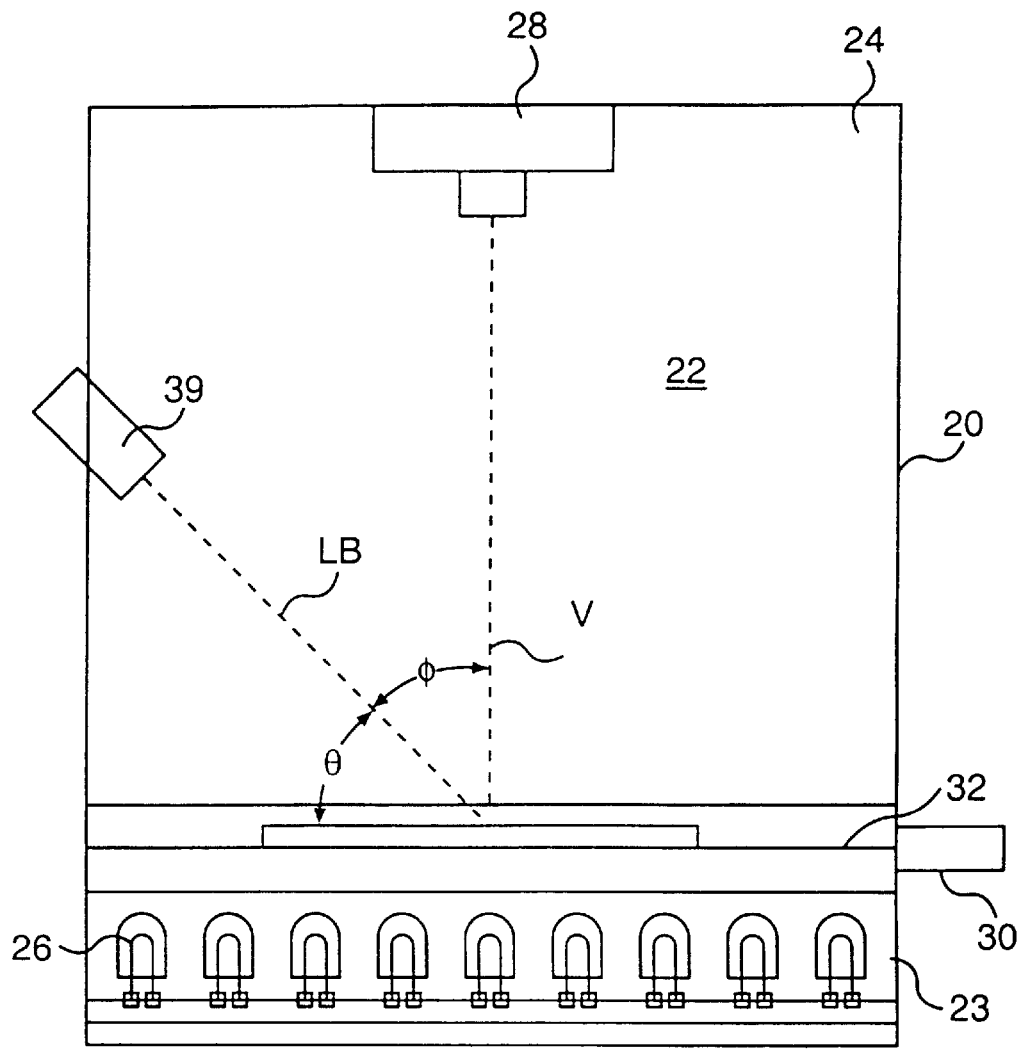
FIG. 6 is a simplified side view, partially in schematic, of the preferred device of the present invention for obtaining information about the master key.

In the preferred embodiment, a housing 20 or other enclosed volume in the machine 10 is used to obtain the profile of the master key. The position of the housing 20 relative to the other components in the machine 10 is best shown in FIGS. 3 and 4. Referring now to FIG. 6, the housing 20 has an interior 22, a first end 23, and an opposite second end 24. A means for supporting the master key is disposed intermediate the first and second ends 23, 24 of the housing 20. At least a portion of the supporting means is formed of a material to allow light to pass therethrough.

A light source means, which is disposed adjacent the first end 23 of the housing 20 in the preferred embodiment, emits light through at least a portion of the supporting means to form an image of at least a portion of the profile of the master key disposed on the supporting means. A receiving means, which is disposed adjacent the opposite, second end 24 of the housing 20, receives the image of the profile of the master key that is disposed between the receiving means and the light source means. The light source means emits light at one end of the housing 20 and the receiving means at the other end of the housing 20 receives the image of the profile of the master key outlined by light passing through the supporting means.

The preferred light source means is an array of LEDs 26. Other embodiments are also contemplated, such as conventional electric lights (not shown) or an electroluminescent or fluorescent panel (not shown) that outline the master key so that the receiving means can distinguish the profile of the master key from a background.

The supporting means preferably comprises a drawer 30 slidably mounted in the housing 20. The drawer 30 has a bottom 32 against which one side of the master key is disposed and at least a portion of the bottom 32 of the drawer 30 is adapted to allow light to pass therethrough. When the bottom 32 of the drawer 30 is fully disposed within the interior 22 of the housing 20, the housing 20 is substantially light-tight. Other embodiments of the supporting means are contemplated, such as a clear shelf (not shown), a plurality of clear protrusions (not shown) projecting into the interior 22 of the housing 20 on which the master key is disposed, and other designs that allow at least the relevant portion of the profile of the master key to be outlined.

In the preferred embodiment, the drawer 30 has a cut-out template 34, shown in phantom line in FIG. 7C, into which the master key is placed. The dimensions of the cut-out of the template 34 are large enough to accept any key for which the operator has a key blank to duplicate. Both the bottom of the drawer 30 and the template 34, in contrast to the master key, are formed of a material through which light may pass. Examples of materials are light-transmittive polymers and plastics, fiberglass, glass, and the like. An alternative embodiment uses interchangeable key-shaped cavity templates (not shown), in which one template aligns the shoulder of a shoulder gauged key and the other template aligns the tip of a tip gauged key. The present invention, however, does not require the master key to be precisely aligned to operate efficiently. Still another contemplated alternate embodiment of the present invention does not use a template, but the primary consideration with such a design is ensuring that the master key is positioned away from the edge of the drawer 30 with the tip facing forward. One issue is ensuring that the edge of the drawer does not interfere with the backlit image of the master key.

Figure 9:
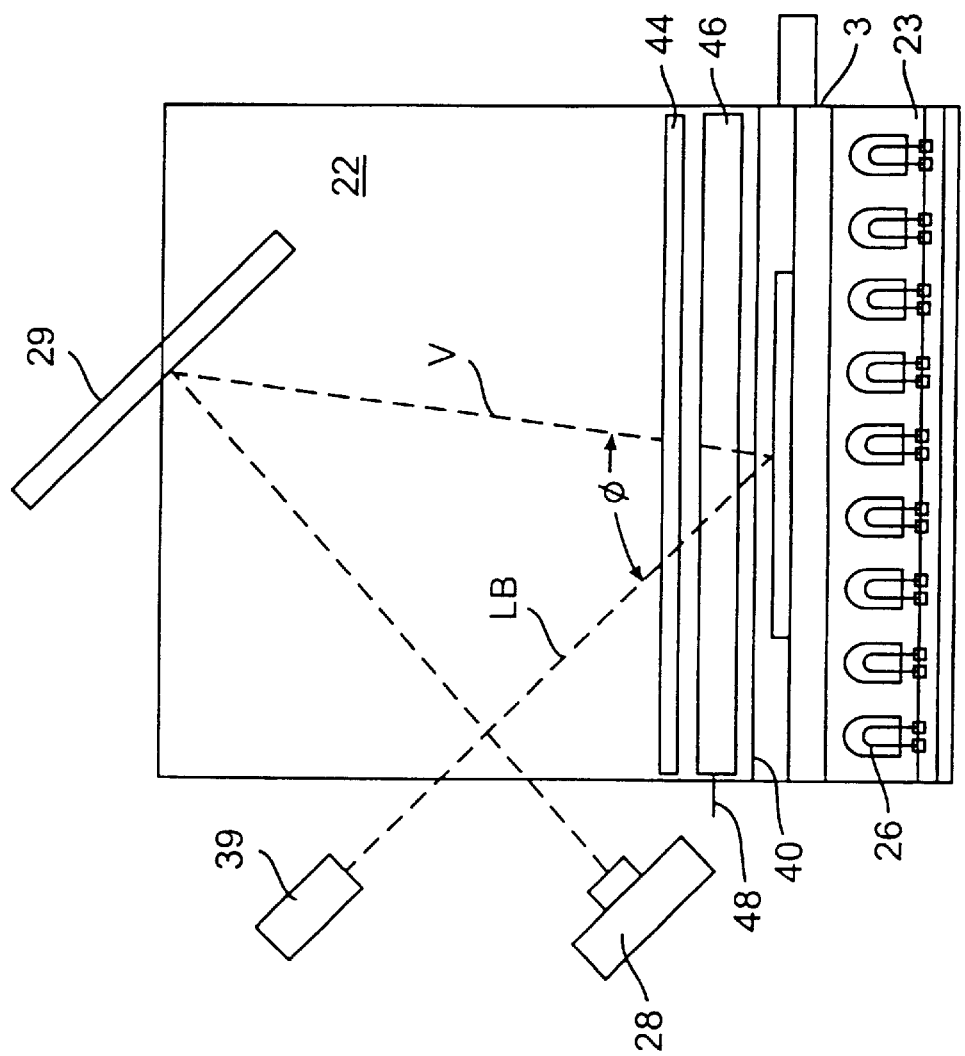
FIG. 9 is a simplified side view, partially in schematic, of an alternative embodiment of the device shown in FIG. 6, in which a mirror is used to accommodated the focal length of the receiving means and in which a pressure chamber is disposed intermediate the light beam emitting means and the master key to minimize unwanted reflections and scatter as the light beam interfaces with the master key.

The preferred receiving means views and electronically captures the profile of the master key using an electronic camera, specifically a CCD camera 28. The CCD camera 28 is an array sensor, as opposed to a linear sensor. The camera 28 can be mounted vertically over the drawer 30 if the focal length is appropriate for the dimensions of the machine 10. An alternative embodiment uses a mirror 29 to accommodate the focal length for the CCD camera 28, which is illustrated in FIG. 9. The mirror 29 is located above the drawer 30 and reflects the image to the camera 28. This embodiment is designed to minimize the size of the machine 10 by using the mirror 29 to accommodate longer focal length cameras.

To begin the backlighting process, the output subsystem 14 directs the operator to insert the master key into the drawer 30. After the operator places the master key in the drawer 30 and closes it, he then responds to the prompt on the output subsystem 14 to start the identification process. The output subsystem 14 notifies the operator to please wait while the master key is being scanned. The machine 10 takes about twelve (12) seconds to identify the master key.

The computer subsystem 16 first energizes the LEDs 26. The computer subsystem 16 also ensures that any other sources of light in the drawer 30 are de-energized, e.g., a light beam to detect the surface information of the master key, which is discussed in detail below. When the LEDs 26 are energized, the electronic camera 28 receives the characteristics of the profile of the key, in particular, the length of the key and the outline (e.g., head shape and blade) of the key. That is, the camera 28 views the profile or silhouette of the master key because it is the only nontransparent item disposed between the array of LEDs 26 and the electronic camera, thereby backlighting the master key. This process is illustrated in FIGS. 7A and 7C, wherein FIG. 7A shows the top plan view of a master key, specifically an SC4 type key, and FIG. 7C, in comparison, shows the same key as viewed by the receiving means, in which the area surrounding the key is light and the key itself is dark.

The CCD camera 28, after a short delay, receives or captures the image of the master key and converts it into an electrical signal, which the digitizing means, or digitizing subsystem, converts into a digital image. The delay before capturing the image allows an automatic iris (not shown) and/or automatic gain control ("AGC") functions on the camera to adjust to receive an appropriate amount of light. The auto iris and AGC functions typically regulate the image at a constant intensity to compensate for diverse lighting conditions. When there is a change in lighting intensity, the overall intensity integral of the image changes and the camera 28 attempts to compensate. This compensation typically has a finite, non-zero response time, the length of which depends on lighting change. The auto iris and AGC settling time generally is not tightly controlled and can vary widely from camera to camera. One method to ensure that the image transients have settled before digitizing the image is to use a large delay between the changing lighting conditions occurring and capturing the image. Such a long delay, however, increases the time necessary to complete the key identification process.

Thus, to speed up the image capture process, the camera output is monitored so that the settling can be measured and the delay time shortened. Since the AGC and auto iris control the electronic aperture and, therefore, overall lighting intensity, a change is reflected in the image by a shift in the overall image intensity. The pixel levels can be integrated over the whole image to obtain a measure of overall intensity. This overall intensity is measured and monitored over time after changing the lighting conditions. The monitoring continues until the variation, averaged over several frames, drops below an acceptable level when it is determined that the transient is substantially completed. With the conditions stabilized and the auto iris and AGC functions properly setting the intensity of the image, an image frame is then captured.

The digitizing means, which is electrically coupled to the receiving means, converts the image of the profile of the master key received or captured by the receiving means into a digital image. As shown in FIG. 5, the digitizing subsystem is a frame grabber 36, which is also known as a capture board. Other contemplated embodiments of the digitizing subsystem are a digital camera to replace the analog camera and frame grabber, a scanable linear sensor, and the like.

The digitizing subsystem acquires a grey scale image that must be segmented to discriminate the part of the image that is the master key from the part of the image that is background. Backlighting the master key creates a sharp contrast between the image and background that is well suited for this process.

It is desirable to make a detection algorithm operate without individual machine 10 calibration, despite machine 10 to machine 10 variation in backlight intensity, drawer transmissivity, camera sensitivity, and AGC nominal setting. This robustness is achieved by calculating an intensity histogram of the image to determine the binary slicing threshold to set. A histogram is the intensity distribution of pixel values in an image that is generated by counting the number of times each pixel intensity occurs. For a dark, non-transparent key against a bright background, there are, for the most part, only two pixel intensities that exist, one bright and one dark. Therefore, the histogram will have two peaks, one at a high intensity and one at a low intensity. There is no spatial information contained in the histogram. Histograms are known in the art for image processing and machine vision and discussed in publications such as *Digital Image Processing* by Kenneth R. Castleman, Prentice Hall, N.J., 1996, and *The Image Processing Handbook* by John C. Russ, CRC Press, Boca Raton, 1995, both of which are incorporated by reference.

With the lighting conditions established, the histogram has two distinct peaks, one with a large intensity for the background and one with a very low intensity for the key. Integrals of the graph are calculated to find the two intensity levels giving upper and lower tails with areas calculated as a fraction of the area under the whole curve. The average of these two intensity levels is used as a threshold. Any pixels in the image that are darker than the threshold are assigned to the master key and other, lighter pixels are assigned to the background.

The compilation means, which is electrically coupled to the digitizing means, creates master key information from the digitized image of the profile of the master key, specifically information about the length of the master key and the head shape of the master key. The compilation means can also generate other information, such as the bitting pattern of the master key, which is discussed below. In the preferred embodiment, the image of the profile of the master key is scanned row by row to determine the position of the top edge and the bottom edge of the key image (or left and right edges, depending on the orientation) to define the sides of the key image. The image is converted by translating and rotating to a predetermined reference position and orientation, independent of the position at which the key is placed in the drawer 30. Thus, key information is standardized to be comparable to other key data in memory subsystem.

The memory subsystem stores information about a plurality of reference keys in the hard disk 17. The information includes data about the length of each of the reference keys and the head of each of the reference keys. In one embodiment, the database contains information about more than three hundred key blanks and information about more than four hundred key silhouettes, since each blank may have multiple master key silhouettes.

The length elimination means compares information about the length of the reference keys in the memory means with information about the length of the master key in the compilation means and eliminates reference keys that are outside a desired range of lengths. That is, algorithms narrow the possible matching keys in a database to those that have an almost identical length to the master key. The range of lengths used to eliminate reference keys is determined by the length of the master key and a predetermined variation added or subtracted therefrom.

In the preferred embodiment, reference keys in the memory means that have a length more than one tenth of an inch (+/−0.100") different from the master key are eliminated. The preferred range for disqualification based on length variation between the master key and keys in the database is one tenth to five tenths of an inch (0.100"–0.500"), and more preferably one tenth to two tenths of an inch (0.100"–0.200"). After this elimination step, a subset of reference keys, which is the result of the analysis, remains that consists of those keys in the database not disqualified based on the length criteria.

The set of possible matching keys in the preferred embodiment is then further narrowed by comparing the head shape of keys and eliminating those in the database that do not have a similar shape. The head shape information in the memory means must be compact for storage and rapid retrieval, yet detailed enough to discriminate the sometimes minute differences between keys. Accordingly, width measurements are taken periodically along the length of the key from the end of the head extending for a percentage of the length of the master key, preferably one half the length of the master key.

With the master key positioned horizontally in the image, the positions of the top and bottom edges of the image of the master key are measured every hundredth of an inch (0.010") along the length of the key. The difference between these two edges gives key width at each position. Sub-pixel measurement techniques, which are known in the art, are preferably used to improve measurement precision.

The elimination of reference keys based on the head shape occurs in two steps in the preferred embodiment. First, reference keys that are greater than a predetermined deviation from the master key are disqualified. This is an absolute elimination, referred to as the first head shape elimination means. The second stage is a relative comparative elimination, which is referred to as the second head shape elimination means. That is, the remaining keys in the subset after the first head shape elimination step are ranked based on how close each of their respective head shapes resemble the head shape of the master key. Based on this relative ranking, the reference key with the closest head shape, or closest relative ranking, is then compared to the other keys in the subset, and those in the subset that deviate more than a predetermined percentage difference are eliminated. The first and second head shape elimination means can occur in conjunction with the light beam elimination means, which is discussed below. Also, the first head shape elimination means could independently narrow the reference keys to a single key, or eliminate all the reference keys if a corresponding head shape was not in the memory subsystem.

More specifically, in the preferred embodiment, the first head shape elimination means compares information about the head of the subset of reference keys created by the length elimination means with information about the head of the master key in the compilation means. Reference keys are eliminated from the subset of reference keys that deviate more than a desired value when compared with the head of the master key. The algorithm compares a portion of the master key at the head to the corresponding position of the remaining subset of keys. The comparison uses the square of the difference between the head of the reference key and the head of the master key for each value and multiplies the product by a constant. All the values are added together for each position. For a constant of one (1), an example of the desired value of the first head shape elimination means is 0.005 square inches. If the summation of the square of the differences is greater than the predetermined value, then the reference key is eliminated. The first head shape elimination means creates a subset of reference keys remaining, similar to the length elimination means.

The head shape comparison means compares information about the head of the subset of reference keys created by the length elimination means with information about the head of the master key in the compilation means and determines which reference key in the subset of reference keys created by the length elimination means has the most similar head information to the head information of the master key. In other words, the reference key with the lowest value determined in the first head shape elimination means is selected by the head shape comparison means. Accordingly, the subset of reference keys remaining from the first head shape elimination means includes the reference key selected by the head shape comparison means.

The second head shape elimination means then compares information about the head of the reference key selected by the head shape comparison means with the other reference keys in the subset of reference keys created by the first head shape elimination means. The second head shape elimination means eliminates reference keys from the subset that deviate more than a predetermined percentage difference from the reference key selected by the head shape comparison means. The preferred predetermined percentage is twenty percent (20%), and the preferred range is ten percent to thirty percent (10%–30%). The second head shape elimination means creates a subset of reference keys remaining.

After performing the elimination process for the length and the head shape, the subset of keys may have been reduced to a single key, decreased to multiple keys, or, alternatively, eliminated all keys. For example, the subset would be reduced to a single key for a KW1 key blank. Conversely, at least five keys would exist in the subset if the master key was a B44E key. The B44E is used in "General Motors"® ignition switches and keys B46J, B48A, B50C, and RA4B have identical lengths and head shapes. Thus, for some types of keys, an additional elimination step is required to narrow the subset of keys further to a single reference key that matches the master key.

Surface Information Analysis

If an additional elimination step is necessary, it involves analyzing the surface information of the master key, specifically the milling in the preferred embodiment, and disqualifying the remaining keys that have a different surface. Since the surface information is not discernable by backlighting, the milling is preferably detected using a light beam in the preferred embodiment.

In the preferred embodiment, the master key remains on the supporting means, specifically on the drawer 30, within the interior 22 of the housing 20. A light emitting means, also disposed in the housing 20, emits a substantially planar light beam LB at the key to form an image as the light beam LB interfaces with the side of the master key. An example of the light emitting means is a laser line generator 39 that produces a laser beam.

The receiving means receives the image so that the intersection of the light beam LB with the non-planar portion of the side of the key, usually the milling, forms a non-linear segment across the width of the key. The non-linear segment that the non-planar portion of the side of the master key forms provides information about the surface of the master key that can be used to distinguish the master key from other reference keys in the memory subsystem. FIG. 7D provides an example of an image that is the result of the light beam interfacing with the surface of the master key shown in FIG. 7A, specifically the surface shown in FIG. 7B.

The same receiving means used to receive the image of the backlit master key preferably also receives the image of the light beam LB interfacing with the side of the master key. The receiving means receives the image along a viewing axis V. If a mirror 29 is used as shown in FIG. 9, the viewing axis V is the axis striking the side of the key, not the axis of the reflection off the mirror 29 to the receiving means.

The viewing axis V forms an angle $\phi$ with the light beam LB, e.g., they are not parallel to each other. If the viewing axis V and the light beam LB were parallel, then the segment would appear linear and no information would be easily obtained about the surface of the key. Of course, if the side of the key lacked a non-planar portion, then the segment would be linear despite the angle $\phi$ between the viewing axis V and the light beam LB.

It is desired that the angle $\phi$ between the viewing axis V and the light beam LB be between twenty and one hundred and fifty degrees (20°–150°), more preferably between forty-five and ninety degrees (45°–90°), and most preferably at sixty degrees (60°).

As shown in FIG. 6, the preferred viewing axis V is substantially perpendicular to the side of the key and the bottom of the drawer 30 and the light beam LB is at an angle $\theta$ less than ninety degrees (90°) relative to the side of the key. The preferred angle $\theta$ that the light beam LB strikes the blade of the master key is thirty degrees (30°) relative to horizontal. The preferred range for the angle $\theta$ is ten to eighty degrees (10°–80°), and more preferably in the range of twenty to forty-five degrees (20°–45°). It is also preferred that the light beam LB interface with the side of the key substantially perpendicular to the longitudinal axis of the key as shown in FIG. 7D so that the image is as narrow as possible. However, other angles are possible to use, although it is more complex to obtain information from the image of the light beam LB.

Before the receiving means captures the image of the light beam LB, however, the LEDs 26 are de-energized. The light beam LB is energized and directed onto a selected portion of the master key at an angle $\theta$ as shown in FIG. 6. The preferred embodiment, as discussed above, uses the auto iris and AGC functions to regulate the intensity of the image to compensate for the changed lighting conditions. Accordingly, a delay occurs while waiting for lighting transients to end from the camera auto iris and AGC before the image of the light beam LB is captured and digitized. This allows the electronic iris in the preferred CCD camera 28 to adjust to the difference in light that a light beam LB generates compared with the output of the array of LEDs 26.

In the preferred embodiment, the position of the light beam LB and camera are fixed by the mechanical assembly so that a rectangular area 39 in the image can be found that will contain the light beam line when any key is placed in the drawer 30, which is shown in phantom lines in FIG. 7C. The light beam imaging functions will then be confined to operate in this box to speed computation and reduce possibilities for error. It is also contemplated that the laser line generator 39 could be moved along an axis (not shown) or pivoted, if desired, to obtain the best image of the light beam interfacing with the surface of the key.

Figure 10A:
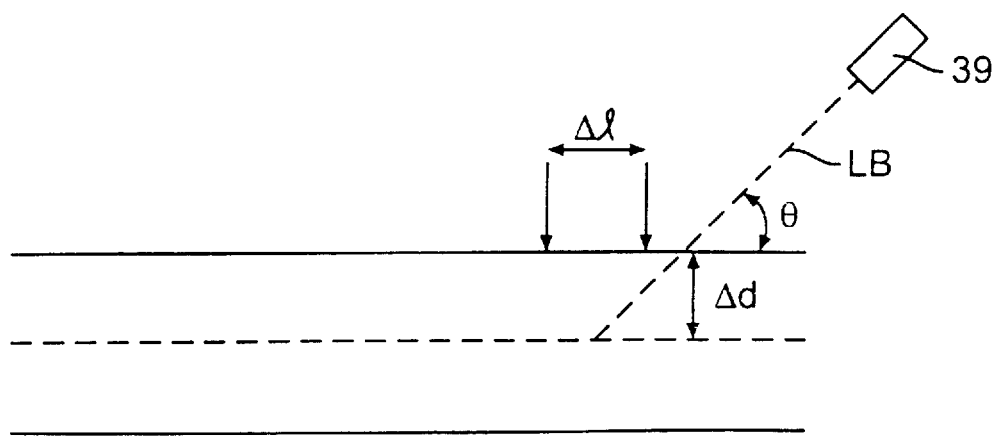
FIG. 10A is a simplified side elevational view, partially in schematic, showing the light beam of the light emitting means interfacing with a selected portion of the master key.

Referring now to FIG. 10A, once the intersection of the light beam line with the key surface has been found, these positions must be mapped into depth of a cutout. Since the light beam LB is inclined at an angle $\theta$ less than ninety degrees (90°), the point of intersection with the key surface will vary in the direction of the length of the key ($\Delta l$), which is a function of the depth ($\Delta d$) of the milling pattern at that point. The angle $\theta$ is constant and $\Delta l$ is measured from the image. The depth is then calculated using the equation $$\Delta d = (\Delta l)(\tan \theta).$$

These calculations result in depth of milling as measured every one thousandth of an inch across the width of the key.

Figure 10B:
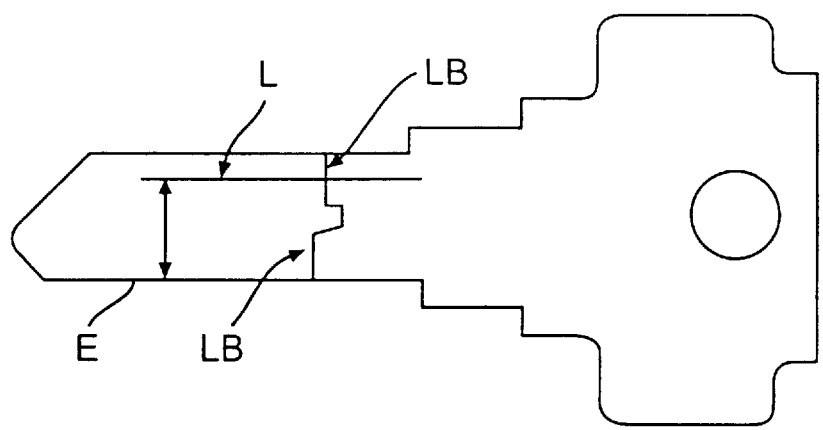
FIG. 10B is simplified top plan view showing the light beam interfacing with the master key.

The intersection of the light beam line and the key surface are extracted to determine depth of milling across the key, which is shown in a simplified form in FIGS. 7D and 10B. A separating means is used in the light beam for separating out the portion of the image that represents the intersection of the light beam LB with the master key.

Figure 11:
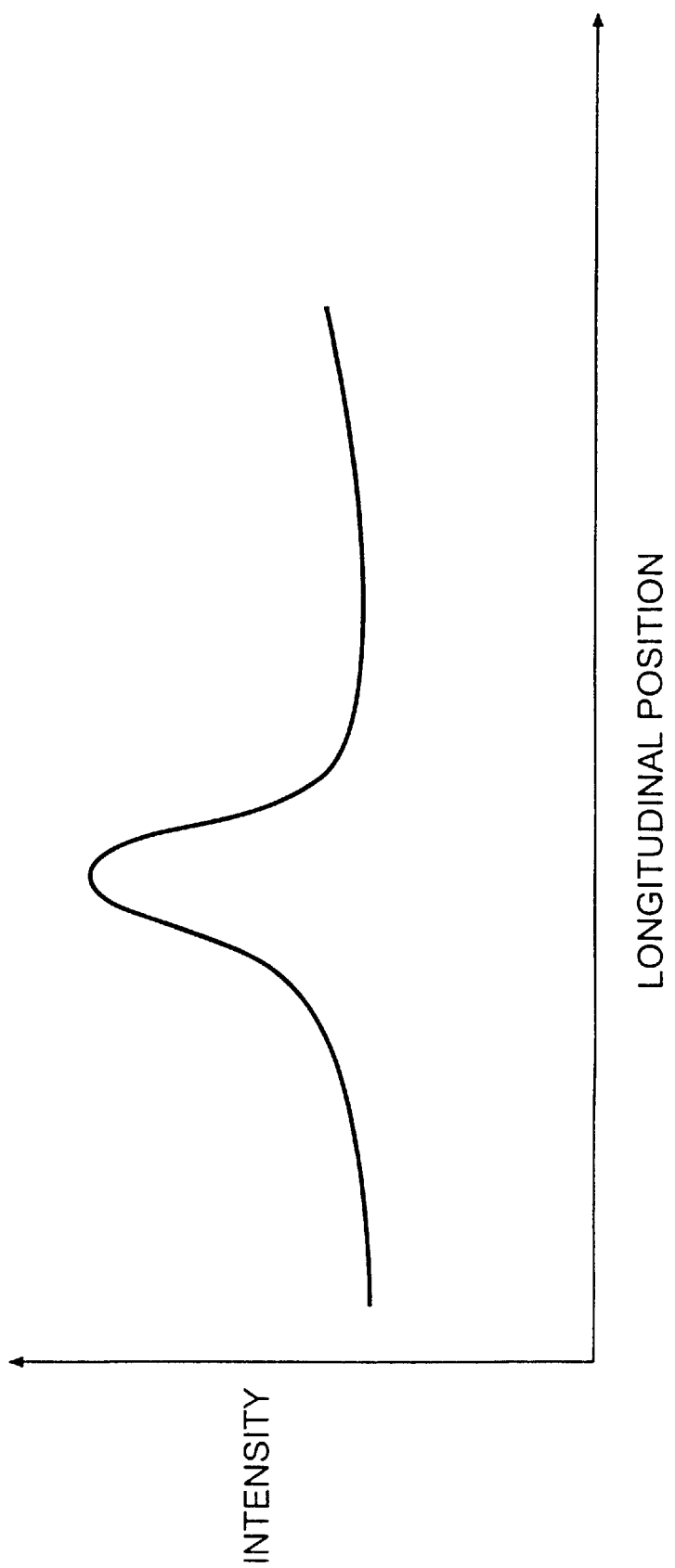
FIG. 11 is a graph of the intensity of the light beam verses longitudinal position for the light beam interfacing with line L in FIG. 10B.

In the preferred embodiment, image measurements of the position of the light beam LB interfacing with the master key are made every one-thousandth of an inch (0.001") across the width of the key. For any given position across the width, there should be only one bright spot where the light beam LB intersects. FIG. 10B shows both the image of the light beam LB intersecting with the surface of the key and one selected line L corresponding to a predetermined distance from a reference point, e.g., the edge E of the key. A plot of intensity versus position along this line L is shown in FIG. 11. The spot of intersection should be brighter than any other portion on the linescan, but the intensity does not necessarily have any known relationship to intersection pixels at other positions or on other keys, so a fixed intensity cutoff will not select intersection points from non-intersection points effectively.

The light beam LB is reflected and scattered from the surface at the point where the beam strikes, and the brightness of the line of intersection in the image varies with surface smoothness and surface material type. Surface smoothness affects both the brightness and the form of scattering. Smooth surfaces generally reflect the light causing a concentrated bright area in the image while rough surfaces tend to diffusely scatter the light giving less brightness. Also, a significant difference exists in reflected intensity among keys that are brass, nickel-plated, and nickel-plated in which the nickel has worn off a portion of the key. There can also be a large difference across a single key. Thus, because the light beam reflects off each of these and other types of keys differently, the camera usually does not receive an equal quality image for all master key outer surfaces. The angle of the surface of the key relative to the light beam LB and camera 28 at the point of intersection also affects the intensity incident upon the camera 28. Thus, the present invention also includes a means for screening the effects of reflections and scatter of the light beam LB as the light beam interfaces with the non-planar portions of the key. The present invention additionally includes a means for minimizing unwanted reflections and scatter of the light beam LB as it interfaces with the key.

The preferred screening means determines the light beam intersection for each slice. The intensity centroid is initially calculated for all pixels that have intensity above a certain threshold, specifically 250 on an 8-bit grey scale. This centroid should correspond roughly to the center of brightness, or brightest point, along that slice. The intensity centroid is defined as the sum of pixel intensity times displacement along the slice threshold are used in the calculation. The centroid calculations result in brighter pixels having a greater weighting in the formula and therefore a greater impact on the calculated position of the peak. This is intuitively desirable for robustness to noise and irregular intensity cross-section. If no pixels on the line are above the threshold, this condition is flagged as "centroid not found."

If the centroid is found, a number is known that corresponds to the center of intensity. The numbers used correspond to the positions that the light beam line intersects with the key and are used to calculate milling depths. The process of finding the centroid for each slice is repeated for all such slices one thousandth inch (0.001") apart. If the algorithm can find the centroid for at least ninety-six percent (96%) of the slices, a satisfactory image has been received and the process of identifying the master key continues. Otherwise, the threshold value of the gray scale is lowered by 2 and the centroid finding process is performed again for all slices. The process is performed repeatedly with the threshold being lowered by 2 each time until centroids have been found for approximately ninety-six percent (96%) of the slices. If the threshold reaches 50 on an 8-bit grey scale without enough centroids being found, then the process is stopped and the operator is notified of the problem of a bad image by the output subsystem 14 and the process is aborted. Using the screening means, the light beam image for the same type of master key will be substantially the same, regardless of whether the outer surface of the key is a constructed of a highly reflective material or a predominantly non-reflective material.

There may not be a bright spot, or centroid, found for each slice because of the geometry of the non-planar portion or an irregularity in the surface of the master key. To account for this, linear interpolation is performed on the centroid data to fill in any gaps in the array after the centroid finding process is satisfactorily completed. If any data is missing on the ends of the array, then the nearest data point is duplicated to fill the gap.

In an alternative embodiment of the screening means, the gain can be adjusted, instead of changing the threshold as described above. That is, the threshold is maintained at a constant value and the gain is adjusted on the frame grabber 36 that digitizes the image of the light beam interfacing with the key. The image is initially viewed with a very low gain and the gain is incrementally increased until centroids are found for at least ninety-six percent (96%)of the slices.

In another embodiment of the present invention, the minimizing means is used to reduce any unwanted reflections and scattering from occurring as the light beam LB interfaces with the master key. As shown in FIG. 9, one embodiment of the minimizing means comprises a thin, flexible membrane 40 being placed against the master key. The membrane 40 is formed of a material that is elastic, such as latex and the like. The membrane 40 forms the bottom portion of a pressure chamber 42, which is disposed over the template 34 on the drawer 30. The top of the pressure chamber 42 consists of glass 44, through which the light beam LB can pass to interface with the membrane 40 over the key. A frame 46 forms the sides of the pressure chamber 42 and separates the glass 44 top portion and the membrane 40 bottom portion to form a closed volume therebetween. After the operator inserts the key into the cavity of the template 34, a small air pump (not shown) inflates the pressure chamber 42 through a connection 48 in the frame 46. As the air fills the pressure chamber 42, the membrane 40 expands. When the pressure chamber 42 is properly inflated so that the membrane 40 tightly surrounds the master key, the light emitting means is energized. The light beam LB traverses through the glass 44 and interfaces with the membrane 40 that has at least partially taken the form of the surface of the master key. The latex presents a uniform outer surface without the problems of unwanted reflections and scattering. Therefore, the threshold and/or gain do not need to be incrementally adjusted to obtain a satisfactory image. However, this embodiment is less desirable because of the increased time to scan a master key, the increased likelihood to produce an errant reading if the membrane 40 is not tightly stretched over the master key, and the possibility of the pump or pressure chamber 42 failing.

After the digitizing means digitizes the image of the light beam interfacing with the selected portion of the master key, the compilation means creates master key information from the digitized image of the light beam LB. The memory means also stores information about the light beam LB interfacing with each of the reference keys at a corresponding selected portion of the reference key.

The light beam elimination means of the present invention then compares information of the light beam LB interfacing with each of the reference keys in the memory means with information of the light beam LB interfacing with the master key in the compilation means and eliminates reference keys that deviate more than a desired value when compared with the master key. The desired value can be the same as that used for the second head shape elimination means, if desired, or alternatively a different value. The light beam elimination means compares the information about the light beam image of the master key with reference keys that were not eliminated based on the length and head shape of the master key. A ranking is generated from the most likely match in the subset to the least likely match. Again, in the preferred embodiment, the algorithm uses the square of the differences based on the position the light beam LB intersects the slice of the key. Usually only one to three keys are in the final subset. The result of the light beam elimination means is then communicated to the operator by the output subsystem 14.

In a contemplated alternative embodiment, the output subsystem 14 prompts the operator to remove the master key from the drawer 30 and flip it over so that the milling on the reverse side can be scanned and used in the identification process, if necessary. Such an alternative embodiment would be used if the length, head shape, and one side milling comparison do not reduce the possible choices to one reference key.

Figure 8:
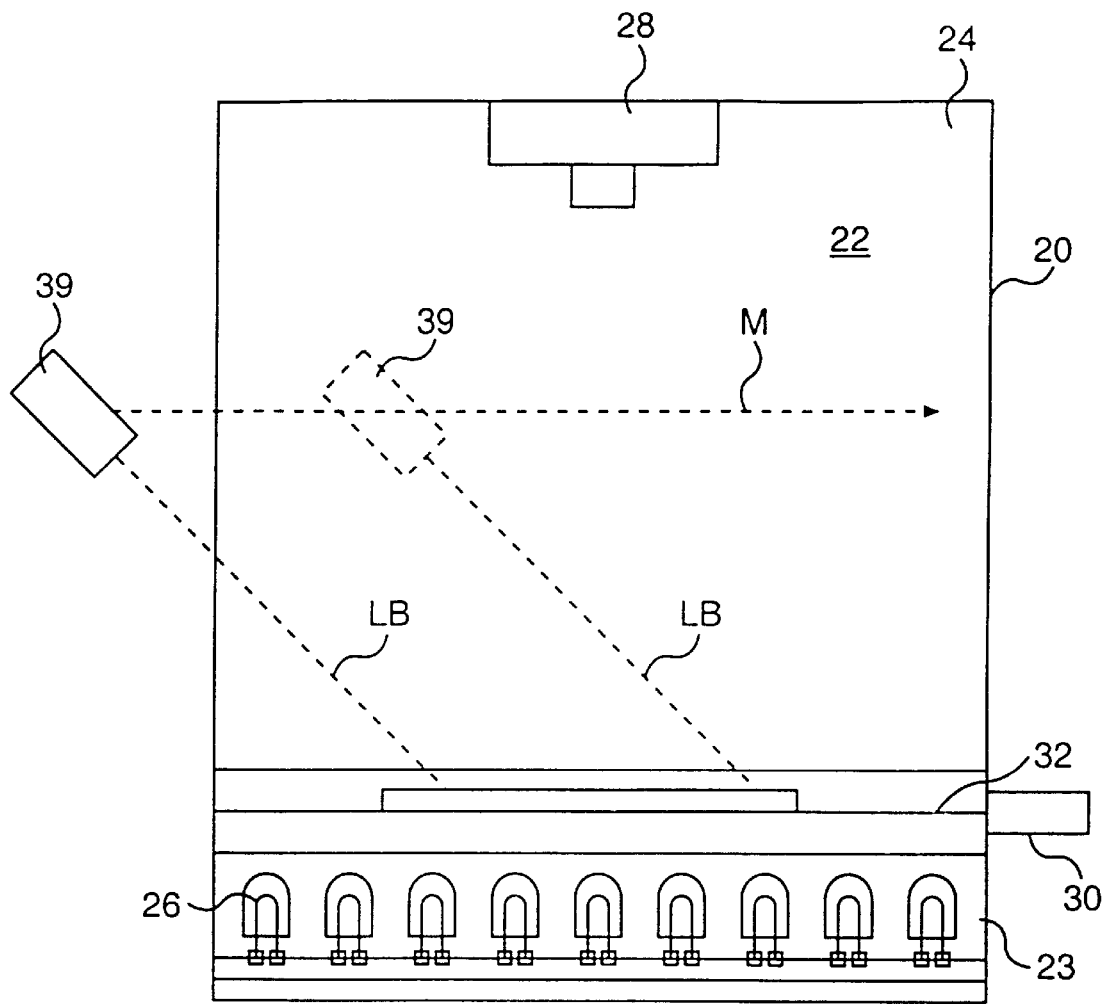
FIG. 8 is a simplified side view, partially in schematic, of an alternative embodiment of the device shown in FIG. 6, in which the light beam emitting means is movable along axis M so that three-dimension information about the surface of the master key can be obtained.

Another contemplated embodiment encompasses using the light beam system to record an entire three-dimensional surface image of the key. Referring to FIG. 8, the light beam is mounted on the longitudinal motion axis M to allow its position to be changed as needed. A light beam scan in one position gives a two-dimensional slice of the surface shape. As the light beam LB is swept along the length of the key, illustrated by the second laser line generator 39 in phantom lines, a series of these two-dimensional slices is generated. The position of the light beam LB is known from a mechanical positioning system (not shown) as each slice is measured. This position gives the third dimension to the image as the slices are stacked to form the entire three-dimensional representation of the key. In a similar embodiment, the light beam LB can be swept or moved across the length of the key to obtain multiple milling images so that the images can be averaged to improve the accuracy of the data. This embodiment would also provide a three-dimensional representation of the entire surface of the key so that additional key characteristics can be measured, thus eliminating the need for the backlighting process.

It is also contemplated using the present invention to obtain information about laser-cut keys or laser keys, such as those used for high-security locks. The difference between these keys and keys shown in FIGS. 1A–1F and 7A is that the bitting is cut vertically relative to the surface of the blade, instead of being cut laterally. Backlighting such a key can be used to identify the key type, but backlighting will be ineffective in obtaining bitting information. Thus, a light beam emitting means is needed to obtain information about the bitting.

After the light beam elimination means is completed, the output system prompts the operator to retrieve the physical key blank displayed by the output subsystem 14 and compare it manually to the master key, which he removes from the drawer 30 for confirmation. If the identification is correct, the operator places the master key back on the drawer 30 and responds to the prompt to continue the key bitting pattern analysis. If the indicated key blank is improper, the operator selects the appropriate response on the output subsystem 14 and the next most likely key blank, if any exists, is displayed. Once the correct key blank is displayed by the output subsystem 14, the operator selects the key, places the master key back in the drawer 30, and responds to the prompt to continue. The output subsystem 14 can also offer the operator the option of re-scanning the master key to start the process again, if desired.

In the presently preferred embodiment, the sequence of steps entails first backlighting the profile of the key and digitizing that information, next recording the surface data, and then starting the elimination analysis steps. As one skilled in the art will appreciate, the sequence can be altered. For example, the order of steps could be backlighting, starting the elimination analysis, and then, if necessary, using the light beam to narrow the subset of keys. In this example, the KW1 would not require the step of using a light beam to eliminate similar keys, whereas a B44E master key would require the step. Alternatively, the first step could be the light beam elimination means followed by the first and second head shape elimination means. However, this option is less desirable because it is quicker to compare the length of the keys first, which creates the largest reduction in the database of keys. As one skilled in the art will appreciate, other variations of the sequence of steps discussed and the data from the master key and reference keys are possible with the present invention.

As one skilled in the art will also appreciate, the present invention eliminates keys that are different from the master key using algorithms that continually narrow the possible key matches. That is, instead of performing a matching process, the present invention uses an elimination process until a single key remains as the most likely match to the master key. However, it is contemplated that alternative software programs could match the same information and choose the type of master key by selecting the one with the closest match in all or selected categories. For example, as one skilled in the art will appreciate, the elimination of reference keys may be performed by computing an overall score for the length comparison, head shape comparison and surface information comparison. The reference keys are then sorted in order of overall score and keys with a score significantly higher than the best overall score are disqualified.

BITTING PATTERN ANALYSIS

After the operator verifies the proper key blank and responds to the prompt to continue as discussed above, the output subsystem 14 then notifies the operator to please wait while the bitting pattern is determined. To read the cut or bitting pattern of the master key, the LEDs 26 are again energized and the light beam de-energized to backlight the profile of the key. The bitting information is collected so that the bitting pattern of the master key can be regenerated or duplicated on the key blank. In the presently preferred embodiment, measuring the bitting pattern takes about ten to twelve (10–12) seconds.

In an alternate embodiment, the machine 10 could be used to perform the bitting analysis only. That is, the operator could initially start the process without performing the steps to identify the key blank as discussed above if he knew the type of master key from a visual inspection. For example, if the master key was labeled with its type or the operator was experienced and visually recognized the key type, the output subsystem 14 could provide an option to skip the identification steps and start with obtaining the bitting information. In this embodiment, the operator would respond to an appropriate prompt on the output subsystem 14 and input the type of key to be duplicated to start the bitting pattern analysis.

The preferred embodiment uses information stored in the memory means during the bitting pattern analysis, such as manufacturers' information about the locations of the cuts and the widths of the key at the location of the cut. Using this information to modify the measured information, the key is "regenerated" so that the bitting pattern is cut into the key blank at the locations and depths that the key manufacturer establishes. Alternatively, if information is not in the memory means for the master key, then the bitting pattern analysis uses the image of the profile of the master key and the key blank is "duplicated" so that the bitting pattern is the same as that in the master key.

If the type of master key being digitized is in the memory subsystem, the computer subsystem 16 accesses information about the type of key (e.g., a single sided, shoulder gauged key), the cut dimensions, the spacing between the cuts in the bitting pattern, and a reference point from which the spacing is measured. If the key is shoulder gauged, then the reference point is the shoulder and, if the key is a tip gauged key, the reference point is the tip.

For a shoulder gauged master key, the first step in mapping the bitting pattern is determining the location of the shoulder on that key needed as a reference when measuring bitting. Once the master key has been identified and re-digitized by backlighting, the manufacturer's database of key specifications yields the nominal distance from tip to shoulder. A slight variation in this length is not critical to operating locks, so this distance is not necessarily tightly controlled. The nominal tip-to-shoulder distance is not accurate enough to use as an offset to convert tip-referenced measurements to shoulder-referenced measurements. It is used, however, to give a starting point for a shoulder finding algorithm.

To find the shoulder, the width gradient is computed every one hundredth of an inch (0.010") over a range that is one tenth of an inch (0.1"), or more preferably two tenths of an inch (0.2") around the nominal shoulder location. This width gradient array is then searched for the position of the maximum gradient. This position corresponds to the location where there is the largest step change in width, and should therefore correspond to the position of the shoulder. The bitting information is then determined using the distance from the shoulder forward toward the tip. For a tip gauged key, in contrast, the tip of the key is located on the image and the bitting information determined from the tip rearward toward the head.

The depth determination means determines the width of the master key at the first cut from the digitized image. It is easier to measure the width of the master key as opposed to measuring the depth of the cut, e.g., measuring the width of the material removed from the blade. If it is desired to use the depth of the cut in algorithms, then the depth can be calculated by subtracting the measured width of the key at a location without a cut from the measured width at the location of the cut. It is also contemplated to determine the depth of the cut by comparing information about a nominal width of a blade of the key stored in the memory means, instead of a measurement of the blade of the master key at a location without a cut. Thus, as one skilled in the art will appreciate, the information stored in the memory means and measured from the master key can be in terms of either depth of the cut or width of the blade at the location of the cut. The algebraic equations to convert between width and depth must also account for whether the key is single sided or double sided.

For double sided keys the cut depth or width measurement must compensate for any variations in cut depth from one side of the blade to the other. In other words, the system cannot assume that the original cuts are duplicated symmetrically with respect to the longitudinal reference axis of the master key. Therefore, the depth determination means must also establish the center line of the master key for double sided keys. This is performed by measuring one or both edges of the blade of the master key between the head and where the bitting begins, where the edges of the key blade should be straight and parallel to the center line. Once the center line of the key has been established, the cut depth measurements for each side are measured with respect to the center line.

The preferred embodiment of the present invention further comprises a conforming means for adjusting the width of the blade measured to an appropriate manufacturer's specified width. The actual depth of a cut on the master key can vary from the factory specified depth for a number of reasons. The key could be worn so that the cut depths, shoulder reference, and/or tip reference are no longer within factory specifications. The original key could have depth and spacing offsets caused by previous duplication on a prior art key duplication machine which used a feeler gauge to trace the original key. Keys duplicated by conventional feeler gauge type key tracing machines produce keys that are copies of the original. These prior art key duplicating devices produce copies that are at best as good as the original and typically introduce duplication errors in the depths and/or spacing of the key bitting.

To correct for key wear, measurement error, and previous duplication-error, the conforming means compares the width measured for the cut to a database of actual widths allowed for that particular blank. These specifications are, in general, different for each blank type. One way of choosing a factory specified value is to substitute the measured value with the closest nominal value. The algorithm can be based on the assumption that the master key was originally cut correctly, and the cause for any deviation from the nominal value is caused by user. It is, therefore, desirable to bias for error in the direction of a narrower key, as would be caused by wear. Choosing a cutoff between nominal values that is somewhat narrower than halfway between implements this strategy. If a measured value is significantly larger than the largest nominal width or significantly narrower than the narrowest nominal width, then the key can be assumed to be cut improperly, worn beyond usefulness, or improperly identified. In such a situation, the output subsystem 14 can signal the operator to abort the process to avoid making a bad key.

After the width of the key at the location of the cut has been conformed to the key manufacturer's specification, the computer subsystem 16 determines the cut information for the next bit by measuring the width of the key at the appropriate distance, which is also stored in the database, e.g., the manufacturer's longitudinal specified distance between cuts. The process repeats to obtain the entire bitting pattern along the length of the key. Thus, the machine 10 scans the appropriate locations to find the cuts on the blank, and, based on a comparison between the width of the key at the location of the cut on the original key and the specifications in the memory subsystem, determines the depth the cut to be made on the blank. All this information is transferred to the cutting algorithm. After the process is completed, the output subsystem 14 communicates to the operator that the master key has been scanned.

As an example, the first cut on a KW1 shoulder gauged key will appear at 0.247 inches forward of the shoulder based on the key manufacturer's data. At that point, the computer subsystem 16 evaluates the width of the master key that was scanned. The seven standard widths for the KW1, in inches, are as follows: 0.190, 0.213, 0.236, 0.259, 0.282, 0.305, and 0.328. Thus, the width increments increase 0.023 inches each time. Thus, assuming that the measured width of the first cut was 0.256, the algorithm would convert the actual measured width to the standard width of 0.259. The next location to measure the width of the master key, based on the manufacturer's information, is 0.397 inches forward of the shoulder. Assuming that the measured width at the next cut was 0.293, this would be about half way between two values, 0.282 and 0.305. Since the preference is to use the shallower cut to account for use, the algorithm would select 0.305 as the width to cut the key blank to regenerate the master key. The process would repeat for the other cuts, which are 0.547, 0.697, and 0.847 inches forward of the shoulder, the distances increasing in increments of 0.150 inches.

A problem can arise when using this method of measuring the bitting information when a deep cut overlaps an adjacent shallow cut. Each cut extends a predetermined distance along the length of the key. Ideally, there is a continuous edge forming the bottom of the cut that extends along this predetermined distance and measuring the width in the center of the cut should give the correct depth. However, often the combination of a deep cut adjacent a shallow cut will remove a portion of the material of the blade forming the edge of the shallow cut so that the shallow cut does not extend its entire predetermined distance. In fact, a portion of the material of the "center" of the shallow cut may have been removed when cutting the deeper cut and measuring the width of the key at this location could result in an erroneous cut depth. To accommodate these special cases and prevent erroneous measurements, the width of the key at the location of the cut is measured across the predetermined distance of the cut to determine which cut geometry exists and, therefore, determine which position represents the actual depth of the cut.

Once the nominal widths that are to replace the measured widths are determined, they are passed to the cutting algorithm to "regenerate" the key. Where bitting factory specifications for a given blank are not available or where multiple bitting specifications are used for a given key blank, the key will be duplicated by measuring the width on the key every one hundredth of an inch (0.010") from shoulder to tip for shoulder gauged keys or from tip back to head for tip gauged keys. The width information will be passed to the cutting algorithm that will "duplicate" the key.

For reducing the complexity of computer programming, an option is to use a single loop in which all of the key analysis algorithms are performed. That is, the algorithms for determining the type of key using backlighting and the light beam, as well as obtaining the bitting pattern, can be programmed to occur every time that the key image is captured. This is in contrast to the method described above, in which one loop determines the type of key using backlighting and the light beam, the operator verifies the key match, and then another loop determines the bitting information, although it uses some of the same modules or processes of programming code.

CUTTING PROCESS

Key Blank Alignment

After completing the bitting analysis, the key blank is ready to be cut to reproduce the bitting pattern captured from the silhouette of the master key. When the operator responds to the prompt on the output subsystem 14 to continue after the bitting pattern has been scanned, the cutting and aligning components move into position to accept the key blank for cutting. To cut the key accurately, the machine 10 must position the key blank at a known location relative to the cutting wheel or wheels, depending on whether the master key is a single sided or a doubled sided key, respectively. Aligning the components to the initial positions in the presently preferred embodiment to accept the key blank takes approximately ten (10) seconds, and the output subsystem 14 displays a message to please wait while initialization occurs. It is also contemplated to initialize the components and to scan the bitting information from the master key concurrently to shorten the time that the process requires.

When the operator responds to the continue prompt, the computer subsystem 16 directs each of two alignment jaws 50, which are shown in FIGS. 3 and 12–15 to a predetermined position. The function of the alignment jaws 50 is to align a longitudinal reference axis of the key blank so that it is at a known position to be cut. For single sided keys as shown in FIG. 1A, the longitudinal reference axis LR of the key blank is the edge of the key that will not have the bitting pattern cut therein. The alignment jaws 50 ensure that this edge of the key blank is at a known position. For a double sided key, the reference axis is in the center of the blade. Conventional key duplication processes use the opposite edge from the one being cut as the longitudinal reference axis and, accordingly, both edges are used as the reference axis at different times. The present invention considers the central longitudinal axis of the key blank as the reference axis instead of using two reference axes for one key.

Figure 12:
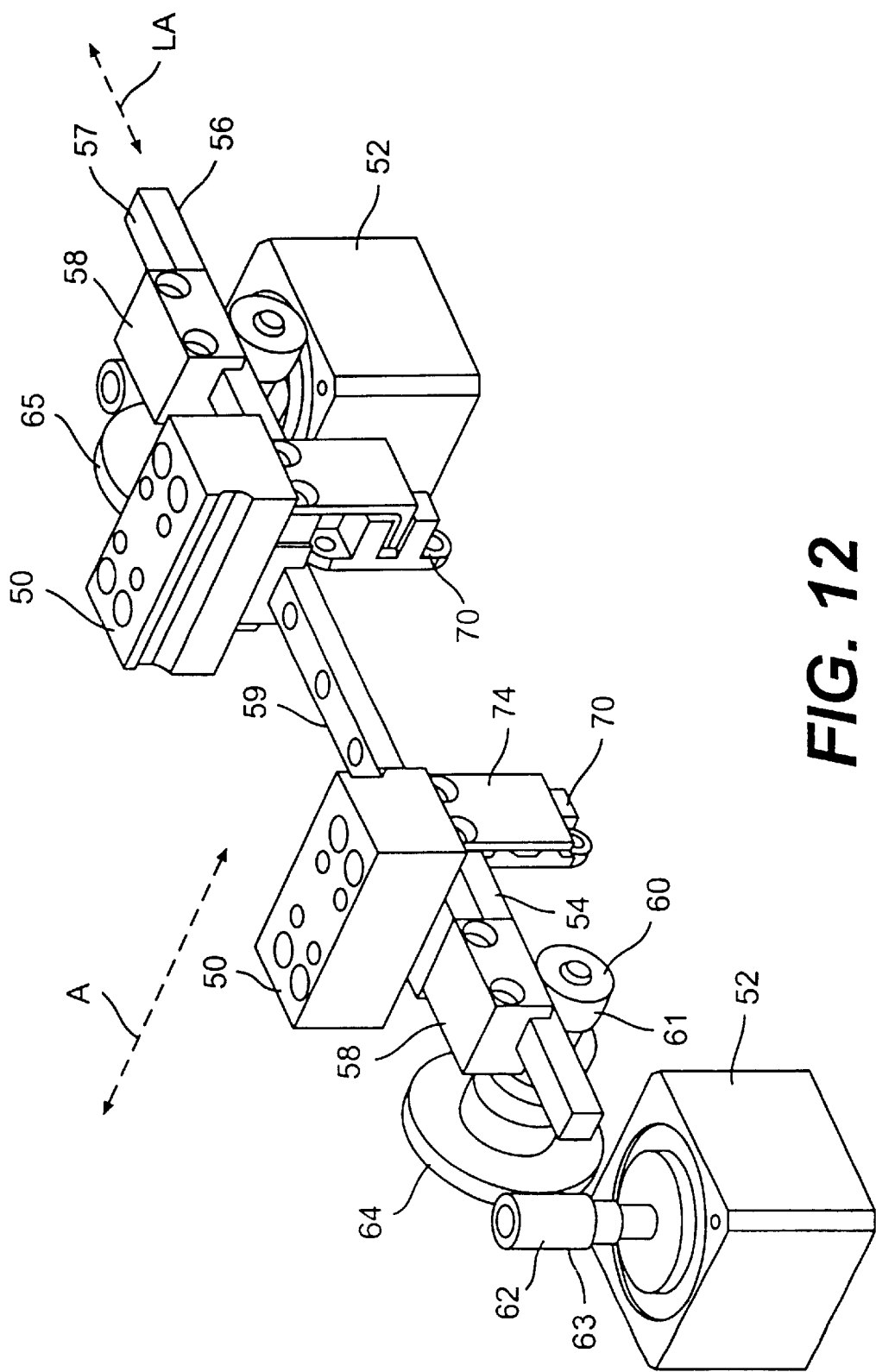
FIG. 12 is a front perspective view of a first embodiment of the moving means for the alignment jaws of the present invention.

The alignment jaws 50 are movable relative to each other and to an alignment axis A of the machine by a moving means. The alignment axis A, shown in FIG. 12, is an axis in the machine 10 along which the longitudinal reference axis of the key blank is aligned so that the reference axis of the key is substantially parallel to or co-linear with the alignment axis A. Thus, the key blank will be positioned at a known location relative to the alignment axis A for cutting.

Figure 14:
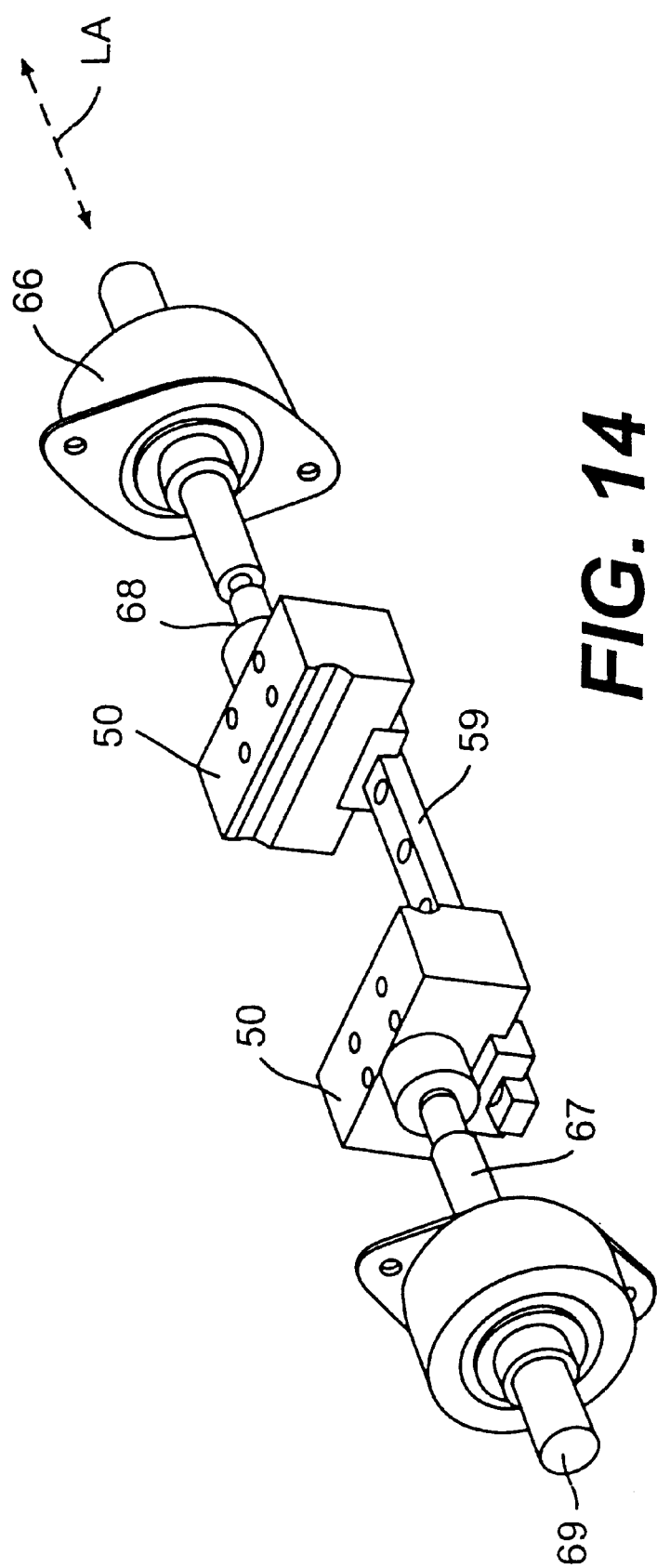
FIG. 14 is a front perspective view of a second embodiment for the moving means for the alignment jaws of the present invention.
Figure 15:
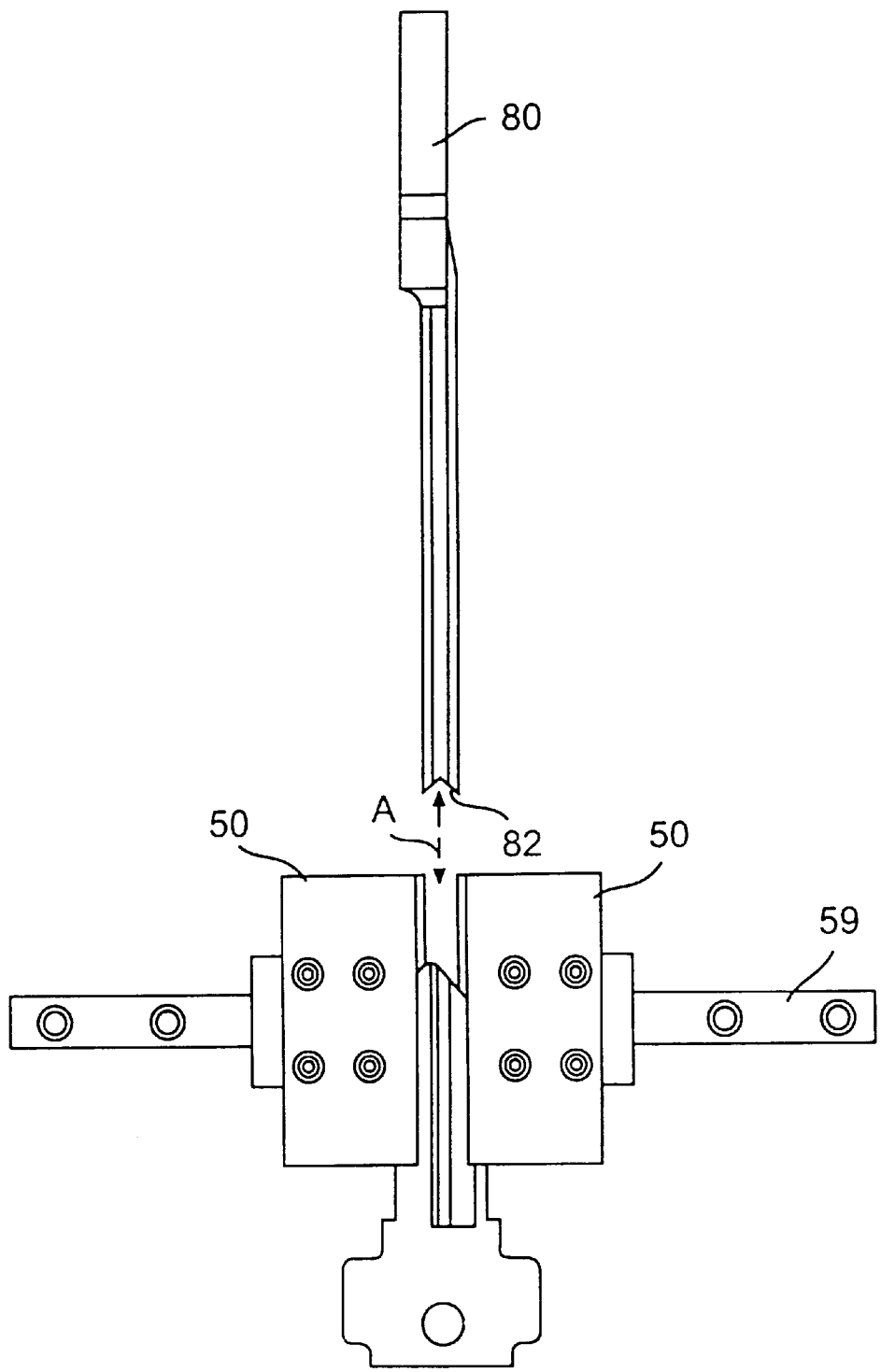
FIG. 15 is a top plan view of a single sided shoulder gauged key disposed between the alignment jaws and the tip alignment mechanism in an inoperable position.

The moving means moves at least one of the alignment jaws 50 and, preferably, there are two moving means, one for each alignment jaw 50. The alignment jaws 50 move between an engaged position and a disengaged position. In the engaged position, the alignment jaws 50 are spaced apart from each other a desired separation distance so that each alignment jaw 50 contacts at least a selected portion of a respective edge of the key blank when the key blank is disposed therebetween, which is shown in FIG. 15. In the disengaged position, the alignment jaws 50 are spaced apart from each other farther than the desired separation distance, which is shown in FIGS. 12 and 14. As one skilled in the art will appreciate, the computer subsystem 16 can be programmed with an appropriate predetermined position for each key blank in which the alignment jaws 50 are in the engaged position and the longitudinal reference axis is properly oriented relative to the alignment axis of the machine 10.

Figure 16:
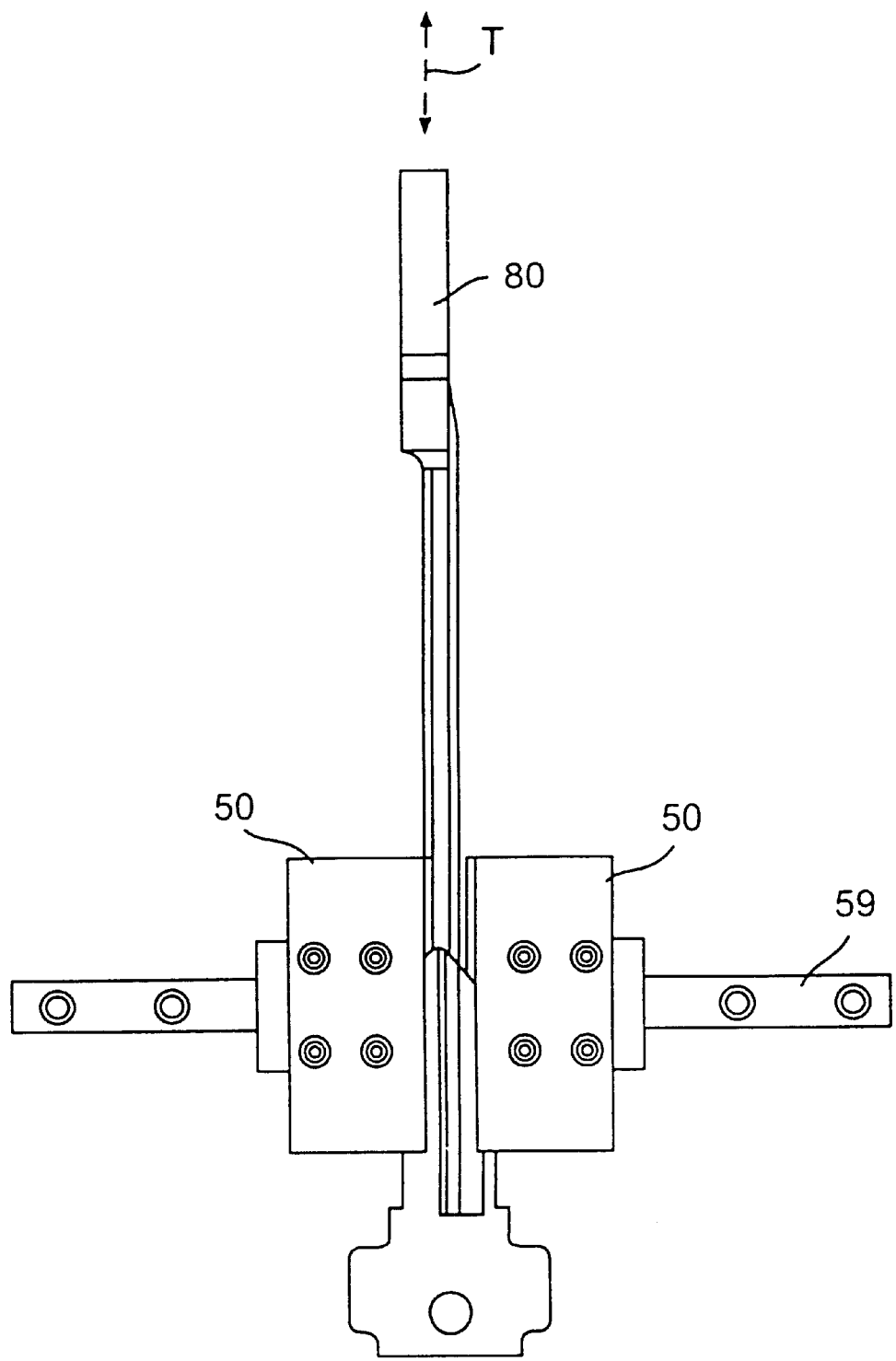
FIG. 16 is a top plan view of FIG. 15, in which the tip alignment mechanism is in an operable position and the tip of the key blank is disposed on the tip axis of the machine.
Figure 17:
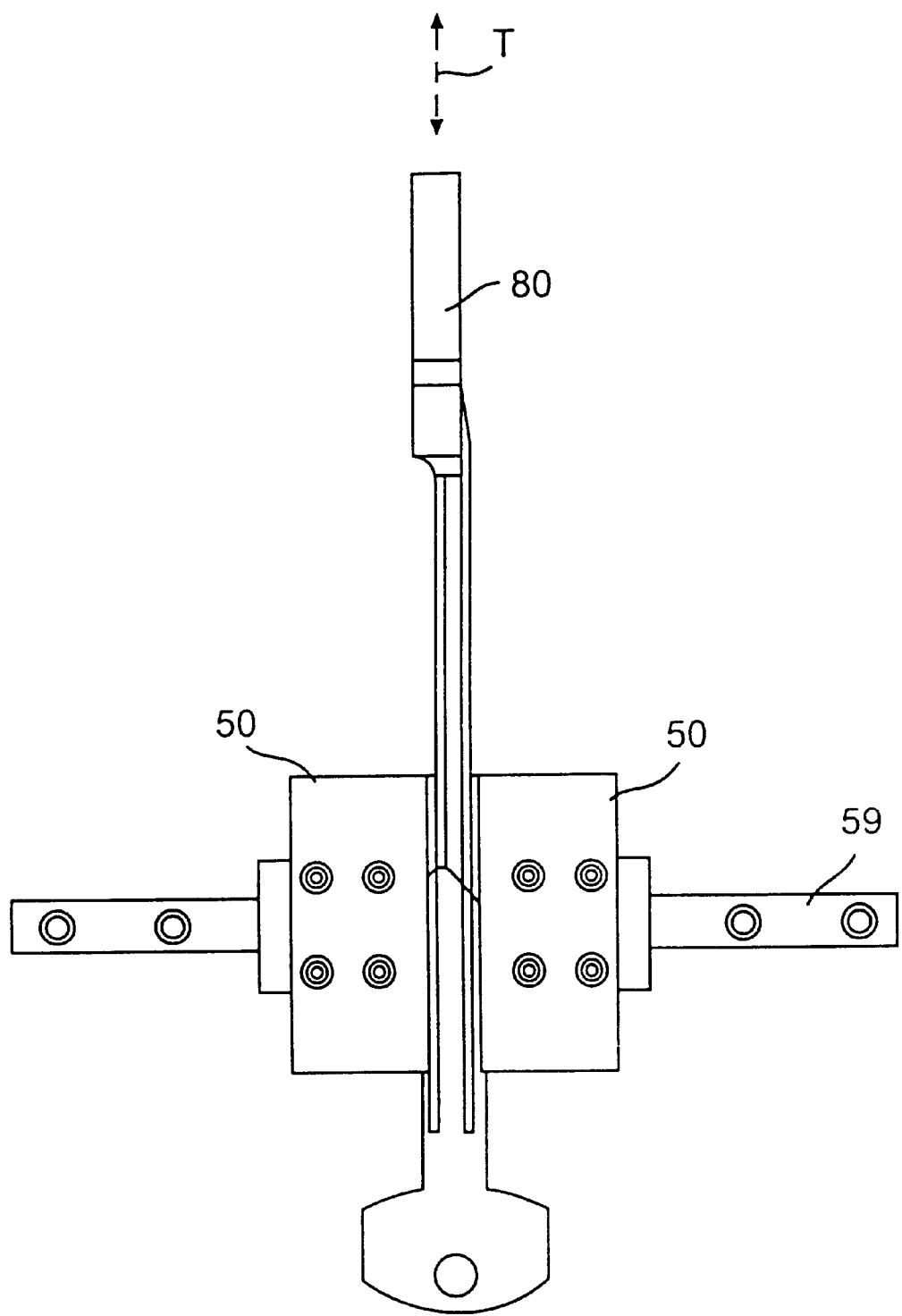
FIG. 17 is a top plan view of a double sided shoulder gauged key disposed between the alignment jaws and the tip alignment mechanism in the inoperable position.

When the alignment jaws 50 are in the engaged position and the tip of the key blank disposed therebetween is positioned along the alignment axis A, the alignment axis can be referred to as the "tip axis." That is, the alignment axis is called the tip axis T when the tip of the key blank is disposed along it, which is shown, for example, in FIGS. 16 and 17. In comparison, the tip of the key blank in FIG. 15 is offset from the alignment axis A, so the alignment axis A is not the tip axis in this situation. As discussed below, the tip alignment mechanism, when used, travels along the tip axis T to engage the tip of the key blank.

The predetermined positions of the alignment jaws 50 are different relative to the tip axis for two different key blanks having the same blade width in which one key is symmetrical and the other is asymmetrical. For a first, symmetrical tip gauged key blank, the tip of the key blank is disposed along the longitudinal reference axis which runs through the center of the blade. This is shown in FIG. 17. Thus, the alignment jaws 50 are both spaced apart an equal distance from the tip axis at their respective predetermined positions so that the longitudinal reference axis and the tip of the key blank are disposed along the tip axis T. A second key blank, in comparison, is asymmetrical because the tip of the key blank is offset from the central longitudinal axis of the blade. For the second key, the tip of the key blank is still disposed along the tip axis T of the machine 10, but the central longitudinal axis of the key blank is offset, although substantially parallel, to the tip axis T. This is shown in FIG. 16. Thus, the alignment jaws 50 for the second key are each spaced apart a different distance from the tip axis, unlike the position of the alignment jaws 50 when supporting the first key blank. The present invention allows this to occur since each of the alignment jaws 50 are independently movable.

One of the alignment jaws 50 can also be used for positioning a shoulder gauged key blank at a desired position within the machine 10, e.g., at a predetermined position relative to the machine 10 once the longitudinal reference axis of the key is aligned, which is shown in FIG. 15. In addition, as discussed below, a tip alignment mechanism can also be moved for properly positioning the selected key blank, usually tip gauged keys that lack a shoulder, at the predetermined distance within the machine 10, which is shown, for example, in FIG. 18. FIG. 17 shows another contemplated variation in which the tip alignment mechanism is used with a shoulder gauged key.

The moving means for each alignment jaw 50 preferably comprises a motor 52, a means for coupling the motor 52 to the respective alignment jaw, and a means for energizing the motor 52 for a predetermined output based upon the dimension of the key blank so that the desired separation distance between the alignment jaws 50 is obtained. The motor 52 preferably is a stepping motor.

Figure 13:
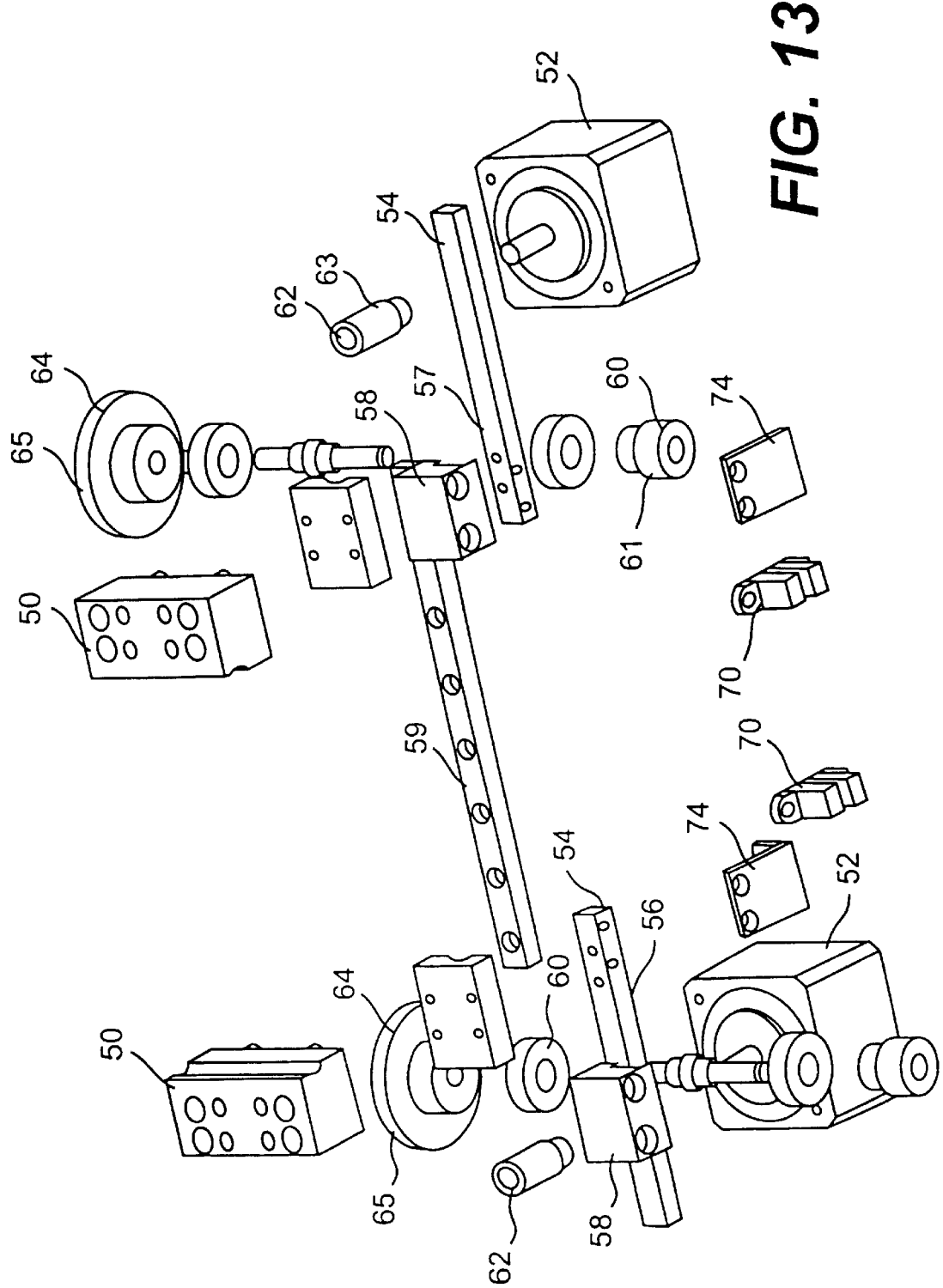
FIG. 13 is an exploded perspective view of FIG. 12.

In one embodiment shown in FIGS. 12 and 13, the coupling means comprises a rack 54, a support member 58, and a pinion 60. The rack 54 is fixedly attached to a portion of the alignment jaw 50 and has a longitudinal axis LA, a lower side 56 defining a plurality of gear teeth (not shown) therein, and an opposite upper side 57. A support member 58 is slidably engagable with the upper side 57 of the rack 54. The portion of the support member 58 that contacts the rack 54 preferably is formed of "Teflon"®. The preferred embodiment can also use a rail 59 to maintain alignment of the rack 54 and ensure linear motion along its longitudinal axis LA.

The pinion 60 has an axis of rotation and a periphery 61 that defines a plurality of gear teeth (not shown) therealong. The gear teeth of the pinion 60 matingly engage with the gear teeth of the rack 54. When the energizing means energizes the motor 52, the motor 52 rotates the pinion 60 about its axis of rotation so that the rack 54 is moved in a selected direction along its longitudinal axis LA as the gear teeth of the pinion 60 intermesh with the gear teeth of the rack 54.

The moving means also further comprises a means for preventing longitudinal movement of the rack 54 when the motor 52 is de-energized. That is, the moving means is self-locking, which allows smaller motors with lower holding torque to be used so that the alignment jaws 50 remain in position when a force is applied, e.g., if the operator improperly inserts the key blank at an angle so that a force is applied to the alignment jaws 50 that would tend to force them from their proper positions. For a configuration that is not self-locking, in contrast, the forces placed on the alignment jaws 50 can be greater than the holding torque of the motors, which could result in the key blank being forced out of its known position while being inserted.

One embodiment of self-locking system shown in FIGS. 13 and 14 uses a worm 62 which engages a gear 64. The worm 62 has an axis of rotation and a lower end coupled to a portion of the motor 52 so that when the motor 52 is energized, the worm 62 rotates about its axis of rotation. The worm 62 also has an outer surface 63 defining a circumscribing groove (not shown) therein. The gear 64 has peripheral edge 65 defining a plurality of gear teeth (not shown) therein, in which each of the gear teeth is of a size to be complementarily received in the groove of the worm 62. Rotation of the worm 62 causes the gear 64 to rotate about its axis of rotation as the gear teeth of the gear 64 interface with the groove of the worm 62. This embodiment also comprises a means for movably coupling the gear 64 to the pinion 60 so that rotation of the gear 64 about its axis of rotation causes the pinion 60 to rotate about its axis of rotation. As one skilled in the art appreciates, when a force is placed on the alignment jaws 50 directed along the longitudinal axis LA of the rack 54, the force is directed against the gear 64 and thus the worm 62. Since the respective axes of rotation of the worm 62 and the gear 64 are perpendicular to each other, the force does not translate into torque on the motor 52, but, instead, a force against the connection between the worm 62 and the motor 52. A conventional alignment, in contrast, would receive the force translated into a torque because the force acts along the axis about which the motor rotates. Thus, when the worm 62 steps the alignment jaw 50 into position, it remains locked when it is de-energized.

In another embodiment shown in FIG. 14, it is contemplated using a self-locking stepping motor known as a linear motor 66 or high-resolution electric linear actuator. Such motors are manufactured, for example, by Haydon Switch & Instrument, Inc., Waterbury, Conn. The electric linear actuator has a linear output when energized and movably engages a rod 67 which has a longitudinal axis LA, a first end 68 and an opposite second end 69. The first end 68 of the rod 67 is fixedly attached to the alignment jaw. A portion of the rod 67 intermediate the first and second ends 68, 69 is threaded (not shown) so that when the motor 66 is energized, the rod 67 moves longitudinally. The internal gearing design of the linear actuator ensures that it is self-locking since a longitudinal force on the rod 67 will not cause the motor 66 to turn.

The preferred energizing means encompasses the computer subsystem 16 directing a predetermined amount of electrical energy to the motor 52 for a desired time so that the motor 52 moves the alignment jaw 50 a desired distance in the selected direction. In the preferred embodiment, the electrical energy is conveyed as a stepping signal. The signal can be a pulse width modulation signal. The motor can also be controlled by varying the current and voltage or other means known in the art.

The present invention further comprises a means for detecting when the respective alignment jaw 50 is at a home position, which is laterally outward from the tip axis, as shown in FIG. 12. The home position serves as a known starting point from which the position of the alignment jaws 50 can be accurately calculated. From the home position, the computer subsystem 16 controls and calculates the position of the alignment jaw 50 by energizing the motor 52 via the stepping signal for a desired time.

The detecting means in one embodiment of the present invention comprises a photo switch 70 disposed adjacent the rack 54 and having an optical sensor (not shown) that generates an electrical signal, a photo-switch plate 74, and a means for communicating the electrical signal from the optical sensor of the photo switch 70 to the energizing means. The photo-switch plate 74 is fixedly attached to a portion of the rack 54 so that the photo-switch plate 74 moves as the rack 54 moves. When at least a portion of the photo-switch plate 74 moves in front of the optical sensor of the photo switch 70, the optical sensor generates the electrical signal which the communicating means relays to the energizing means, which is the computer subsystem 16 in the preferred embodiment. The signal notifies the computer subsystem 16 that the alignment jaw 50 is located at the home position.

The detecting means components shown in FIGS. 12 and 13 can also represent like components in another embodiment of the detecting means using a magnetic sensor instead of an optical sensor. The magnetic sensor design is similar to the optic detecting means except that the switch has a magnetic sensor that generates an electrical signal and a magnet, instead of a photo-switch plate, is fixedly attached to a portion of the rack 54. When at least a portion of the magnet moves in front of the magnetic sensor of the switch, the magnetic sensor generates the electrical signal that is communicated to the computer subsystem 16.

The embodiment shown in FIG. 14 using a linear motor 66 can be obtained with 30 an integral home position sensor (not shown) built into it. As one skilled in the art will appreciate, this embodiment is simpler than purchasing a conventional motor 52, a worm 62, and gear 64, adding a home position sensor to the rack 54, and configuring these components.

For initializing the alignment jaws 50 in the key cutting process, the first step is for the computer subsystem 16 to move each of the alignment jaws 50 to its respective home position via a stepping signal. The computer subsystem 16 detects the location of the alignment jaws 50 when they reach their respective home position by the detection means. At that point, the computer subsystem 16 directs the motor 52 to move the rack 54 in the opposite direction to the predetermined position for the key blank. Since the steps per inch conversion for the stepping motor is programmed, the computer subsystem 16 calculates the number of steps required to move each alignment jaw 50 to its predetermined position for the specific key blank. In the embodiment with the linear actuator, the ratio is 2000 steps per inch. The present embodiment accurately assumes that the steps per inch is constant over the short movement distance.

The preferred embodiment, accordingly, does not require continual positional feedback. Stated differently, each of the alignment jaws 50 starts at its known home position, the computer subsystem 16, having the steps per inch programmed, provides a signal to move the alignment jaw 50 a selected number of steps so that the location is proper to accept the identified key blank. The preferred embodiment of the alignment jaws 50 thus reduces costs because continuous positional feed back is more expensive.

Shoulder gauged keys and the tip gauged keys usually require different treatment to ensure correct positioning for cutting. For a shoulder gauged key blank, the predetermined positions of the alignment jaws 50 result in a separation distance in which when the key blank is pushed into the machine 10 along the alignment axis, the shoulder contacts the edge of one selected alignment jaw 50 to stop the key from being inserted further as shown in FIGS. 15 and 17. Thus, the key blank is inserted a known position into the machine 10 and relative to the alignment axis A.

Figure 18:
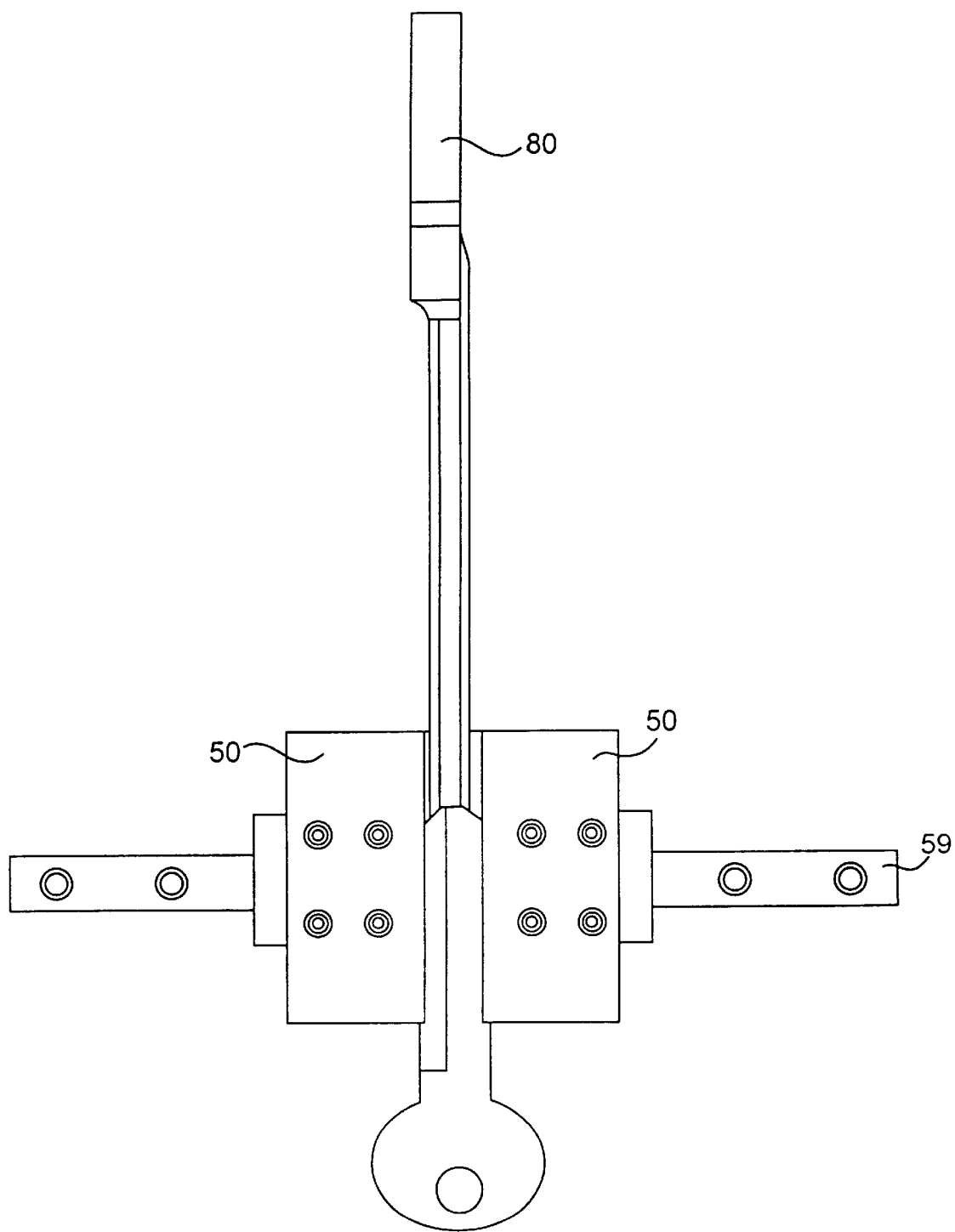
FIG. 18 is a top plan view of a double sided tip gauged key disposed between the alignment jaws and the tip alignment mechanism in the operable position.

For positioning a tip gauged key, the alignment jaws 50 are also used to align the longitudinal axis of the key blank along or parallel to the tip axis. Since, there is no shoulder on a tip gauged key blank to contact the alignment jaw, the present invention also preferably comprises a tip alignment mechanism 80 that is movable along the tip axis and a means for moving the tip alignment mechanism 80. The tip alignment mechanism 80 is shown in FIGS. 15–19 and 21. Similar to the alignment jaws 50, the energizing means energizes the tip alignment mechanism moving means to move the tip alignment mechanism 80 to be positioned in either an operable position or an inoperable position. In the operable position, the tip alignment mechanism 80 contacts or engages the tip of the key when the key is disposed between the alignment jaws 50, which is shown in FIGS. 16–18. In the inoperable position shown in FIG. 15, the tip alignment mechanism 80 is spaced apart from the tip of the key when the key is disposed between the alignment jaws 50.

Figure 19:
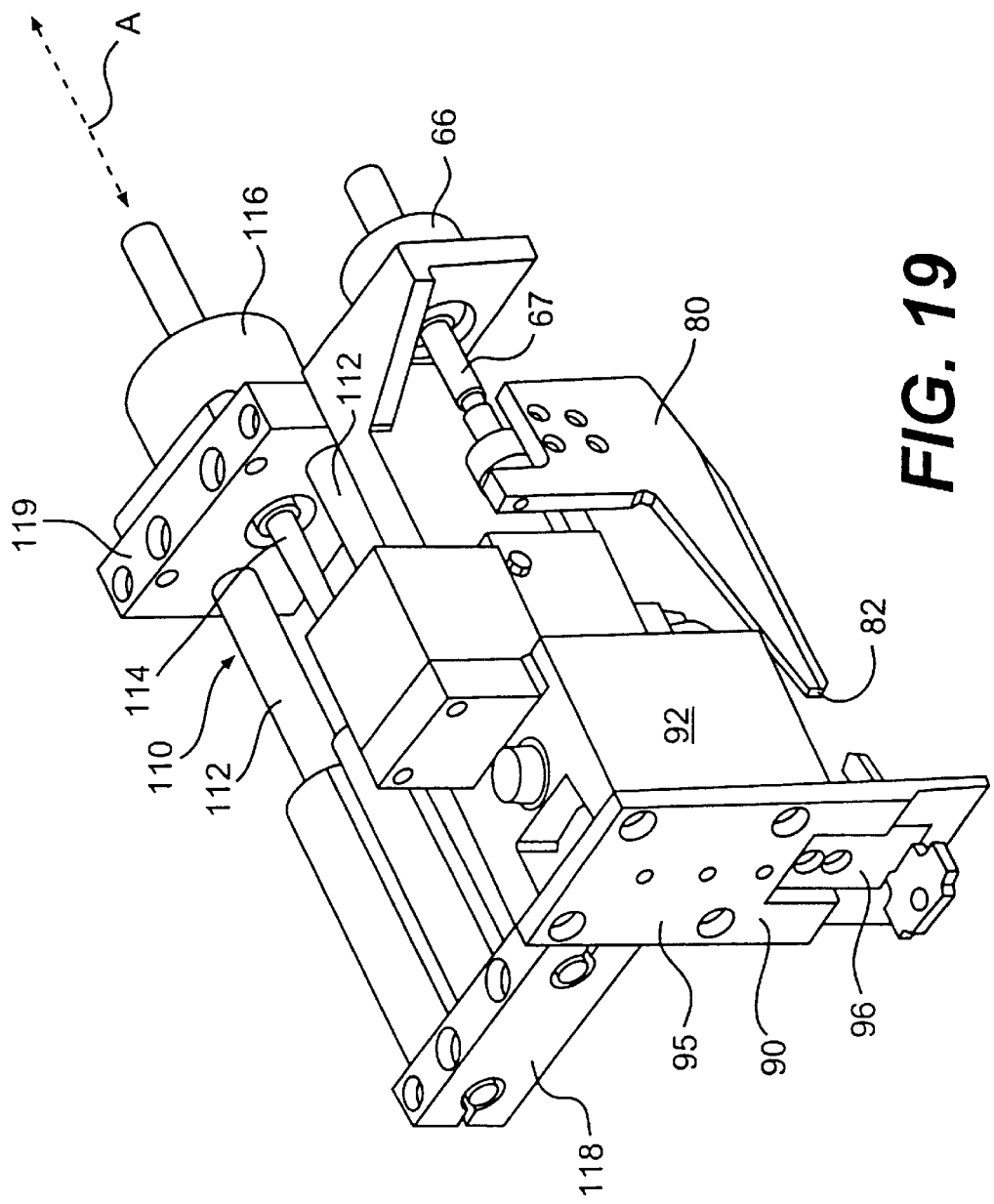
FIG. 19 is a perspective view of a gripper, tip alignment mechanism, and carriage of the present invention, in which the gripper is in a closed position and holding a key blank.

The moving means for the tip alignment mechanism 80 comprises a motor 52 and a means for coupling the motor 52 to the tip alignment mechanism 80. The energizing means, as with the alignment jaws 50, energizes the tip alignment mechanism moving means for a predetermined output based upon the dimension of the key. Preferably, the moving means for the tip alignment mechanism 80 can be the same as that used for the alignment jaw. Referring to FIG. 19, like parts of the moving means for the alignment jaw 50 and tip alignment mechanism 80 have like reference numerals. Thus, the primary difference between the tip alignment mechanism moving means and the moving means for the alignment jaws 50 may be that the rod 67 to which the tip alignment mechanism 80 is attached is oriented substantially perpendicular to the rods 67 for the alignment jaws 50.

The tip alignment mechanism 80, similar to the alignment jaws 50, also preferably comprises means for detecting when the tip alignment mechanism 80 is at a home position, from which position the computer subsystem 16 controls and calculates the position of the tip alignment mechanism 80. The detecting means, again, can be the same embodiment used for the aligning jaws. The tip alignment mechanism home position is a location on the tip axis that preferably the tip alignment mechanism 80 reaches when it is disposed farthest away from the axes along which the alignment jaws 50 move. The tip alignment mechanism 80 is shown at its home position in FIG. 19.

When the operator responds to the prompt that initializes the components for positioning the key blank, the tip alignment mechanism 80 moves to its home position. The detection means signals the computer subsystem 16 when the tip alignment mechanism 80 reaches that position. If the tip alignment mechanism 80 is to be used in the positioning or cutting processes, the computer subsystem 16 directs the motor 52 to move the tip alignment mechanism 80 in the opposite direction to the predetermined position for the key blank using the steps per inch conversion for the stepping motor. The length of the key blank is programmed in the computer subsystem 16, just as the width is for moving the alignment jaws 50 to their respective predetermined positions. When the tip alignment mechanism 80 is at its predetermined position, the tip alignment mechanism 80 stops the key blank at a known position when the key tip engages the tip alignment mechanism 80 as the operator inserts the key blank. This is shown in FIG. 18. The tip alignment mechanism 80 has a substantially "V" shaped indention formed in its end 82, which is adapted to complementarily receive the tip of the key blank therein. The "V" shaped end can also be used to prevent the key from deflecting during cutting, which is discussed below.

In the preferred embodiment, the tip alignment mechanism 80 is not used for positioning shoulder gauged keys; instead, as discussed above and shown in FIGS. 15–17, a portion of the shoulder engages a portion of the alignment jaw 50 when the key is inserted for positioning. Such a variation of using the tip alignment mechanism 80 with a shoulder gauged key as shown in FIG. 16, is a contemplated alternative embodiment.

Securing the Key Blank

A means for firmly and securely holding the key blank is used in the preferred embodiment. Because the significant forces placed on the key while cutting it, a portion of the head and/or the top portion of the blade (shank) of the key blank must be placed into a vice, called a gripper 90. The gripper 90 shown in FIGS. 3 and 19–21 comprises a support member 92 mounted to the machine 10, a first jaw 94 fixedly attached to the support member 92 and having a first engaging surface 95, and a second jaw 96 slidably connected to the support member 92 and having a second engaging surface 97. A rail 98 is also used to guide the second jaw 96.

The second jaw 96 of the gripper 90 is movable between a closed position and an open position. In the closed position, the first engaging surface 95 and the second engaging surface 97 either are spaced apart from each other a distance less than the thickness of the thinnest key blank or each contact one respective side of the key when the key is disposed therebetween, which is shown in FIG. 19. That is, in the preferred embodiment, the separation of the engaging surfaces is less than the thickness of the thinnest key blank instead of contacting each other, thus limiting the distance the second jaw 96 must travel. When in the closed position, the gripper 90 ensures that the key blank remains stationary during cutting relative to the gripper 90. The tip alignment mechanism 80 can also be used with the gripper 90 to ensure that the key does not deflect during cutting.

In the open position, the first engaging surface 95 and the second engaging surface 97 are spaced apart from each other so that the opposed sides of the key when disposed therebetween only contact a selected one of the first engaging surface 95 or the second engaging surface 97 at a time. Thus, the engaging surfaces 95, 97 are separated and do not grip the key when in the open position so that the key blank can be placed between or removed from the engaging surfaces 95, 97. As one skilled in the art will appreciate, the second jaw 96 could alternatively be pivotally mounted or otherwise coupled to either the support member 92 or the first jaw 94 and still move between the open and closed positions.

It is also preferred that a portion of the first engaging surface 95 of the first jaw 94 is non-planar and a portion of the second engaging surface 97 of the second jaw 96 is non-planar, in which the non-planar surfaces are adapted to frictionally hold a portion of the key therebetween when the second jaw 96 is in the closed position. More specifically, a portion the engaging surfaces 95, 97 are formed by two opposed hardened knurled surfaces that frictionally engage the key blank, thereby defining a channel that is adapted to accept the selected portion of the key blank. It is preferred to dispose a flat head of the key blank in the channel. However, some key blanks have rubber heads that would be deformed if disposed within the channel. In this situation, the channel must engage the top of the blade or head of the key blank.

Figure 20:
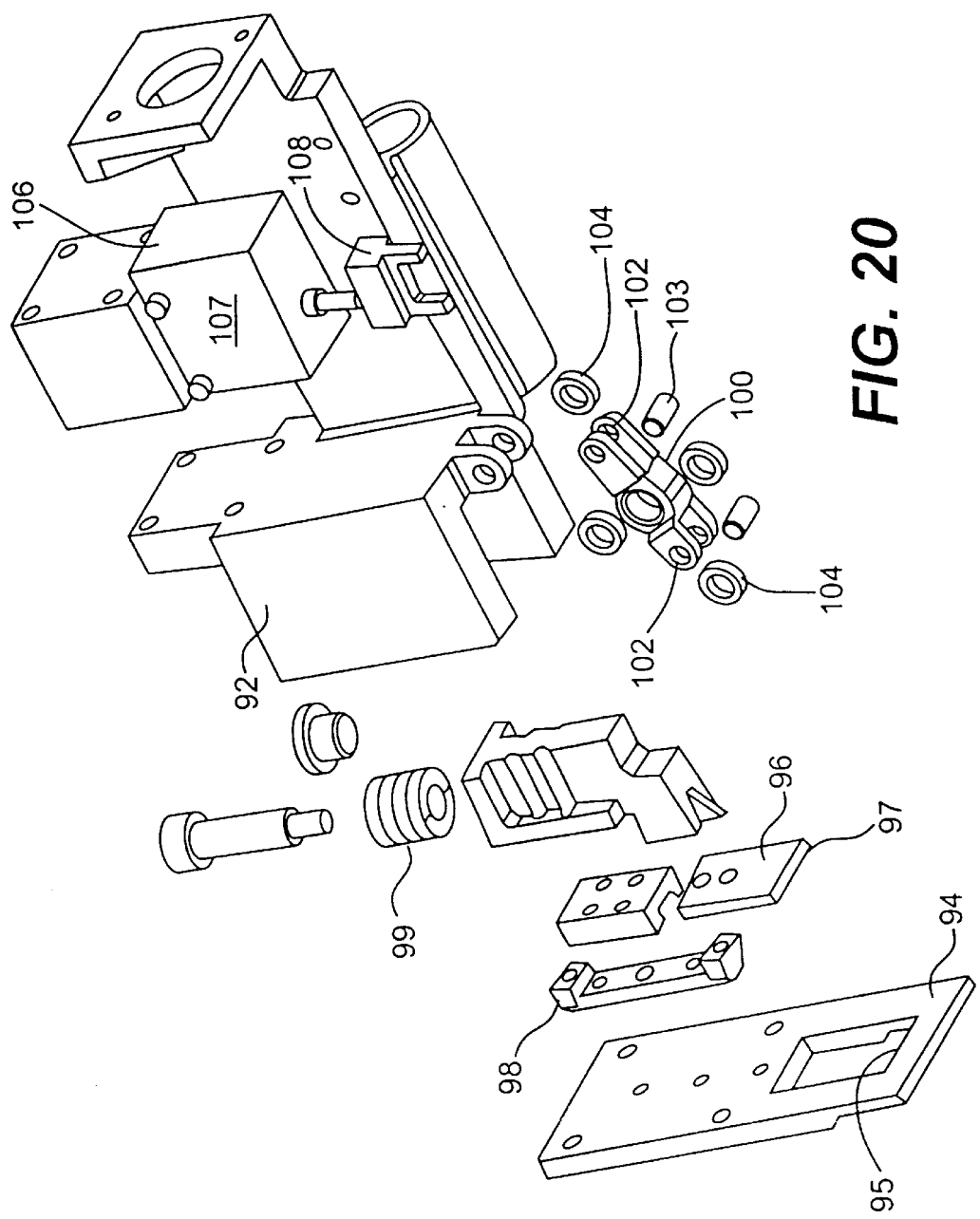
FIG. 20 is an exploded perspective view of the gripper in FIG. 20.

In the preferred embodiment, the gripper 90 also comprises means for biasing the second jaw 96 to the closed position and a means for generating a force for moving the second jaw 96 to the open position against the biasing means. That is, the gripper 90 is normally in the closed position as urged by the biasing means. As shown in FIG. 20, the biasing means preferably is a die coil spring 99, although other embodiments are contemplated such as a leaf spring (not shown), other types of springs (not shown), torque tube (not shown), and the like. The spring preferably applies a force of between 150 and 180 pounds to urge the second jaw 96 to the closed position, and more specifically 165 pounds in the preferred embodiment.

Figure 21:
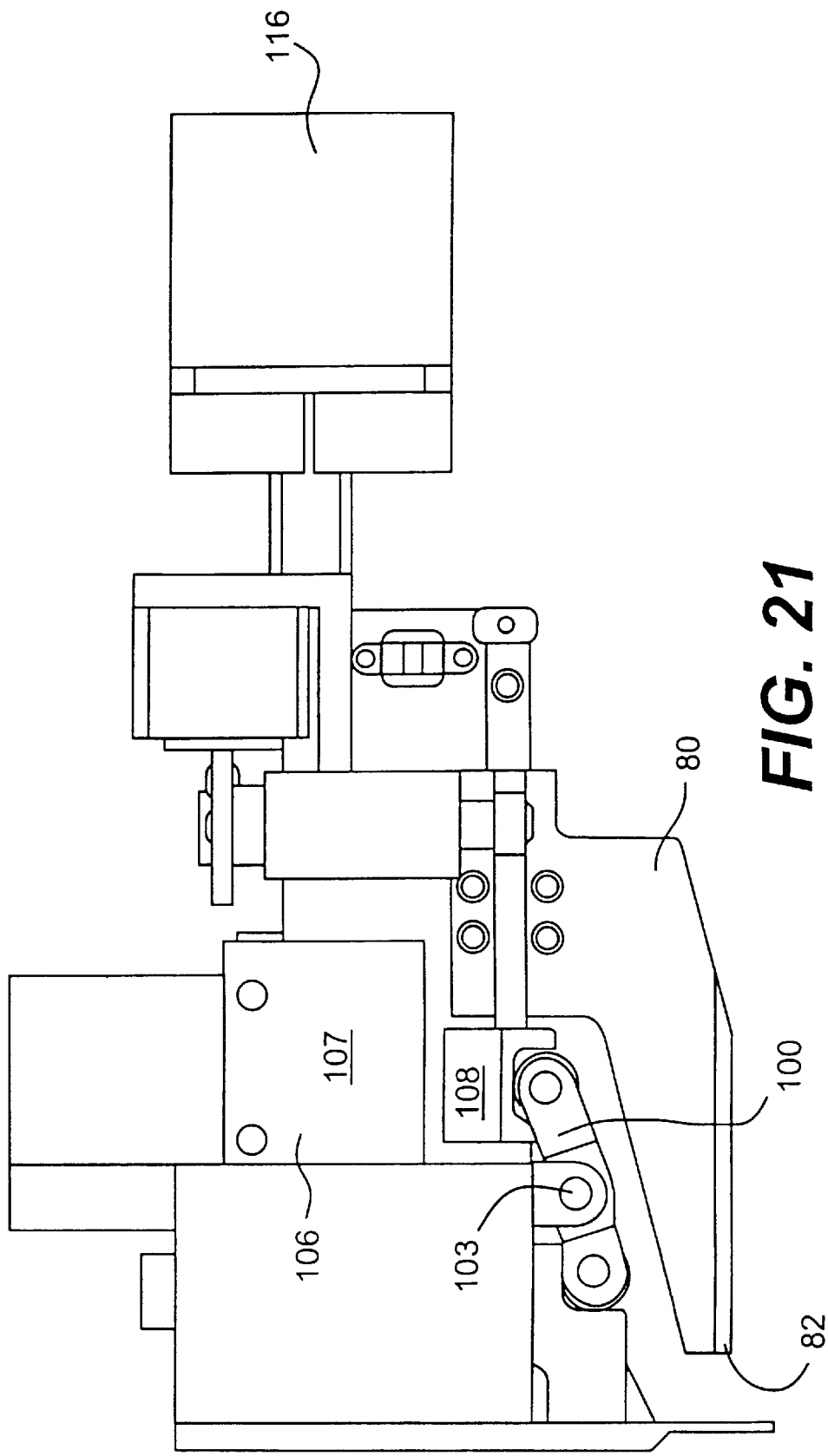
FIG. 21 is a side perspective view of FIG. 19, in which the gripper is in the closed position without holding a key blank.

A generating means is used to overcome the biasing means and move the gripper 90 to the open position. The gripper 90 also preferably comprises a means for pivotally translating the force of the generating means to the biasing means. Referring to FIGS. 20 and 21, the pivotal translating means in the preferred embodiment comprises a rocker arm 100 having two opposed ends 102. One end engages the second jaw 96 and the other end engages a generating means used to move the second jaw 96 to the open position. The rocker arm 100 also preferably comprises a means for pivotally mounting the rocker arm 100 to the support member 92. As shown in FIGS, 20 and 21, the rocker arm 100 is pivotally mounted to the support structure by a pivot pin.

Still referring to FIGS. 20 and 21, the generating means preferably comprises an actuator 106 having a body 107 and a piston 108 which is at least partially disposed within the body 107 and longitudinally movable therein and a means for pushing at least a portion of the piston 108 outwardly from the body 107 of the actuator 106. The pushing means generates a force translated through the piston 108 that pushes downwardly on one end of the rocker arm 100, which results in a substantially oppositely directed force from the other end of the rocker arm 100 to push the second jaw 96 to the open position against the force of the biasing means. When the piston 108 applies sufficient force, the second jaw 96 moves from the closed position to the open position.

In the preferred embodiment, the piston 108 is disposed further away from the pivot point of the rocker arm 100 than the connection to the second jaw 96. Accordingly, the piston 108 has a mechanical advantage to overcome the biasing means and to move ajaw of the gripper 90 upwardly, thereby opening the channel to accept a selected portion of the key blank therein. The preferred embodiment obtains a thirty-five percent (35%) mechanical advantage. Another aspect of the present invention is that, instead of physically connecting the piston 108 or the second jaw 96 to the rocker arm 100, they engage with the rocker arm 100 by rollers 104 mounted on the ends 102 of the rocker arm 100.

The preferred embodiment of the generating means uses a solid state thermal actuator, which is a linear actuator using polymer expansion to generate the output force, manufactured by TCAM in Cleveland, Ohio. The computer subsystem 16 directs an electric current to the actuator 106, which heats the polymer (not shown) to create the output force, specifically the piston 108 that moves outwardly from the actuator 106 as the polymer thermally expands. The voltage used is 120 volts pulse width modulated. Other contemplated embodiments of the opening means include other types of linear actuators such as a motor connected to a ball screw, a pneumatic, hydraulic, or electrical solenoid, and the like.

An alternative embodiment of the present invention uses a gripper that is normally in the open position and uses an actuator to close the gripper and hold the key blank during the cutting process. Although this alternative embodiment is feasible, the gripper biased to the closed position is preferred. One reason for this preference is that, instead of energizing the opening means for approximately fifteen seconds while placing the key in the normally closed gripper, the alternative designs would be energized at least thirty seconds to two minutes to hold the key during the cutting process. The power demand of such a design—lasting two to eight times longer than the preferred embodiment—requires more power and generates much more heat, especially for a thermal actuator. Overheating is a concern considering the many electronic components used in the preferred embodiment and their possibility of failure. Thus, the preferred embodiment provides a better solution by having the gripper biased to the normally closed position and applying a short, high power to the opening means for approximately fifteen seconds or less so that the key blank can be inserted. The present invention also applies a relatively constant force to the head of key blank over the life of the gripper, whereas other designs using an actuator or similar device, unbeknownst to the operator, could produce less force over time. Insufficient force could result in an improper cut onto the key blank, damage to the cutting mechanism, or both.

In use, the operator responds to the prompt on the output subsystem 14 to initialize the alignment jaws 50 and tip alignment mechanism 80. The alignment jaws 50 and tip alignment mechanism 80 each moves along its respective axis to the home position. The alignment jaws 50 then reverse movement and each move a predetermined distance so that the alignment jaws 50 are spaced apart a distance slightly greater than the width of the key blank. The tip alignment mechanism 80, however, may remain at the home position (usually for shoulder gauged keys) or, alternatively, move to its predetermined position to position the key blank properly and provide additional lateral support during cutting.

Once the initialization has occurred, the output subsystem 14 prompts the operator to press the continue response to open the gripper 90. It takes approximately five (5) seconds to open, during which time the output subsystem 14 requests that the operator please wait while the gripper 90 opens. The electrical current is directed to the thermal actuator to move the gripper 90 to the open position so that so that the operator can slide the key blank into the channel of the gripper 90. Once the gripper 90 opens, the output subsystem 14 displays a message to insert the key blank into the gripper 90. The gripper 90 remains open a predetermined time, which is sufficient for the operator to insert the key blank. The output subsystem 14 also generates a beep sound to signal the operator to insert the key blank.

The operator then inserts the key blank tip first into and through the gripper 90 until further insertion is not possible, e.g., the shoulder portion of the key blank contacts one of the alignment jaws 50 or the tip of the key blank contacts the tip alignment mechanism 80 shown in FIG. 19. If the key is a single sided, the operator is provided instructions to orient the key so that the correct side of the blade is aligned to be cut. When the operator prompts the machine 10 that the key has been inserted by responding to the continue prompt, the gripper 90 then closes, clamping the selected portion of the key blank between the jaw 94, 96. Thus, the key blank is firmly secured by the gripper 90 and the key blank is at a known position for cutting.

If after a predetermined time the operator fails to respond indicating that the key blank has been inserted, the machine 10 will automatically close the gripper 90 and prompt the operator either to request more time to insert the blank or direct the machine 10 to proceed. If the operator responds to the prompt for more time, the gripper 90 opens for the predetermined time again and the process repeats itself. The predetermined time is currently fifteen (15) seconds in the preferred embodiment, thus giving the operator sufficient time to insert the key while also preventing the gripper 90 from remaining open for an extended amount of time if the operator is distracted. The predetermined time can be changed, if desired; however, a finite time limitation is desired to prevent overheating any electronic components in the machine 10.

Once the operator responds to the continue prompt to close the gripper 90, the output subsystem 14 displays a message to wait while the key is duplicated. In another preferred embodiment, the computer subsystem 16 verifies that the key blank has been inserted, which can be accomplished by optical sensor, magnetic field sensor, an electrical continuity sensor, and the like. With this embodiment, the operator would not need to respond for the key cutting process to continue. This system could also prevent the operator from inadvertently signaling the key cutting process to proceed without a key blank positioned to be cut.

The next step is for the alignment jaws 50 to move laterally away from the key blank to an out of the way position, preferably to their respective home positions, after the key is gripped. Otherwise, the alignment jaws 50 would be blocking a portion of the blade of the key blank to be cut.

The tip alignment mechanism 80, in contrast, can remain engaged against the tip of the key blank. In fact, the tip alignment mechanism 80 may be necessary for some shoulder gauged keys as shown in FIGS. 16 and 17 because sometimes the top of the blade and/or head of this type of key does not have a surface area large enough to hold the key blank during cutting without deflections. Without a good gripping surface, the key blank tends to torque. The cutting forces are most pronounced when cutting adjacent the tip of the key blank, in which the resulting moment force, or moment arm, is largest. Thus, supporting the tip of the key with the tip alignment mechanism 80 best prevents this deflection.

KEY BLANK CUTTING

Figure 22:
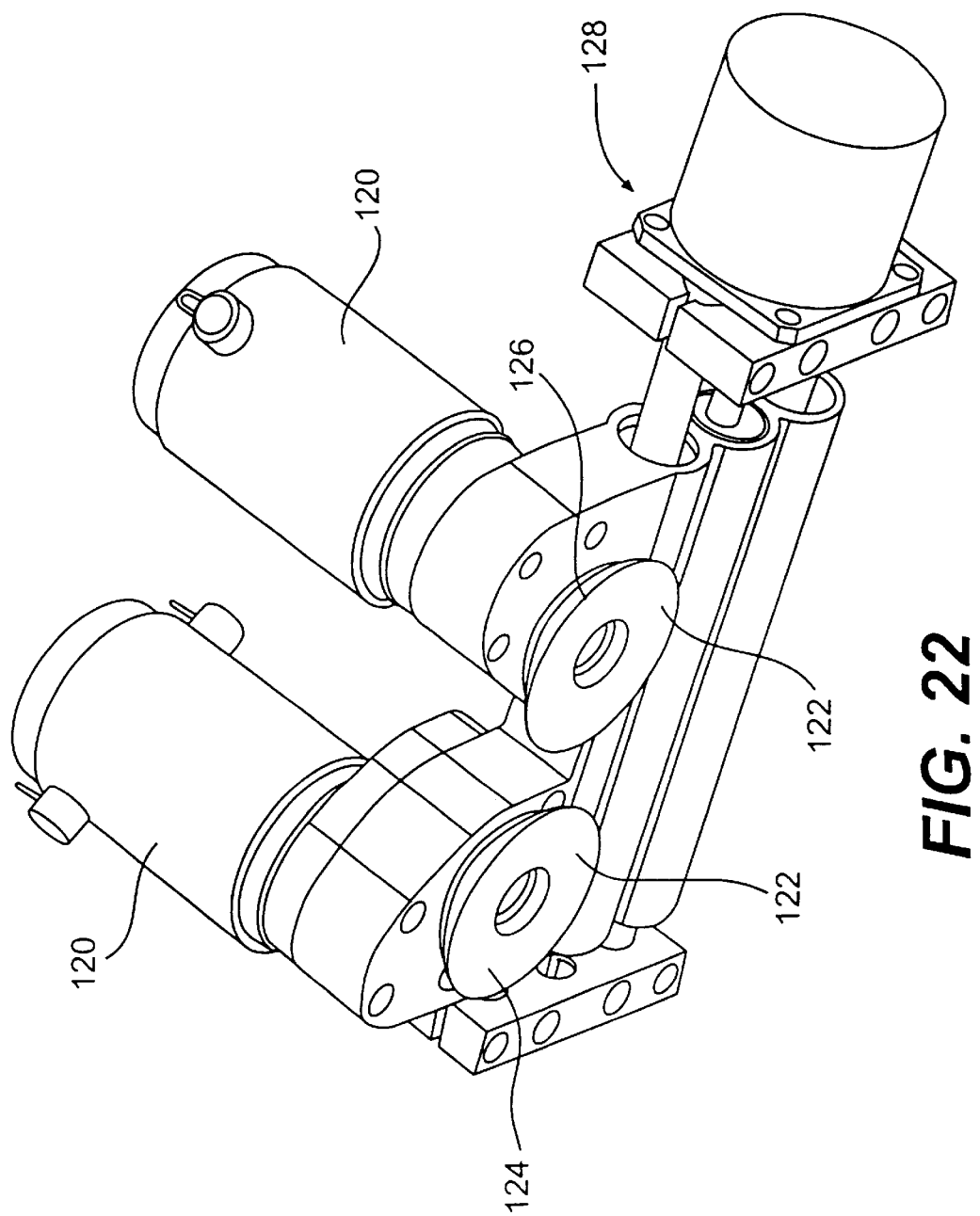
FIG. 22 is a perspective view of the cutter motors and associated carriage of the present invention.

Now referring to FIGS. 19 and 22, once the gripper 90 closes and the alignment mechanisms move laterally out of the way, the key will be pulled into the machine 10 by a carriage 110. That is, the tip alignment mechanism 80 and gripper 90 are supported on a carriage 110, which moves them within the interior of the machine 10. The gripper 90 and tip alignment mechanism 80 retain their relative position with each other as the carriage 110 moves them. The carriage 110 moves the key blank, gripper 90, and tip alignment mechanism 80 longitudinally along the alignment axis A of the machine 10.

The longitudinally-movable carriage 110 is carried on guide rods 112 which ride on linear bearings (not shown). As best shown in FIGS. 3 and 20, the guide rods 112 are secured at a forward panel 118 at the front of the machine 10 and at a rear panel 119 at an interior position within the machine 10. The carriage motor 116 is connected to a drive screw 114, which is threaded and received in a threaded opening of a nut (not shown) that is threaded into a portion of rear panel 119 at a threaded opening. As the carriage motor 116 rotates the drive screw 114 in a first direction of rotation, the carriage 110 is caused to move rearwardly through the threaded connection between the drive screw 114 and the threaded opening. When the carriage motor 116 is reversed, the carriage 110 is caused to move in a forward direction.

The next step is energizing a pair of cutting motors 120 so that the key blank can be cut, which are best shown in FIG. 22. The cutting motors 120 are known in the art and a detailed explanation is not included herein. As a brief overview, however, a cutter wheel 122 is carried on a rotating shaft (not shown) of the cutting motor 120. The cutter wheel 122 has a substantially flat or planar front face 124. The back face 126 of the cutter wheel 122 angles out from the front face 124 at an approximately forty-five degree (45°) angle. The only difference between the two cutting motors 120 is that the directions of rotation of the cutter wheels are opposite to each other.

The two cutting motors 120 are preferably stationarily mounted relative to each other and are laterally movable together relative to the alignment axis A. The cutting motors 120, however, do not move longitudinally relative to the alignment axis. The cutter wheels 122 of the two cutting motors 120 are spaced apart at the closest point a greater distance than the width of the largest key blade. Thus, only one side of the key blank is cut at a time. In an alternative embodiment, it is contemplated that both the cutter motors 120 are independently movable so that both sides of the key blank can be cut simultaneously.

The cutting motors 120 are preferably mounted on the same cutter motor carriage 128 on the opposite side of the center line of the alignment axis. The design of the cutting motor carriage 128 is similar to that of the carriage 110 used to move the key blank, gripper 90 and tip alignment mechanism 80. The cutting motor carriage 128, however, is laterally movable relative to the alignment axis A only so that it moves in a direction substantially perpendicular to the other carriage 110.

When the computer subsystem 16 is ready to cut the key blank, it energizes the cutter motors 120, causing the cutting wheels to immediately begin rotating. The carriage motor 116 concurrently moves the carriage 110 rearwardly to the start position. The machine 10 monitors the position of the carriages 110, 128 using the same design as for the tip alignment mechanism 80 and the alignment jaws 80, which is using a home position sensor and controlling the motors from that known location. Once the cutting wheels reach full cutting speed and are disposed adjacent the top portion of the blade of the key blank where the first bit is to be cut, the actual cutting begins. The computer subsystem 16 controls the motion of the carriages 110, 128 based on the bitting information and key blank dimensions to regenerate or duplicate the bitting pattern of the master key onto the key blank.

The carriage 110 moves the key blank forwardly back to its home position along the alignment axis A and one cutting motor 120 engages a portion of the blade at a time. The carriage 110 moves the key longitudinally as the cutting motor 120 moves laterally inwardly and outwardly relative to the longitudinal axis of the key blank. The cutting wheel 120 cuts a pattern in the first side of the key blank. The computer subsystem 16 controls the movement of the carriage 110 and the cutting motor carriage 128 so that the bitting pattern is regenerated in the key blank. The bitting pattern cut into the key blank is either cut to the factory specified widths and spaces for keys with known and unique factory specifications or cut to the previously measured widths and spaces for keys with unknown or non-unique factory bitting specifications.

When the carriage 110 cuts the last bit position in the key blank adjacent its tip, the carriage 110 continues forward to the home position for a single sided key. For a double sided key, the carriage motor 116 is reversed so that the carriage 110 moves rearwardly toward the start position again. The process repeats for using the second cutter wheel 122 so that the bitting pattern is regenerated or duplicated in both edges of the key blank.

A removable tray (not shown) can also be provided beneath the position of the cutting wheels to receive the grindings from the cut blank. The tray can be removed for disposal of the cuttings and replaced permitting easy and complete collection of the shavings.

The computer subsystem 16 de-energizes the cutting motors 120 after the key blank has been cut. The key blank is moved forwardly by the carriage 110 and the alignment jaws 50 are returned to the start position so that they again support the key blank. The head of the key blank extends beyond the side of the machine 10.

The output subsystem 14 notifies the operator that the key has been duplicated and displays a prompt to allow key removal. A beep is also emitted and visual readout on the output subsystem 14 signals the operator that the key blank may be removed. The gripper 90 is moved to the open position when the operator responds to the prompt. Again, the gripper 90 is in the open position for a predetermined time for the operator to remove the key blank therefrom, or until the operator presses a button indicating that the key has been removed, whichever occurs first. If the operator fails to remove the key within the predetermined time, the gripper 90 moves to the closed position as discussed above. If this occurs, then the operator responds to the prompt on the output subsystem 14 so that the gripper 90 returns to the open position so that the cut key blank can be removed. The operator responds to the appropriate prompt after finishing to signal that the regeneration process has been completed for that master key and key blank.

A primary advantage of the present invention is that someone who is relatively untrained in the art of key duplication can put a master key into the drawer 30 and the machine 10 indicates the type of key blank to use. Unlike prior art devices that copy the master key, the present invention regenerates the master key, when possible, so that the key machined 10 from the blank is at least as good as, if not better than, the original key. In other words, when possible, the key blank is not duplicated by copying the master key, but regenerated from the database of known factory specifications and the width of the cuts compared to the factory specifications. The proper dimensions are chosen based on an algorithm determining the most likely value and then the computer feeds that to the cutting table.

Another feature provided by this computerized key identification and key cutting system is that it has the ability to electronically track the number and type of key blanks identified and cut. For example, the machine 10 can be used to track the inventory for each blank type and prompt the user periodically to order more key blanks when it determines that the inventory is low. Although the system can identify three hundred or more different key blank types, the retail outlet at which it is being used may not carry all the blanks in its inventory. Most stores carry a smaller subset of the more popular key blanks (usually 150 to 250 blanks). Once a key is identified, it will be compared to the subset of keys carried in the store's inventory, and if that key is not carried in the inventory, the computer will indicate that to the operator. The system can store this information in its database so that the store can periodically review the number of keys that were identified but not carried in their inventory. Thus, they can determine how many sales are being lost due to not carrying certain types of key blanks and can, therefore, adjust the assortment of key blank types carried in their inventory to maximize sales.

Another contemplated embodiment of the present invention is a machine 10 made specifically for locksmiths. In this embodiment, code cut information is presented to the operator. This information would be useful to a locksmith in a lock management situation in which lock information must be tracked. For an extremely worn key or a mutilated key, the locksmith might measure the widths and then correct them in his discretion based on the extent of wear or mutilation. If a lock is to be re-keyed, the original key code could be measured, and then the code could be changed as needed to accommodate the changes to the lock. The operator could enter code information for locks he is making or modifying to have the machine 10 cut the proper keys. Additionally, the machine 10 would be capable of storing customer key information so that additional or replacement keys could be generated without needing a master key.

COMPUTER SUBSYSTEM

The high level control flow of the present invention, performed by the controller means 2300, resident in the computer subsystem 16 is described below, both in pseudo-code and in more detailed format. Reference is made in [brackets] in the pseudo-code to the steps illustrated in the FIGS. 23–43. In the preferred embodiment the computer subsystem 16 may be any computer such as a 486-66 MHz personal computer with non-volatile memory and random access memory ("RAM"). The operator interfaces with the computer subsystem 16 via the output subsystem 14.

Overview

Figure 23:
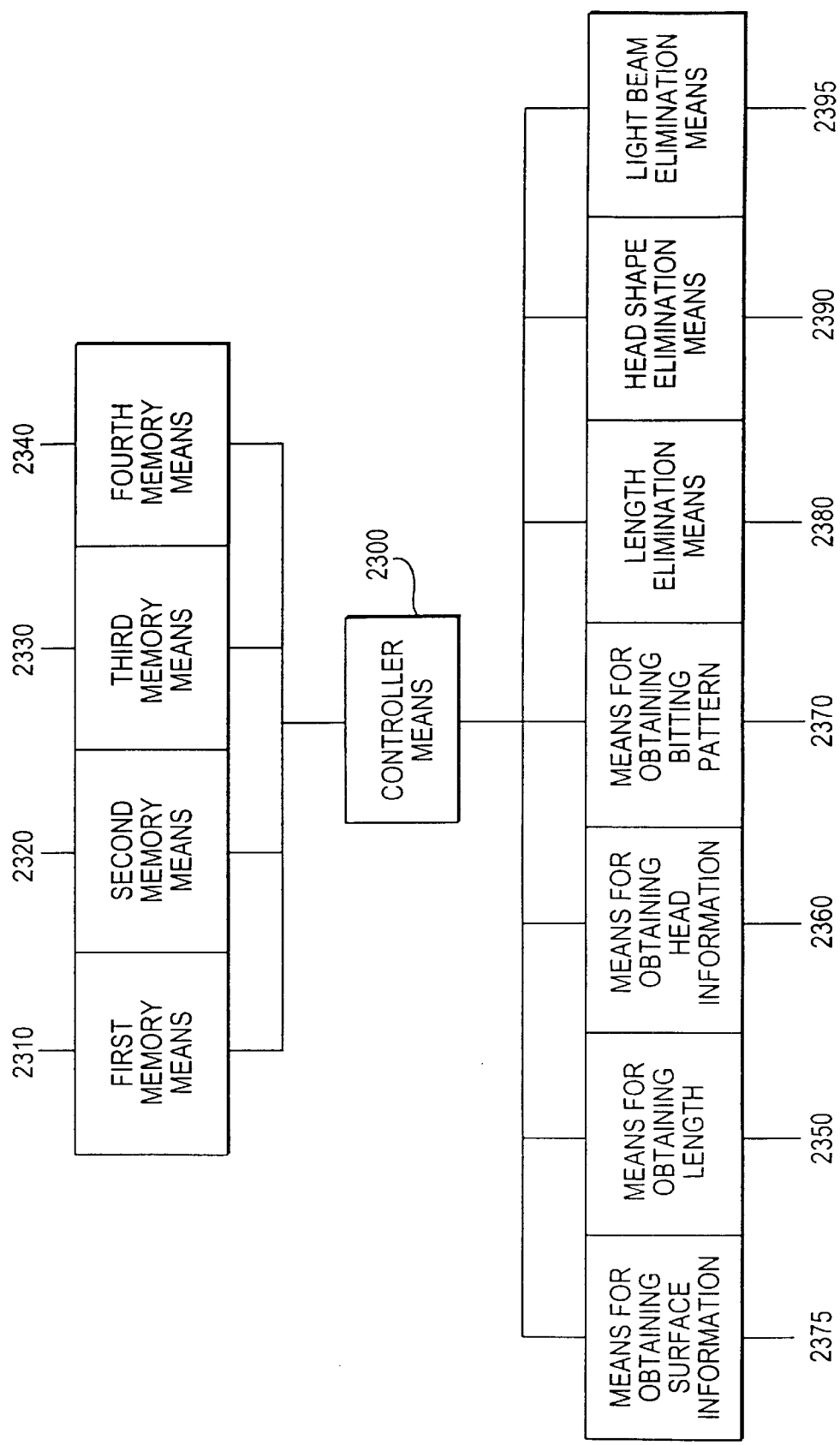
FIG. 23 is an overview of the computer subsystem.

Referring to FIG. 23, the computer subsystem for key identification, duplication or regeneration may contain a first memory means 2310 for storing key information about a plurality of reference keys, including information about a length, a head, and surface information of each of the reference keys, a second memory means 2320 for storing backlit image data representing the profile of the master key, a third memory means 2330 for storing light beam image data representing the milling of the master key, a fourth memory means 2340 for storing manufacturer's specifications of various key features, a means for obtaining the length of the master key 2350, a means for obtaining the head information of the master key 2360, a means for obtaining surface information 2375, a means for obtaining the bitting pattern of the master key 2370, a length elimination means 2380, a head shape elimination means 2390, a light beam elimination means 2395 and a controller means 2300 to control each of the means recited to identify, duplicate or regenerate a master key.

Figure 24:
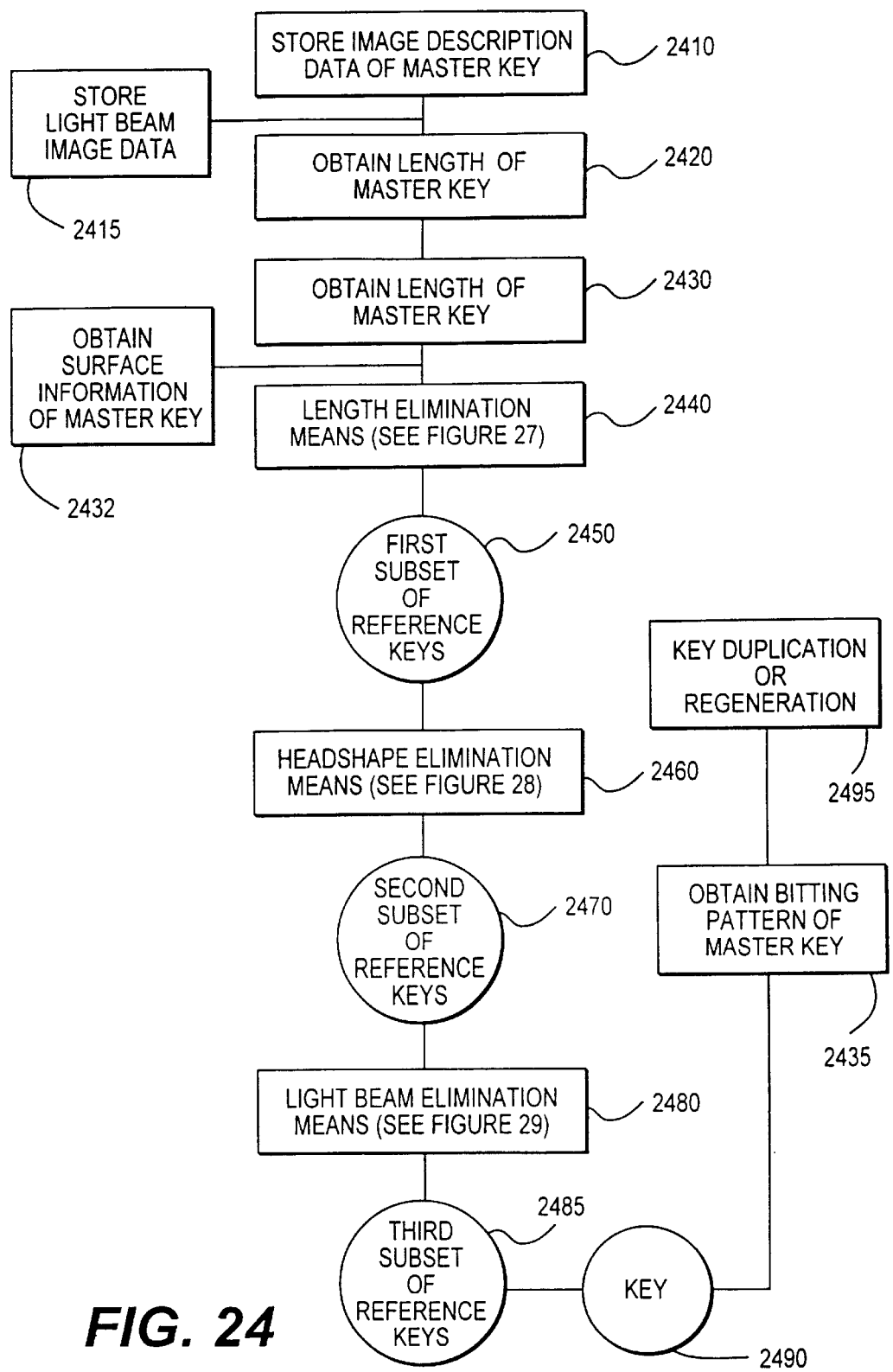
FIG. 24 is a flowchart depicting the overall flow of the key identification process.

The overall control flow for key identification and duplication or regeneration is shown in FIG. 24. Referencing FIGS. 23 and 24, the controller means 2300 stores backlit image data representative of the profile of the master key at step 2410 in the second memory means 2320 and stores light beam image data representative of the milling of the master key at step 2415 in the third memory means 2330. From the backlit image data, the controller means obtains the length and head shape of the master key, step 2420 and step 2430 by calling the means for obtaining the length 2350 and the means for obtaining head shape information 2360. From the light beam image data, the controller means 2300 obtains surface information of the master key at step 2432 by calling the means for obtaining surface information 2375. The controller means at step 2440 calls the length elimination means 2380 to create a first subset of reference keys 2450. The head shape elimination means 2390 takes as input the first subset of reference keys 2450 and creates a second subset of reference keys 2470. The light beam elimination means 2395 then takes as input the second subset of reference keys 2470 and in the preferred embodiment, outputs a third subset of reference keys 2485. The keys in this subset are ranked in the order that they best match the master key. After the key at step 2490 has been identified. The controller means 2300 also obtains the bitting pattern of the master key at step 2435 by calling the means for obtaining bitting pattern 2370. The master key is then duplicated or regenerated at step 2495.

The basic overall flow first identifies the key and then duplicates or regenerates the key. Therefore, as one skilled in the art can appreciate, the steps involved in the overall flow may change in sequence without affecting the outcome. For example, the controller means 2300 may store the light beam image data at step 2415 before storing the backlit image data at step 2410. Another example includes that the controller means 2300 may obtain the surface information of the master key at step 2432 before obtaining the head shape information of the master key at step 2430.

Information On Reference Keys

The key information for reference keys consists of key length, head shape information, and surface information. This information may be kept in a memory means such as a database. The head shape information may consist of the head width measurements and edge positions along the section of the key designated as the head. The section of the key designated as the head may be estimated to be a percentage of the length of the key, typically fifty percent.

The surface information consists of depth measurements across the width of the key. Note that the depth measurements may be negative to identify a cut inward on the surface of the key or positive to identify a protrusion on the surface of the key.

In the preferred embodiment key information may be stored in two ASCII files. One file may have the extension keyname.HED and contain the head shape information and the key length. The other file with extension keyname.M2 may contain the surface information. The format of these files may be the same whether the key is single or double sided.

The format of the .HED file may be as follows: Comments are in parenthesis ( ).

keyname key length number of width and edge position measurement pairs that follow width, edge position (width of key and position of edge of key; in inches as measured every 0.01" along the key; each pair is on a separate line.)

The format of the .M2 file may be as follows: Comments are in parenthesis.

number of depth measurements position of center of surface information depths (in inches measured every 0.001" across the key; each measurement is on a separate line)

Excerpts of the .HED and .M2 files for the single sided key blank Y152 are as follows. Comments are included in parenthesis ( ).

```
filename: Y152.HED
data:
    Y152                        (Name of key)
    2.30908                     (Key Length)
    115                         (Number of width and edge position
                                measurements)
    0.365801      -0.230982     (Start of width and edge position
                                measurements)
    0.363533      -0.230925
    0.363397      -0.230662
    ...
    0.271701      -0.282791
    0.229788      -0.298927     (End of width and edge position
                                measurements)
filename: Y152.M2
data:
    263                         (Number of depth measurements)
    131                         (Position of center of surface information)
    -2.2661e-06                 (Start of depth measurements)
    ...
    -0.0185539                  (End of depth measurements)
```

In the preferred embodiment, data structures may be set up to hold the key information. For example, a structure to keep head shape information would contain the name of the key, the length of the key, the number of width measurements, a series of width measurements and a series of edge position values for the width measurements. A structure to keep the surface information would contain center position for each side, and the successive depths for each side.

Examples of structures to keep head shape information and surface information follow. The headstruct{ } structure may be used to hold information about the key head shape and the millstruct{ } structure may be used to hold surface information.

```
typedef struct {
    charname[10];
    int NumCutSides;        /* Number of cut sides */
    int Side1Width;         /* Index ... in thousandths of
                            an inch */
    int Side2Width;         /* Index ... in thousandths of
                            an inch */
    int Side1CenterPosition, Side2CenterPosition;
    ld Side1Depths[MAX_MILL_WIDTH]; /* In Inches */
    ld Side2Depths[MAX_MILL_WIDTH]; /* In Inches */
} millstruct;
typedef struct {
```

-continued

```
    char name[10];
    ld KeyLengthInches;     /* Length of key in INCHES */
    int arraylength;        /* Array Index for widths & starts */
    ld widths[MAX_HEAD_LENGTH];
    ld EdgePosition[MAX_HEAD_LENGTH];
                            /* Edge positions in INCHES,
                            every 1/100" along the head */
} headstruct;
```

The key information and surface information for reference keys may be obtained using functions for key identification. These functions are described below and may include any of the functions for obtaining key information and surface information. After the functions are called to obtain the key information and the surface information of a reference key, the information may be added to a database or file such as the .HED and .M2 files.

Backlit Image Data

The backlit image data representing the profile of the master key is an image of rows and columns. An example of the image is shown in FIG. 7C. This information may be kept in a memory means. In the preferred embodiment this information is kept in a one dimensional array. For example, if the profile image is 500 by 500 pixels, the first row of the image is indexed from 0–499 and successive rows are appended. Hence the second row is indexed from 500–999. Note that numbering starts with 0 for the rows and columns. To index into the array the following formula may be used:

(row−1)* (width of row)+(column−1)

The reason (row−1) and (column−1) are used is because numbering starts with zero. In the example, to get to the third row, fourth column the index would be 1003=(3−1)* 500+ (4−1).

From the backlit image data, the system obtains the length, head information, and bitting pattern of the master key. As noted before, the head shape information may be kept as a series of widths and edge positions for the section of the key designated as the head. The means for obtaining the length 2350 calculates the length of the key from head to tip and the means for obtaining the head shape information 2360 calculates the width of the key at specified intervals.

Figure 25A:
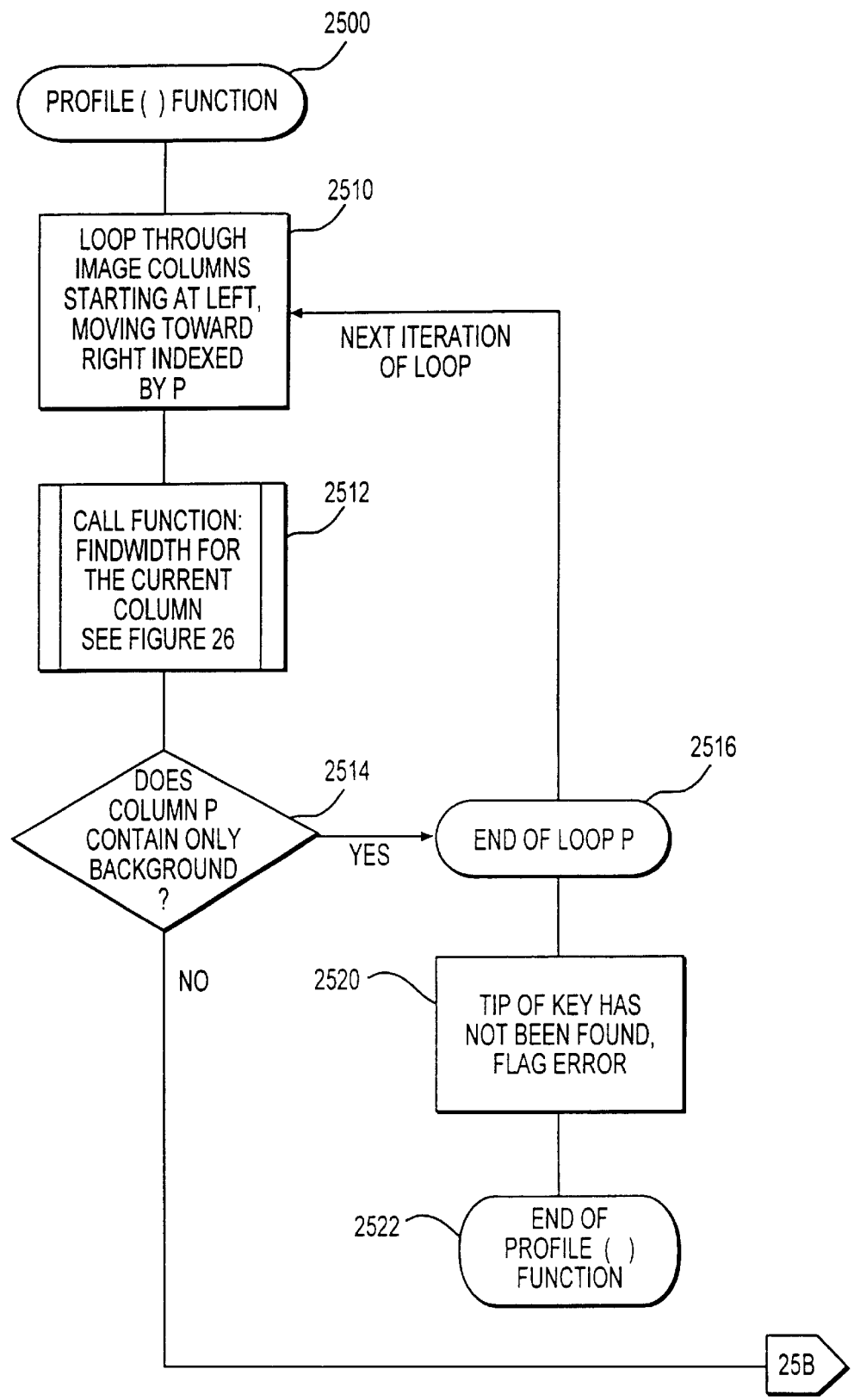
FIG. 25A is a flowchart of the Profile( ) function for obtaining key information.
Figure 25B:
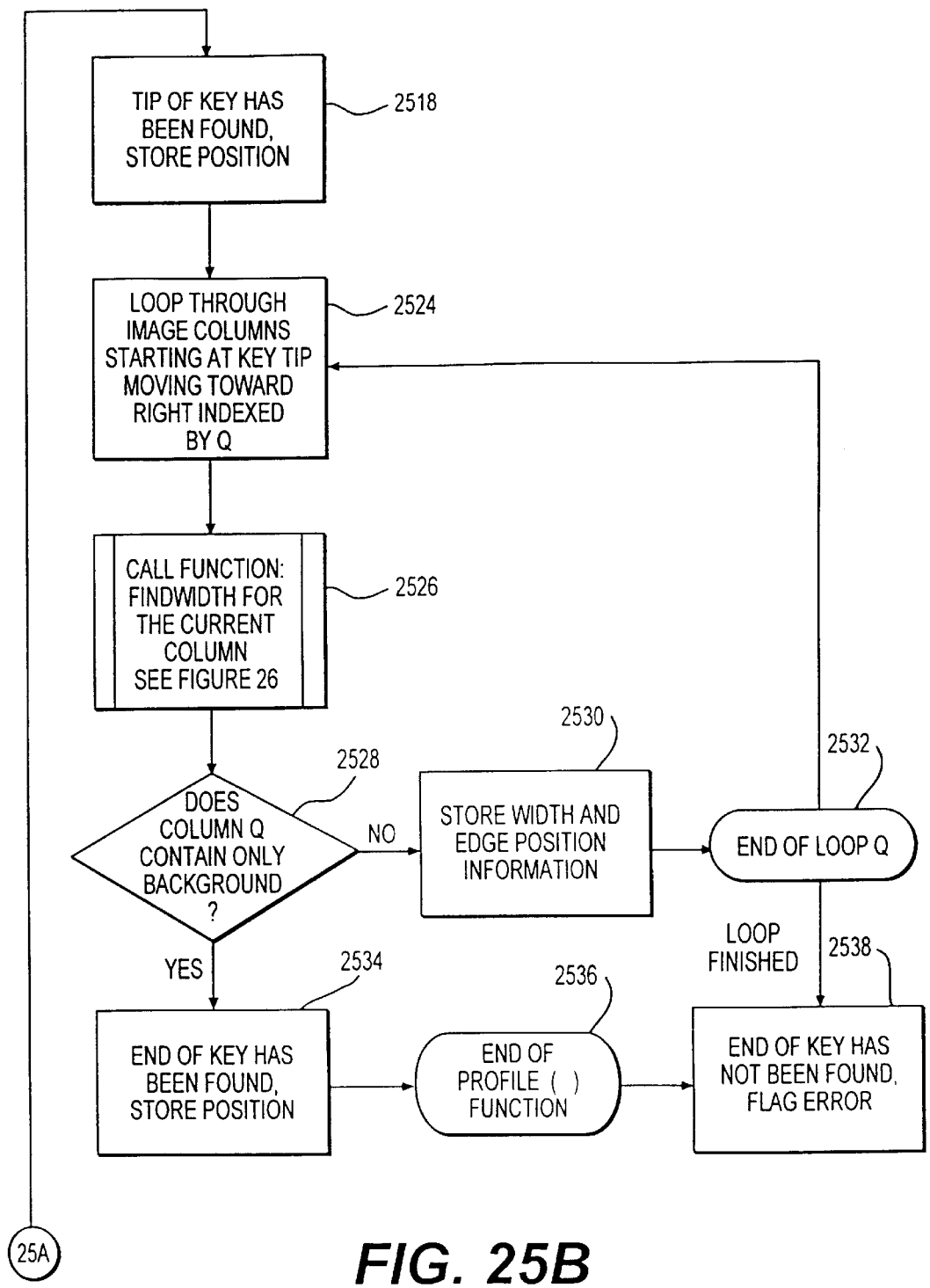
FIG. 25B is a continuation of the flowchart of the Profile( ) function.
Figure 26:
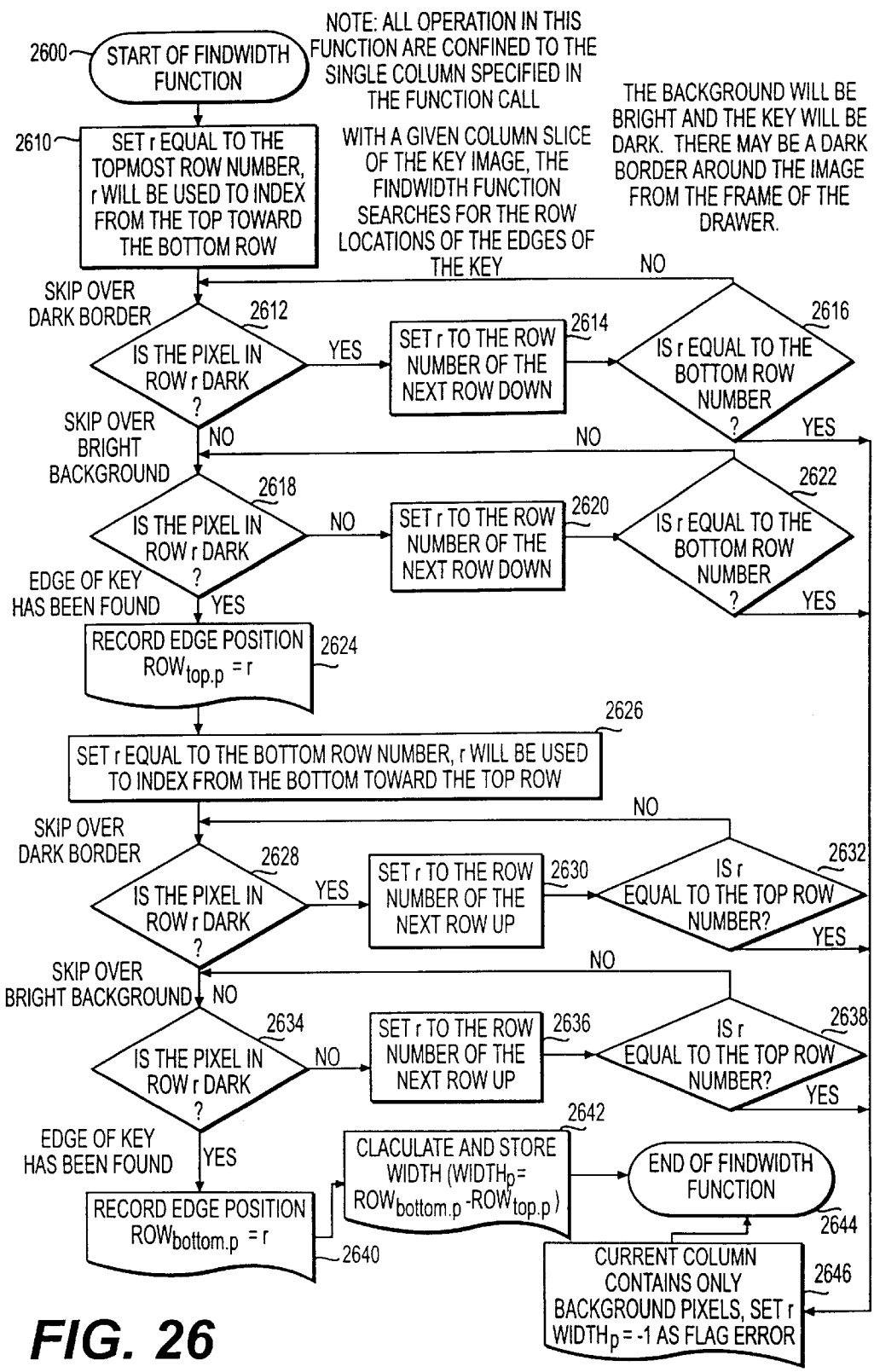
FIG. 26 is a flowchart of the FindWidth( ) function for obtaining the width measurements of keys

Referencing FIGS. 25A, 25B and 26 along with the pseudo code below, the functions Profile( ) and FindWidth( ) obtain the length and width of the key at respective intervals.

```
[2500]  Profile ( )
[2510]      Loop through image columns indexed by p {
[2512]          FindWidth (column(p));
[2514]          if(column(p) is background)
[2516]              Perform next iteration of Loop;
                else
[2518]              Store position of key tip; /* found key tip */
[2516]      } /* end of Loop */
[2520]      if (tip of key not found)
[2522]          Exit Profile( );
[2524]      Loop through image columns starting at key tip position
            indexed by q {
[2526]          FindWidth (column(q));
[2528]          if (column(q) is background)
[2534]              Store end of key position; /* found end of key */
```

-continued

```
[2536]       Exit Profile( );
          else
[2538]        Store width and edge position
[2532]    } /* end of Loop */
[2538]    if (end of key not found) then flag error
/* End Profile( ) function */
[2600] FindWidth(column)
          /* Find top edge */
[2610]    r = top most row number;
          /* Skip over dark border */
[2612]    while (pixel(r) == dark)
[2614]        Increment r;
[2616]        if (r == last row)
[2646]            Current column contains only background pixels;
[2646]            exit FindWidth( );
          /* Skip over light background */
[2618]    while (pixel(r) is not equal to dark)
[2620]        increment r;
[2622]        if (r == last row)
[2646]            Current column contains only background pixels;
[2646]            Exit FindWidth( );
[2624]    Record row of top of key for this column;
          /* Find bottom edge */
[2628]    r = bottom row number;
[2628]    while (pixel(r) == dark)
[2630]        decrement r;
[2632]        if (r == top row)
[2646]            Current column contains only background pixels;
[2646]            Exit FindWidth( );
          /* Skip over light background */
[2634]    while (pixel(r) is not equal to dark)
[2636]        decrement r;
[2638]        if (r == top row)
[2646]            Current column contains only background pixels;
[2646]            Exit FindWidth( );
[2640]    Record row of bottom of key for this column;
[2642]    Calculate and store width (width(p) =
          BottomRow(p) – TopRow(p));
[2644]    /* End ofFindWidth( ) */
```

The Profile( ) function 2500 at step 2510 loops through the image description columns starting at the left and moving towards the right indexed by p. It calls the function FindWidth( ) at step 2512 to find the width of the key at column p. At step 2514, if the column contains only pixels of background intensity then step 2516 performs the next iteration of the loop. If the column contains non-background pixels then the start of the key is found and stored at step 2518. At step 2520, if the tip of the key is not found and all columns have been checked by the loop at step 2510 then the function is exited at step 2522. The next loop at 2524 loops through the image columns starting at the column where the start of the key position was found at step 2518. This loop 2524 is indexed by q. At step 2526 the function FindWidth( ) is called with column q. If column q contains only background intensity pixels at step 2528, the end of the key is found and this position is stored at step 2534 and the function is exited at step 2536. If the end of the key is not found at step 2538 then an error flag is set.

The function FindWidth( ) 2600 first sets a variable, for example, 'r', to the top most row number of the column passed to it by Profile( ). In the series of steps 2612, 2614, and 2616, the function skips over the dark border of the image. Then pixels with light intensity are skipped in steps 2618, 2620, and 2622 until a pixel of dark intensity is found which designates the top row of the key for this column, step 2624.

To find the bottom edge of the key, the same algorithm is repeated starting at the bottom. Hence in step 2626, r is set to the bottom row number. The dark pixels are skipped in steps 2628, 2630 and 2632. The light pixels are then skipped in steps 2634, 2636 and 2638 until a dark pixel is found which designates the bottom edge. The bottom edge position is recorded in step 2640.

After the top and bottom edge for the current column p is found, the width is calculated as the difference between the bottom row recorded in step 2640 and the top row recorded in step 2624.

Light Beam Image Data

An example of the light beam image data is shown in FIG. 7D. Light beam image data represents the result of the light beam interfacing with the surface of the master key shown in FIG. 7A, specifically the surface shown in FIG. 7B. This data is stored in the third memory means 2330.

Figure 42:
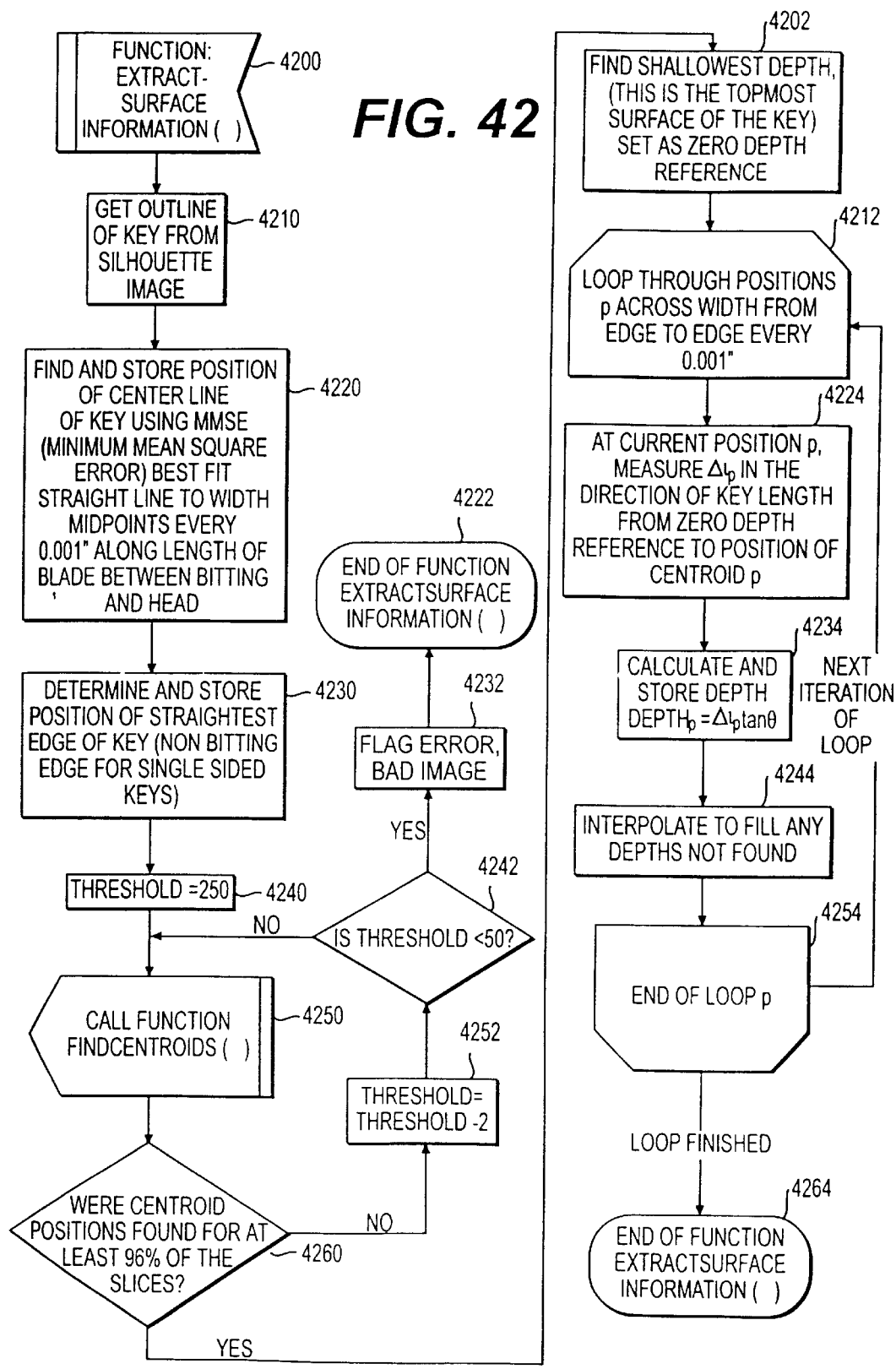
FIG. 42 is a flowchart of the ExtractSurfaceInformation( ) function.
Figure 43:
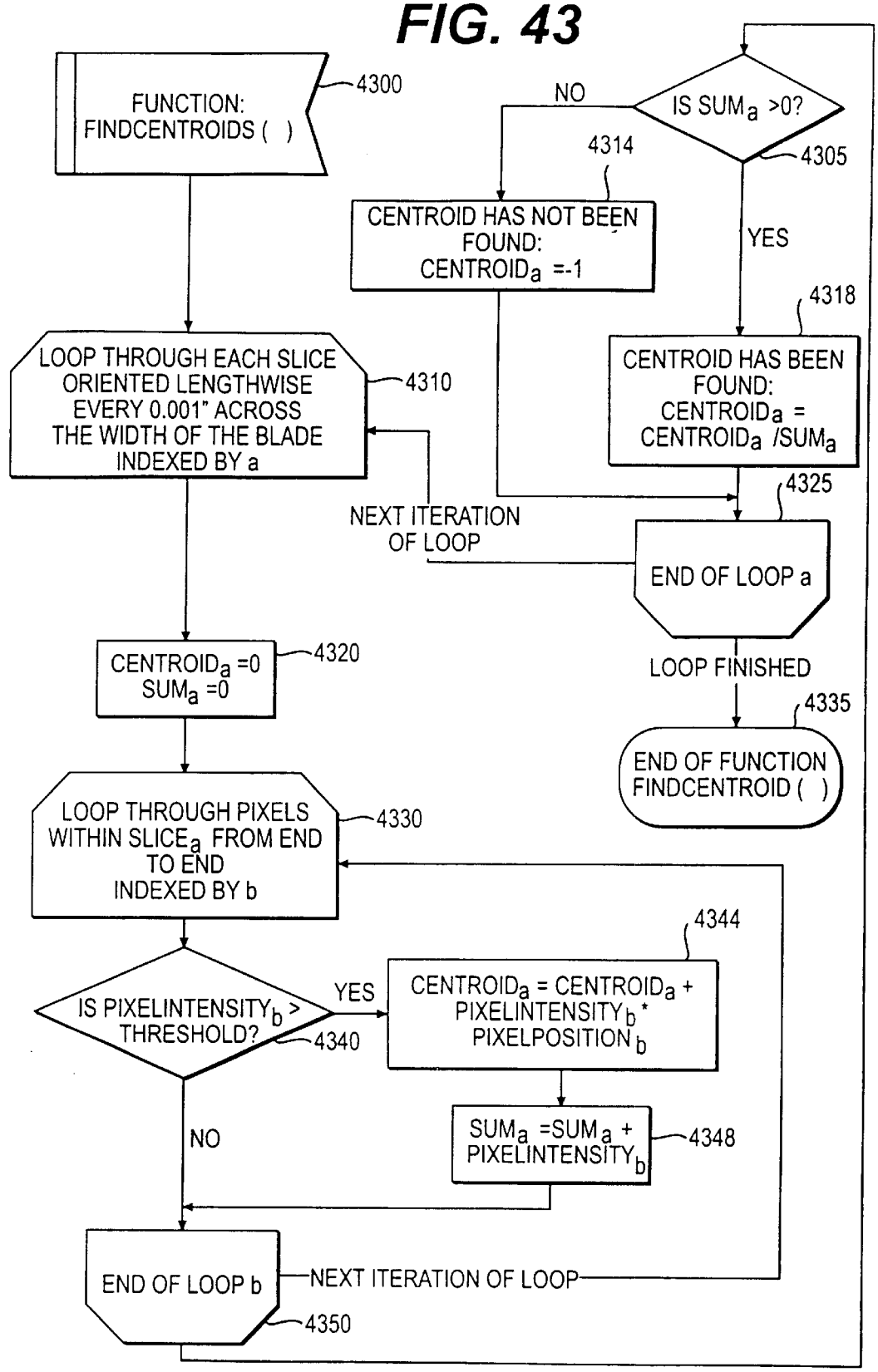
FIG. 43 is a flowchart of the FindCentroids( ) function.

The function ExtractSurfaceInformation( ) shown in FIG. 42 and explained below in pseudo code extracts depth measurements from the light beam image data stored in the third memory means 2330.

At step 4210, the function ExtractSurfaceInformation( ) 4300 gets the outline of the key from the image by calling a function such as Profile( ). At step 4220 the best fit centerline approximation of the key is found. In other words, the best fit straight line to width midpoints every 0.001" along the length of the blade between the bitting and the head is computed using MMSE (Minimum Mean Square Error). The centerline at step 4220 is computed to be used as a reference position to align the surface information measurement arrays when comparing the master key to a double sided reference key.

At step 4230, the edge which is straightest is determined. For comparing the master key to a single sided reference key, the straightest side, which corresponds to the side without bitting, is used as the reference position for aligning the surface information measurement arrays.

At step 4240 a threshold variable is set to 250 because an 8-bit gray scale image is indexed from 0–255. The function FindCentroids( ) is called at step 4250 to find the centroid of the current horizontal slice. While the centroid positions are not found for 96% of the slices at step 4260, the threshold variable is decremented by 2 at step 4252 and the function FindCentroids( ) is called again. If the threshold becomes less than 50 at step 4242, an error flag is set at step 4232 and the function exits at step 4222.

The shallowest depth or surface of the key is found in step 4202 and it becomes the zero depth reference. A loop through the positions p across the width of the key from edge to edge every 0.001" is performed to find where the light beam intersects the surface of the key (step 4212). At the current position p, $\Delta l(p)$ is measured in the direction of key length from zero depth reference to position of the centroid p. The depth is then calculated and stored in step 4234 as depth(p)=$\Delta l(p)$tan θ. At step 4244 the algorithm interpolates any depths that were not found and the loop indexed by p ends at step 4254 when all depths are found. The function ends at step 4264.

The function FindCentroids( ) 4300 finds the centroids for each lengthwise slice of the key. At step 4310 this function loops through each slice oriented lengthwise every 0.001" across the width of the blade indexed by a. The variables Centroid(a) and Sum(a) are set to 0 in step 4320. Another loop at step 4330 loops through the pixels within a slice from end to end indexed by b. If the PixelIntensity(b) is greater than the threshold at step 4330 then Centroid(a) is set to Centroid(a)+PixelIntensity(b) * PixelPosition(b) at step 4344 and Sum(a) is set to Sum(a)+PixelIntensity(b). After the loop indexed by b ends at step 4350, if Sum(a) is greater than zero at step 4305, then the centroid has been found and Centroid(a) is set to Centroid(a)/Sum(a) which gives the position of the centroid. If Sum(a) is not greater than zero then the centroid has not 30 been found and Centroid(a) is set to −1 as a flag in step 4314.

| | |
|---|---|
| [4200] | ExtractSurfaceInformation( ) |
| [4210] | Get outline of key such as that obtained by the Profile( ) function; |
| [4220] | Find centerline of key using best fit straight line; |
| [4230] | Determine which edge of key is straightest; |
| [4240] | Set threshold = 250; |
| [4260] | while (centroid positions not found for at least 96% of the slices) |
| [4250] | Call FindCentroids( ); |
| [4252] | decrement threshold by 2. |
| [4242] | if (threshold < 50) |
| [4232] | flag error; |
| [4222] | exit ExtractSurfaceInformation( ); |
| [4202] | Find shallowest depth; |
| [4212] | Loop through positions p across width from edge to edge every 0.001" |
| [4224] | measure Δl(p); |
| [4234] | calculate and store depth(p) = Δl(p) tan θ; |
| [4244] | interpolate to fill any depths not found; |
| [4254] | End of Loop p |
| [4262] | Store edge and center line positions; |
| [4264] | /* End ExtractSurfaceInformation( ); */ |
| [4300] | FindCentroids( ) |
| [4310] | Loop through each slice lengthwise every 0.001" across width, index by a |
| [4320] | Centroid(a) = 0; Sum(a) = 0; |
| [4330] | Loop through pixels within slice(a) from end to end, index by b |
| [4340] | if(PixelIntensity(b) > threshold) |
| [4344] | Centroid(a) = Centroid(a) + PixelIntensity(b) * PixelPosition(b); |
| [4348] | Sum(a) = Sum(a) + PixelIntensity(b); |
| [4350] | End of loop indexed by b; |
| [4305] | if (Sum(a) > 0) |
| [4318] | Centroid(a) = Centroid(a)/Sum(a); else |
| [4314] | Centroid not found, set Centroid(a) = −1; |
| [4325] | End of loop indexed by a; |
| [4335] | /* End of function FindCentroid( ) */ |

The functions described here may be used for identifying the key but also they can be used when adding reference key information to the database. In this scenario the various measurements would be extracted from a reference key and added to a database (i.e. the .M2 and .HED files).

Key Identification Process

Figure 27:
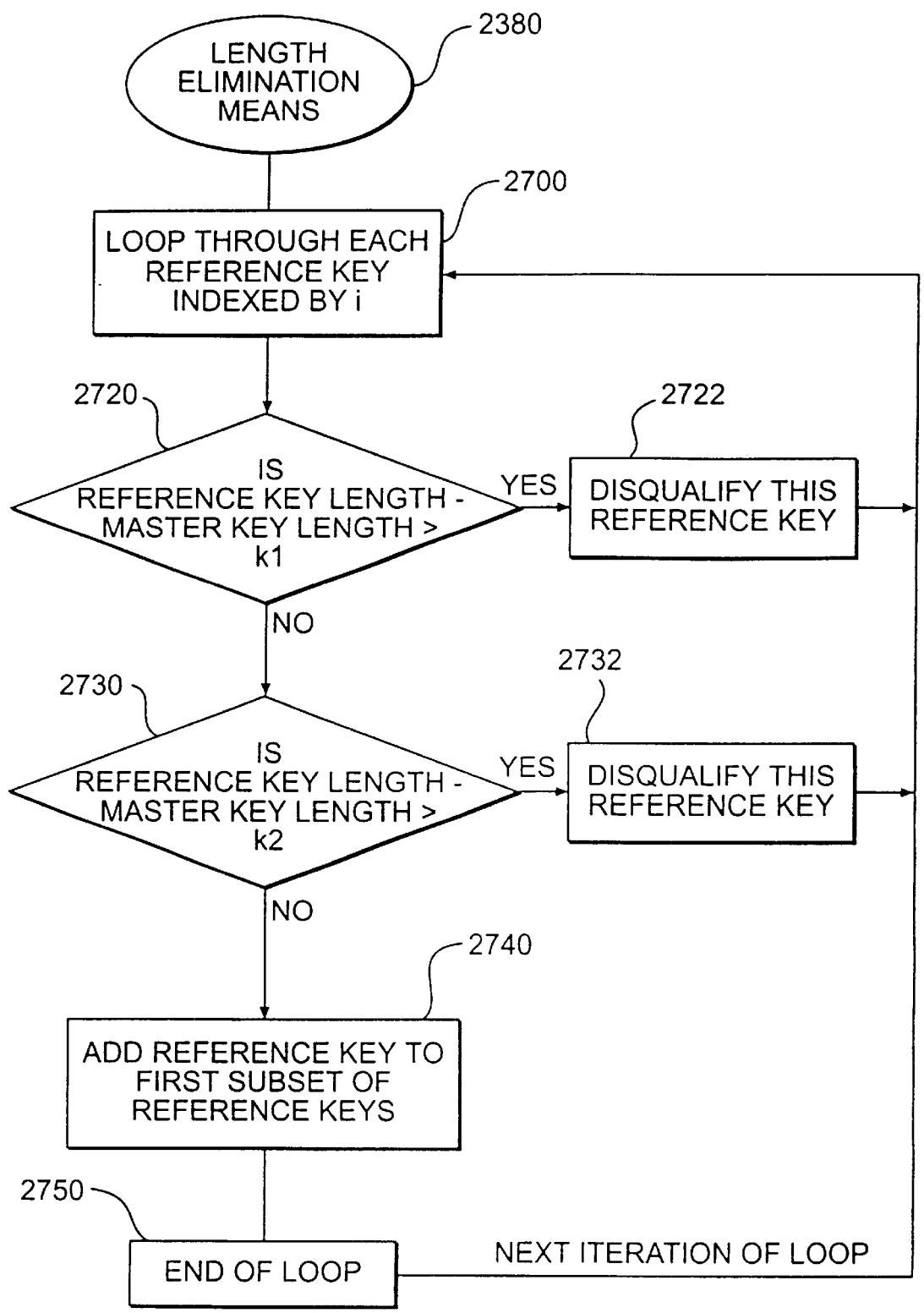
FIG. 27 is a flowchart depicting the overall flow of the length elimination means.

Referencing FIG. 27, the length elimination means 2380 in the preferred embodiment loops through each reference key in the first memory means 2310 indexed by i at step 2700. If the difference between the key length of the reference key and the master key is greater than a constant, for example K1 or K2, step 2720 and step 2730, respectively then the reference key is disqualified at steps 2722 or 2732. If the reference key was not eliminated in steps 2722 or 2732, then the reference key is added to the first subset of reference keys 2450 at step 2740.

Figure 28:
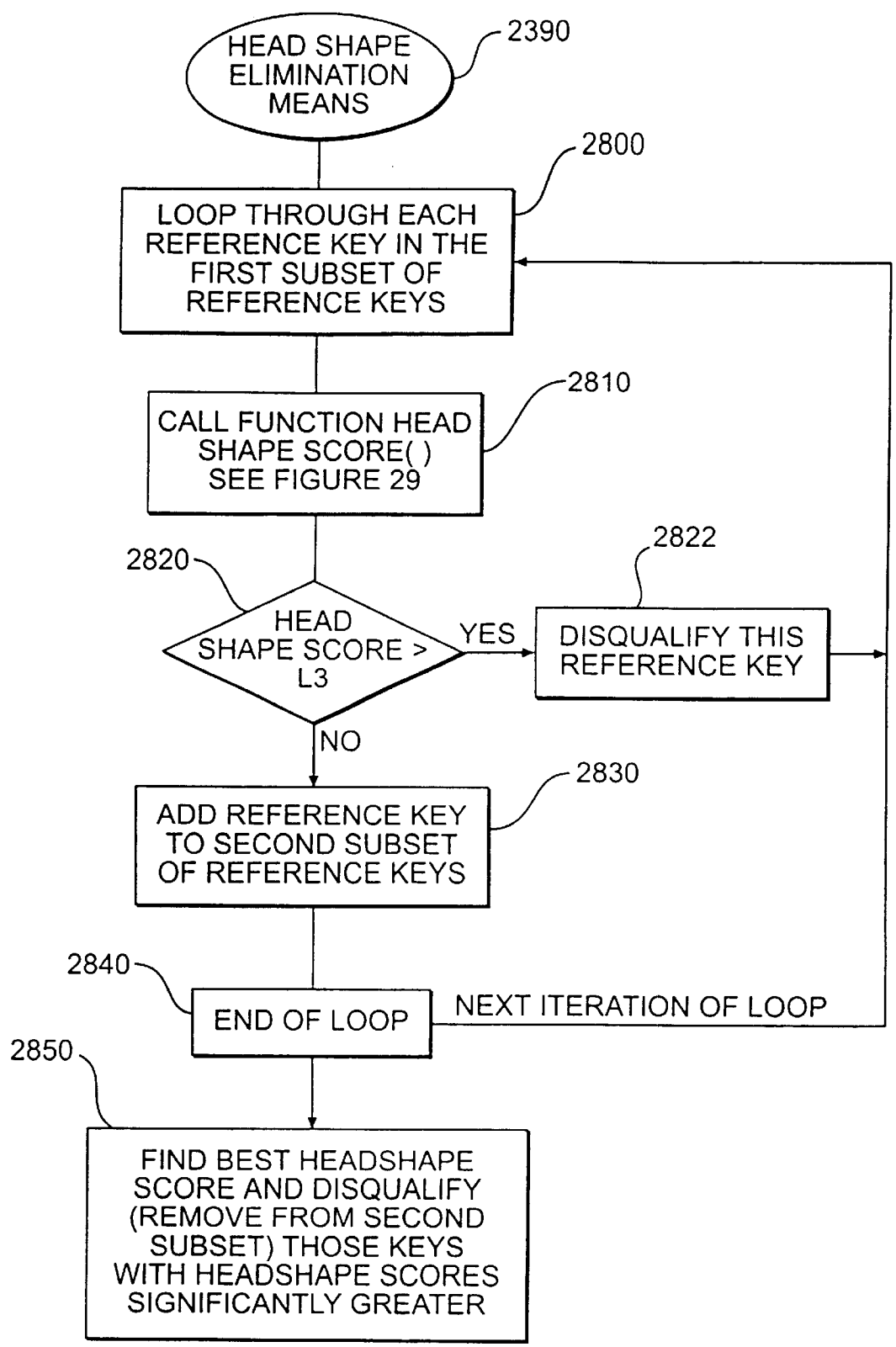
FIG. 28 is a flowchart depicting the overall flow of the head shape elimination means.

Referencing FIG. 28, the head shape elimination means 2390 in the preferred embodiment loops through each reference key in the first subset of reference keys 2450 at step 2800. For each reference key, it calls the function HeadShapeScore( ) at step 2810. If the head shape score is greater than a constant, for example L3 at step 2820 then the key is disqualified at step 2822. If the key is not disqualified then the key is added to the second subset of reference keys 2470 at step 2830. In step 2850, the lowest head shape score is found and those keys with head shape score significantly greater than this are disqualified.

Figure 29:
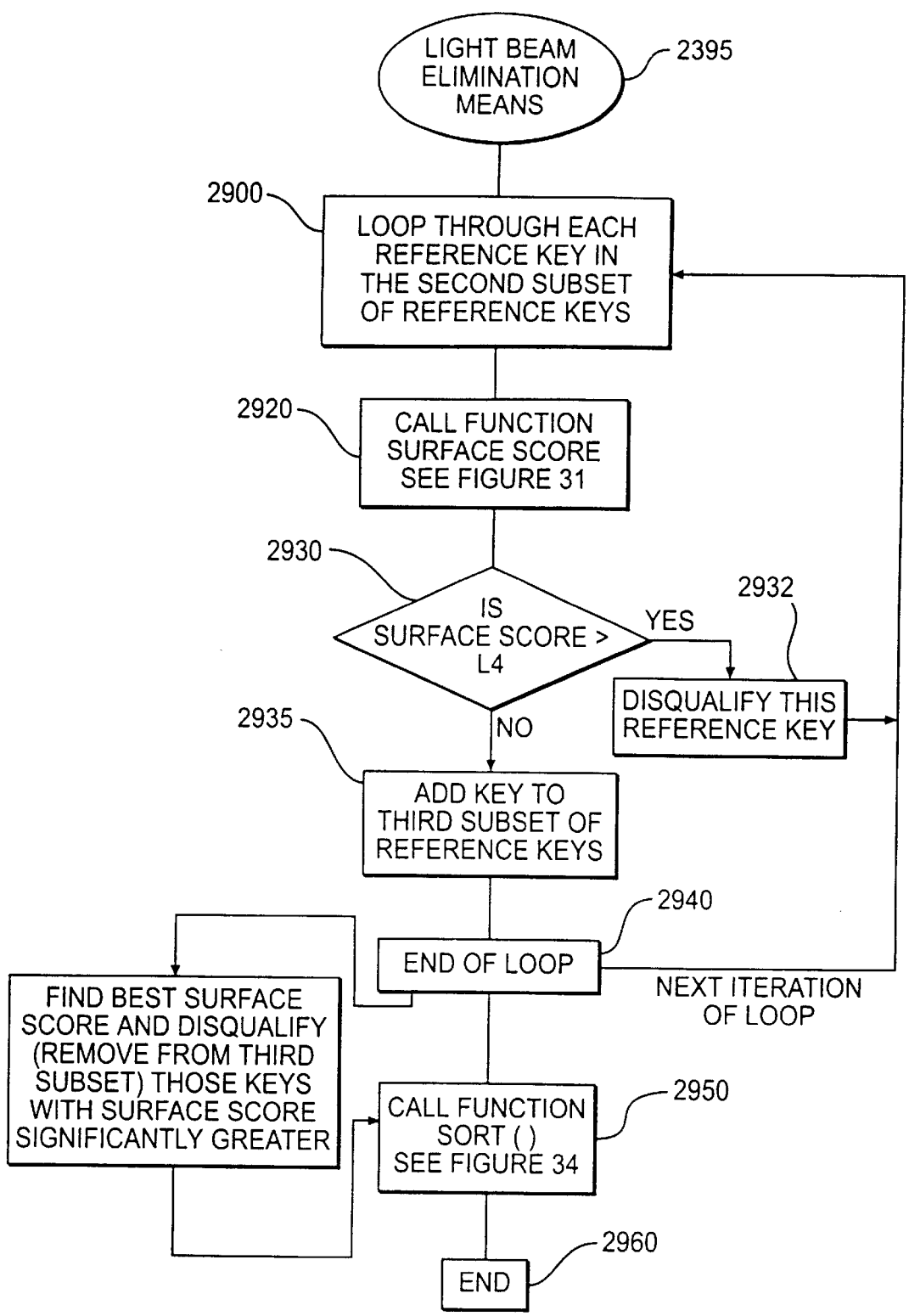
FIG. 29 is a flowchart depicting the overall flow of the light beam elimination means.

In the preferred embodiment, referencing FIG. 29, the light beam elimination means 2395 loops through each key in the second subset of reference keys 2470 at step 2900. For each reference key, it calls the function SurfaceScore( ) at step 2920. If the surface score is greater than a constant, for example, L4, at step 2930, then the key is disqualified at step 2932. If not, then the key is added to a third subset of reference keys 2485 at step 2935. After the surface score is calculated for each key in the second subset of reference keys 2470, then the function Sort( ) is called at step 2950.

Figure 30:
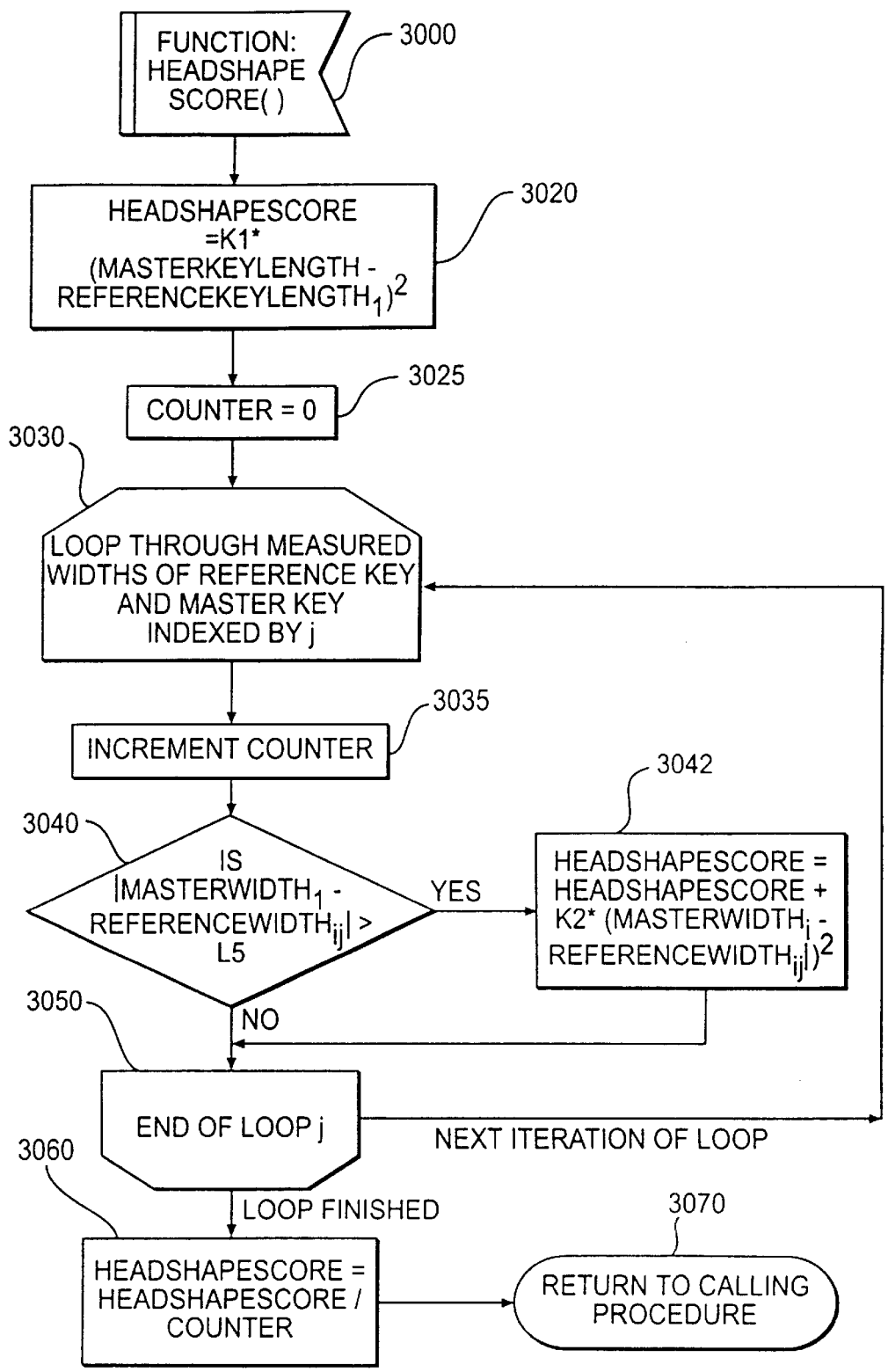
FIG. 30 is a flowchart of the HeadShapeScore( ) function.

Referencing FIG. 30, the function HeadShapeScore( ) 3000 calculates a head shape score for each key. In the preferred embodiment at step 3020 the head shape score incorporates the length of the key. In this step, the head shape score is initialized to a constant, K1 times the square of the difference between the length of the reference key and the master key. A counter variable is set to 0 at step 3025. Since head shape information is kept as widths of the key, this function loops through the widths of the master key and the reference key starting at the end of the head and continuing for the duration of the shorter of the two head lengths at step 3030. For each iteration of the loop, the counter is incremented at step 3035 and if the absolute value of the difference between the widths is greater than a constant, L5, at step 3040, the square of the difference between the widths at step 3042 times a constant, K2, is added to the head shape score. If the absolute value is not greater than the constant, L5, then nothing is added to the head shape score for this width slice. The head shape score that is returned is the score divided by counter at step 3060 to give a normalized deviation per unit length.

Figure 31:
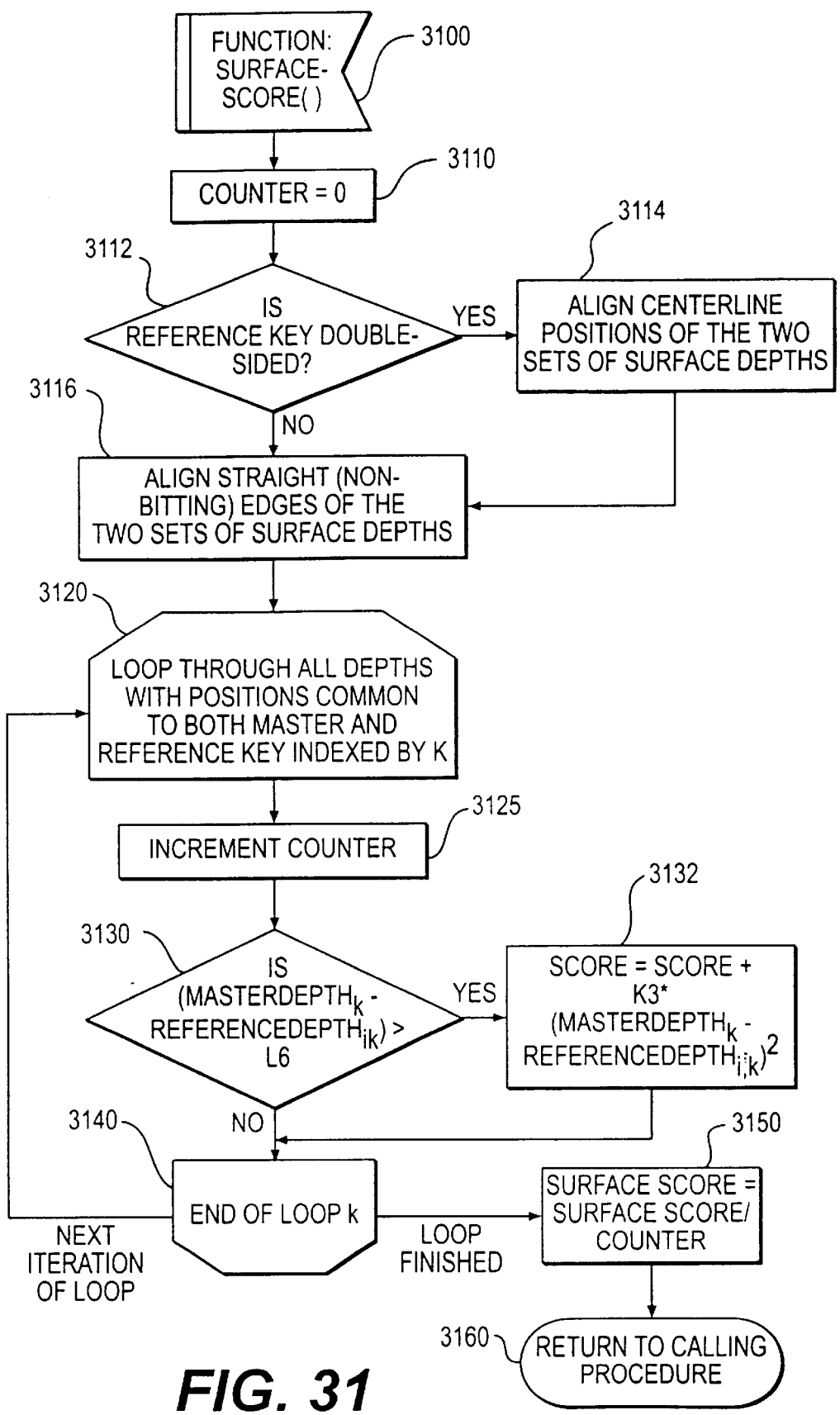
FIG. 31 is a flowchart of the SurfaceScore( ) function.

Referencing FIG. 31, the function SurfaceScore( ) 3100 calculates a score for each key based on the surface information. This function starts by setting a counter to 0 at step 3110. If the reference key is double sided at step 3112 then the centerline positions of the two sets of surface depths are aligned at step 3114. If the key is not double sided then the straight (non-bitting edges) of the two sets of surface depths are aligned at step 3116. This function then loops through all depths with positions common to both the master and reference key indexed by k at step 3120. For each iteration of the loop, the counter is incremented at step 3125, then if the absolute value of the difference of the depths in step 3130 is greater than a constant, L6, the square of the difference between the depths at step 3132 times a constant, K3, is added to the surface score. If the absolute value of the difference of the depths is not greater than a constant, L6, then nothing is added to the surface score for this iteration. The surface score returned is the surface score divided by counter at step 3150 to give a normalized deviation per unit width.

Figure 32:
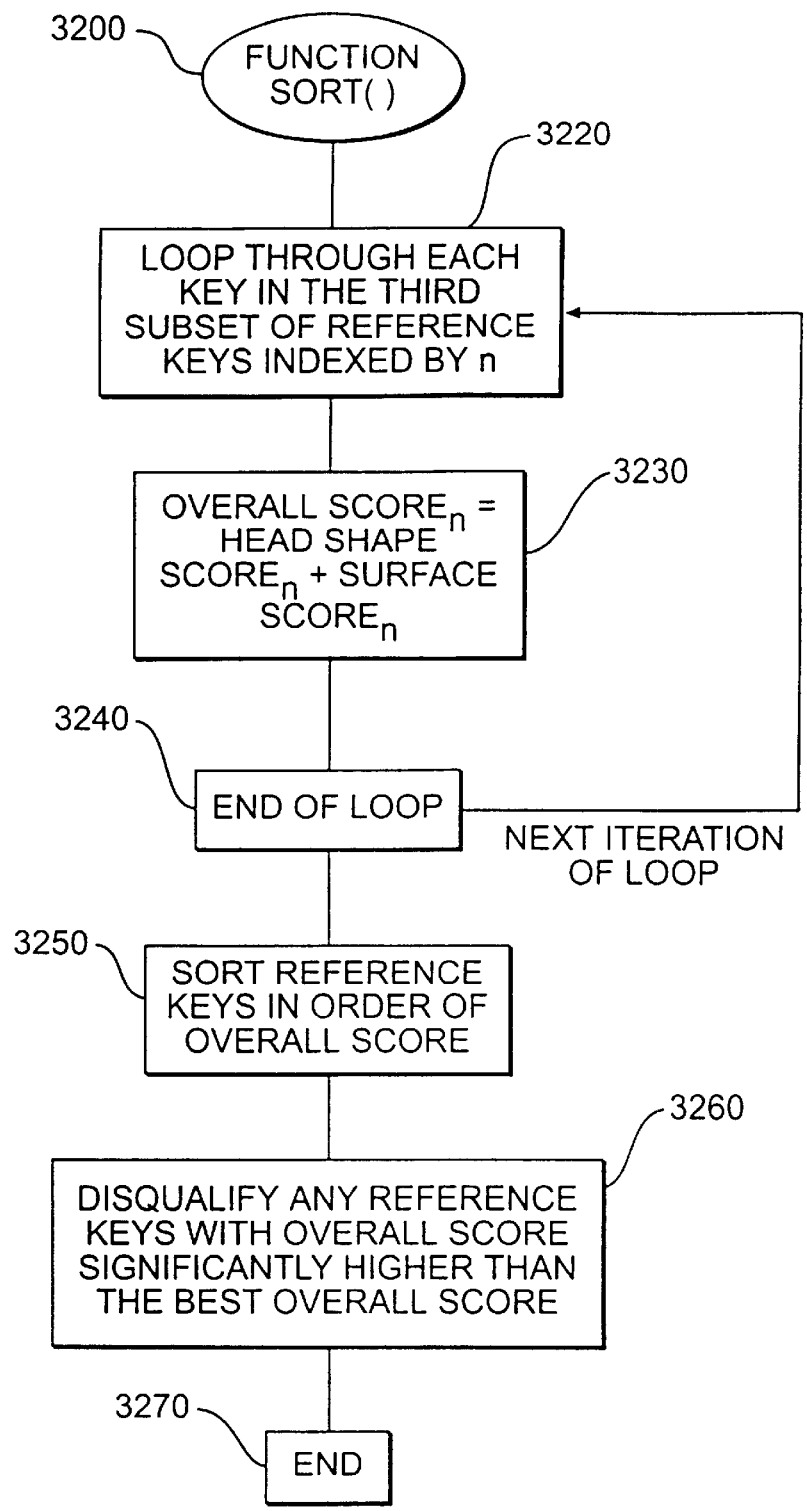
FIG. 32 is a flowchart of the Sort( ) function.
Figure 33:
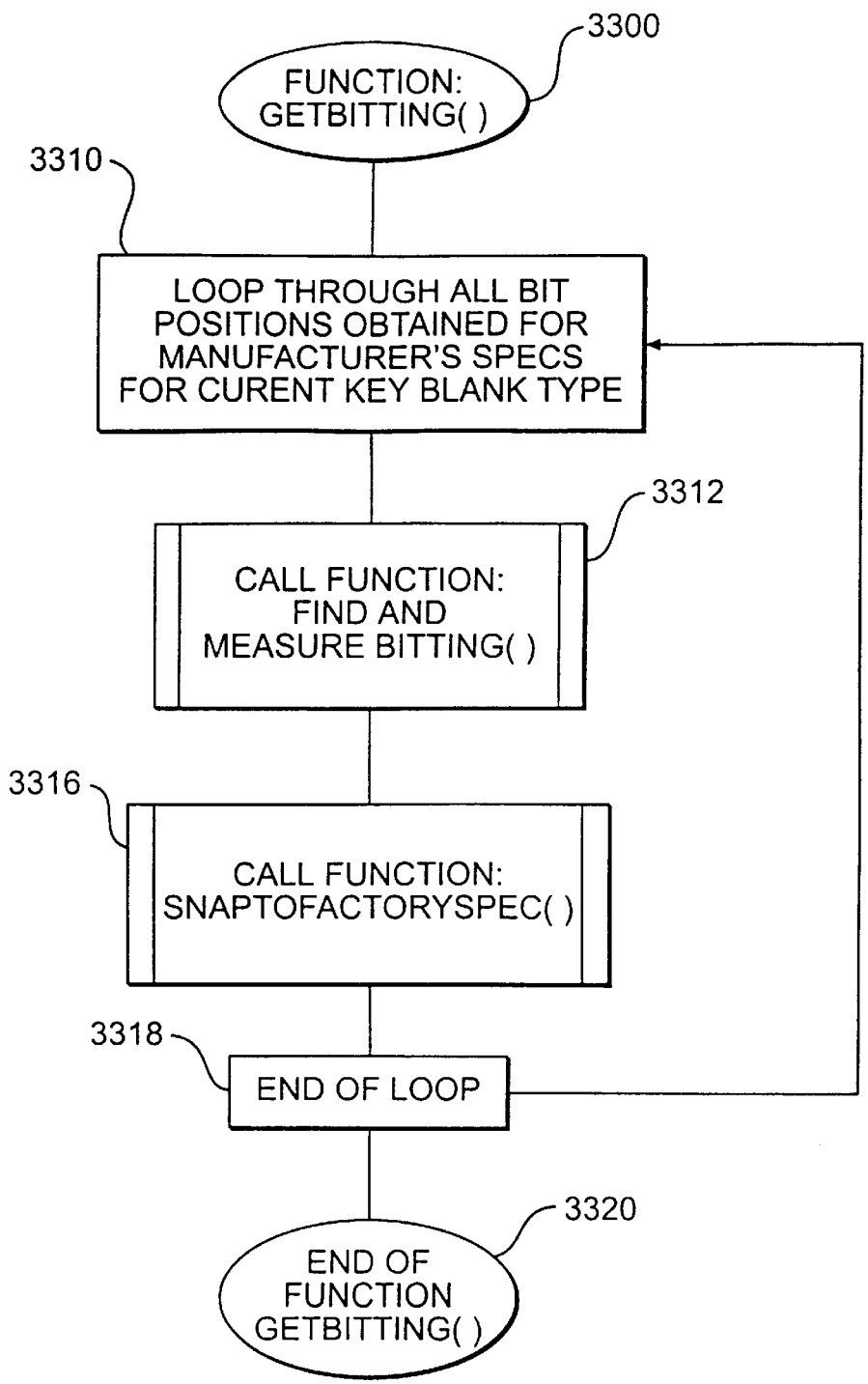
FIG. 33 is a flowchart of the GetBitting( ) function.

Referencing FIG. 32, the function Sort( ) loops through the keys in the third subset of reference keys 2485 at step 3220 and computes an overall score as the head shape score plus the surface score at step 3230. The keys are then sorted in order of overall score at step 3250 and keys with a score significantly higher than the best overall score are disqualified in step 3260.

Bitting Pattern Analysis

The bitting pattern is obtained from the master key. Referencing FIGS. 33–45 and the pseudo code below, the function GetBitting( ) loops through all the positions that contain bitting as given by the manufacturer's specifications. For each position, GetBitting( ) calls FindAndMeasureBitting( ) at step 33112, and SnapToFactorySpec( ), at 3316. These functions find the position at which to measure the bitting, measure the width at that position, and adjust that width to meet manufacturer's specifications.

Figure 34:
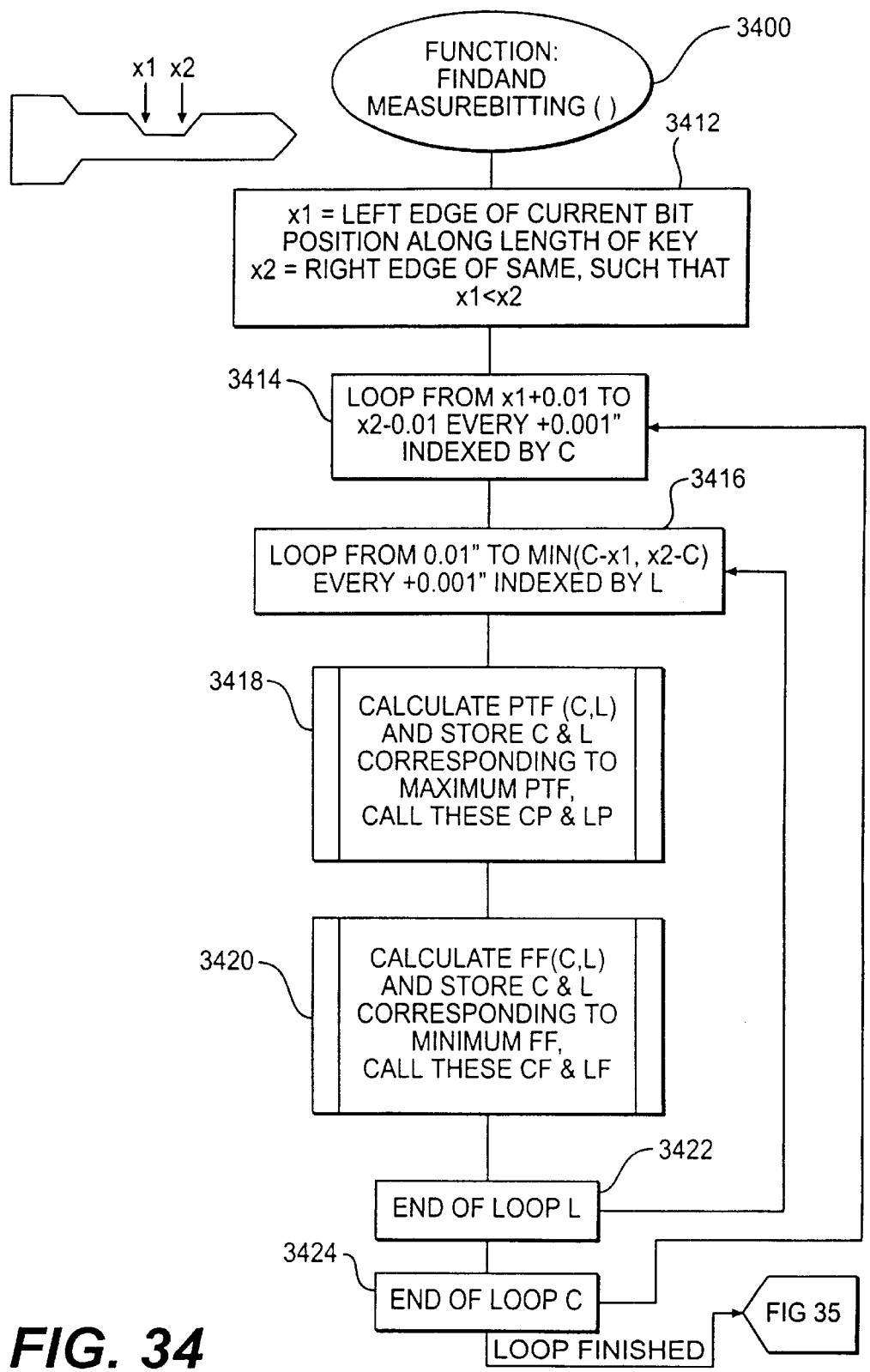
FIG. 34 is a flowchart of the FindAndMeasureBitting( ) function.
Figure 35:
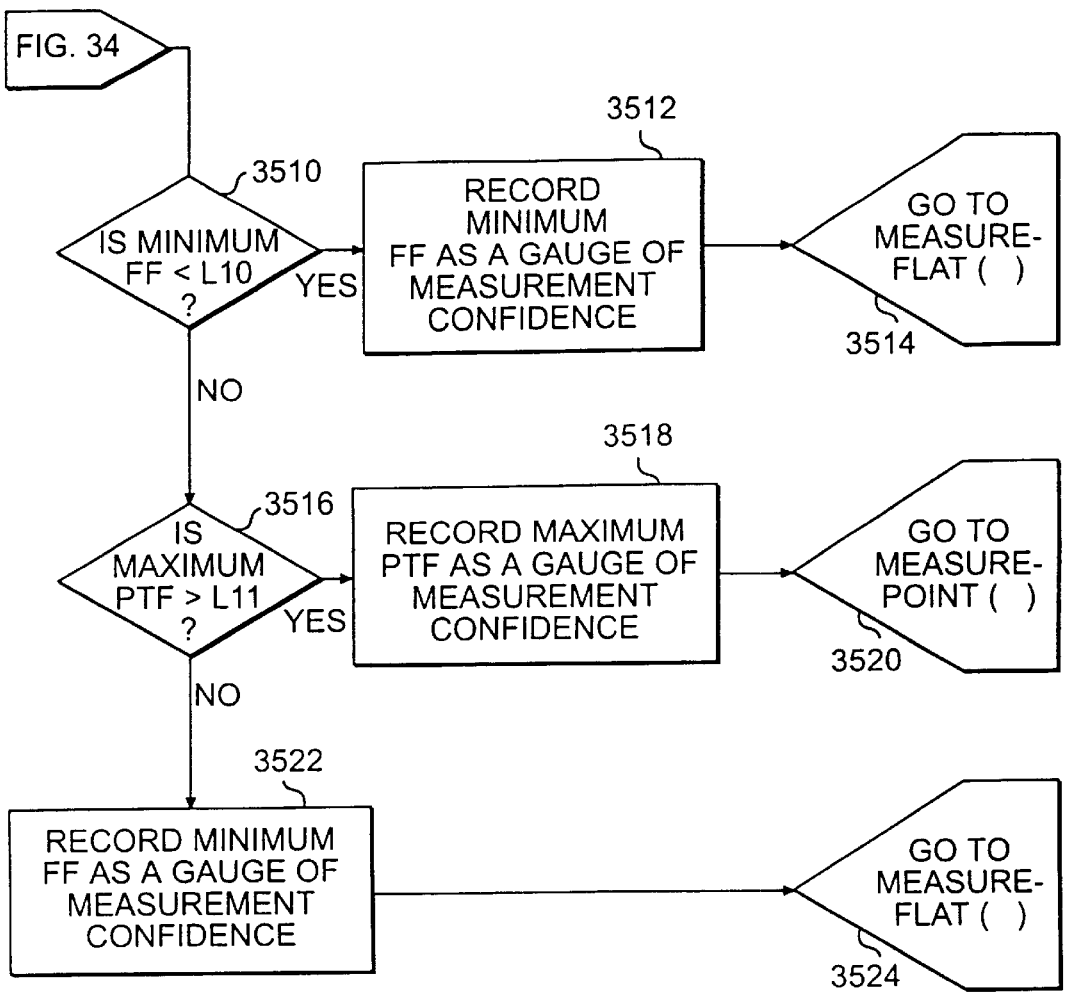
FIG. 35 is a continuation of the flowchart of the FindAndMeasureBitting( ) function.
Figure 36:
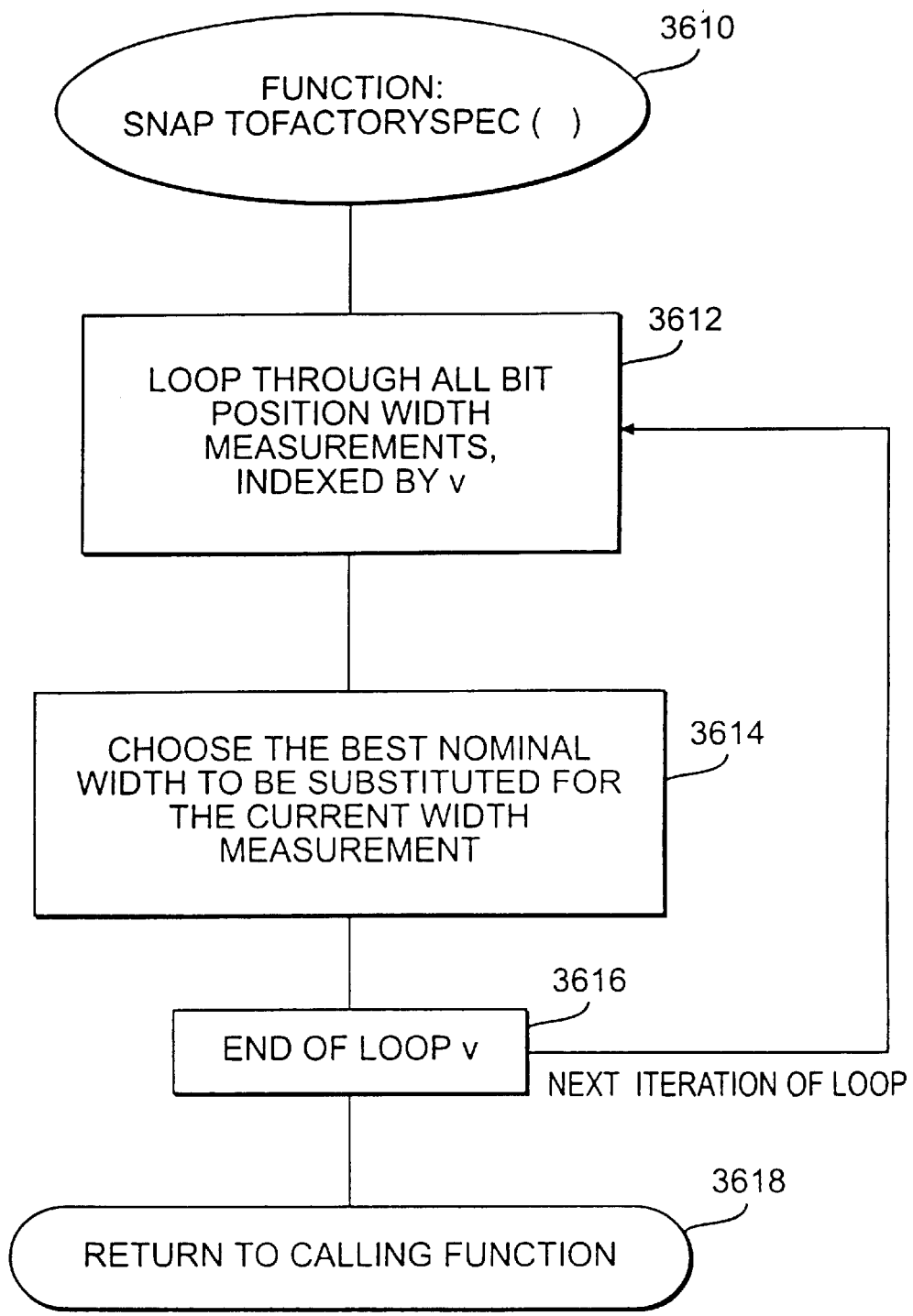
FIG. 36 is a flowchart of the SnapToFactorySpec( ) function.

Referencing FIG. 34, the function FindAndMeasureBitting( ) first sets x1 to the left edge of the current bit position along the length of the key and x2 to the right edge of the same such that x1<x2 at step 3412. The function then performs two nested loops indexed by C and L respectively. At step 3414 the function is looping through positions between x1 and x2. At step 3416, the function is looping through positions from 0.010" to the minimum of(C−x1, x2−C). For each set of C and L values, the PF( ) function calculates avalue that indicates how well the width profile from C−L to C+L matches a peak or valley. For each set of C and L values, the FF( ) function calculates a value that indicates the flatness of the width profile between C−L and C+L. C represents the center of the current segment being compared and the value L represents the length of the window on either side of the center. This is performed in steps 3418 and 3420. The maximum PTF and minimum FF values are stored in CP and LP and CF and LF, respectively in steps 3418 and 3420. The function continues on FIG. 35 and at step 3510, if the minimum FF value is less than a constant, L10, then FF is recorded as a measurement of confidence that the bitting has a flat area. If the FF is not less than L10 then if the maximum PTF is greater than L11 then the maximum PTF is recorded as a measurement of confidence that the bitting contains a peak or valley centered at C at step 3518. The default if neither of these conditions are satisfied is to record the FF as the gauge measurement of confidence at step 3522. After a measurement of confidence is recorded the function calls MeasurePoint( ) if the maximum PTF was recorded at step 3520 or MeasureFlat( ) at steps 3514 and 3524 otherwise. The maximum PTF and minimum FF are measures of confidence of the accuracy of the bitting width measurement.

Figure 37:
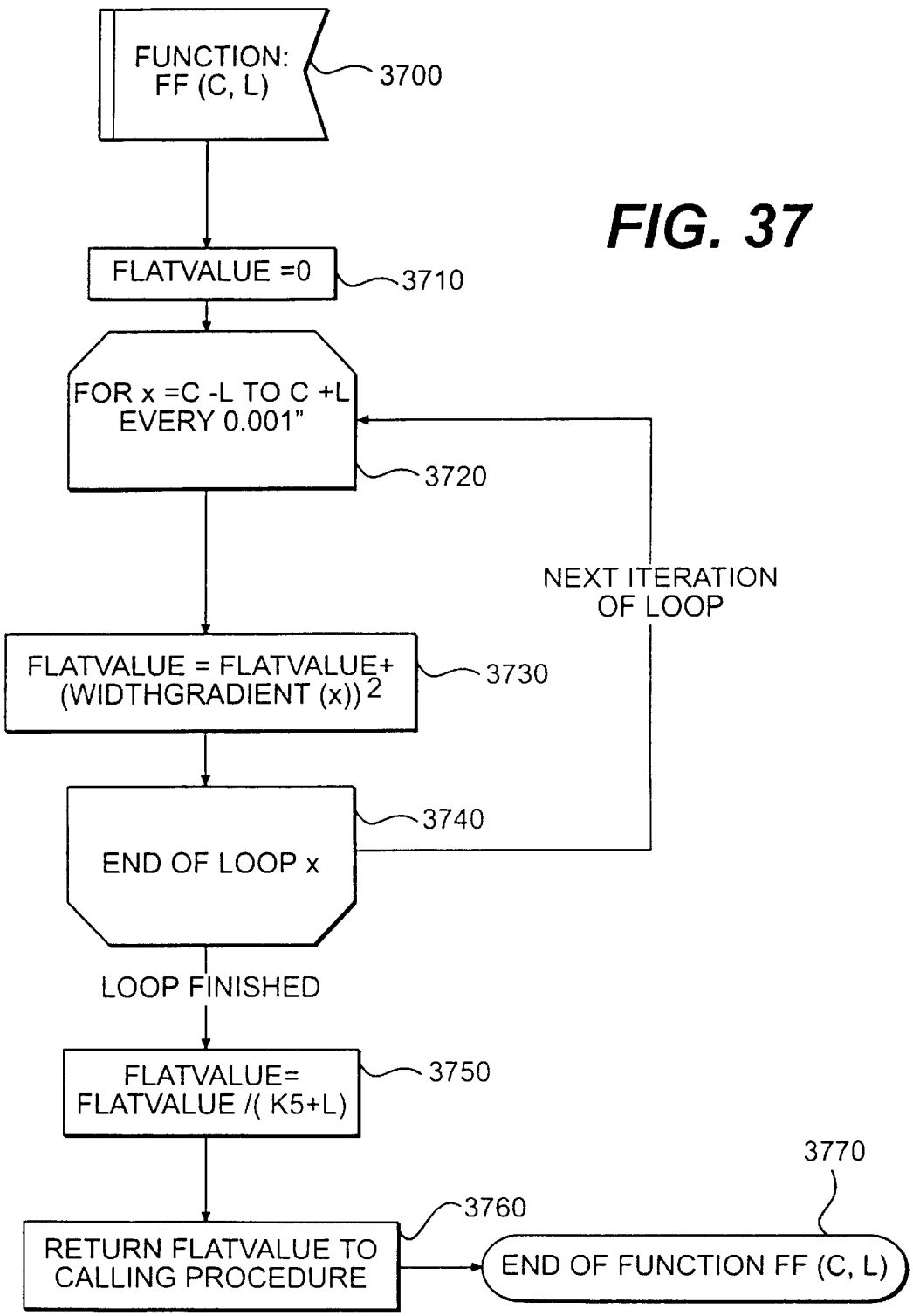
FIG. 37 is a flowchart of the FF( ) (Find Flat) function.

Referencing FIG. 37, the function FF( ) 3700 takes in as variables C and L from the calling function MeasureBitting( ). The function FF( ) sets the variable FlatValue to 0 in step 3710. At step 3720 it loops between C−L and C+L every 0.001". In the loop FlatValue is set to FlatValue+(WidthGradierit(x))$^2$ in step 3730. The loop ends at 3740. Then FlatValue is set to FlatValue/(K5+L) where K5 is a constant. FlatValue is returned to the calling procedure at step 3760 and the function FF ends at 3770. A flat region between C−L and C+L gives a small value for FlatValue (C, L), whereas a non-flat region gives a large value. Selecting C and L to minimize FlatValue, then, selects the flattest region for bitting measurement.

Figure 38:
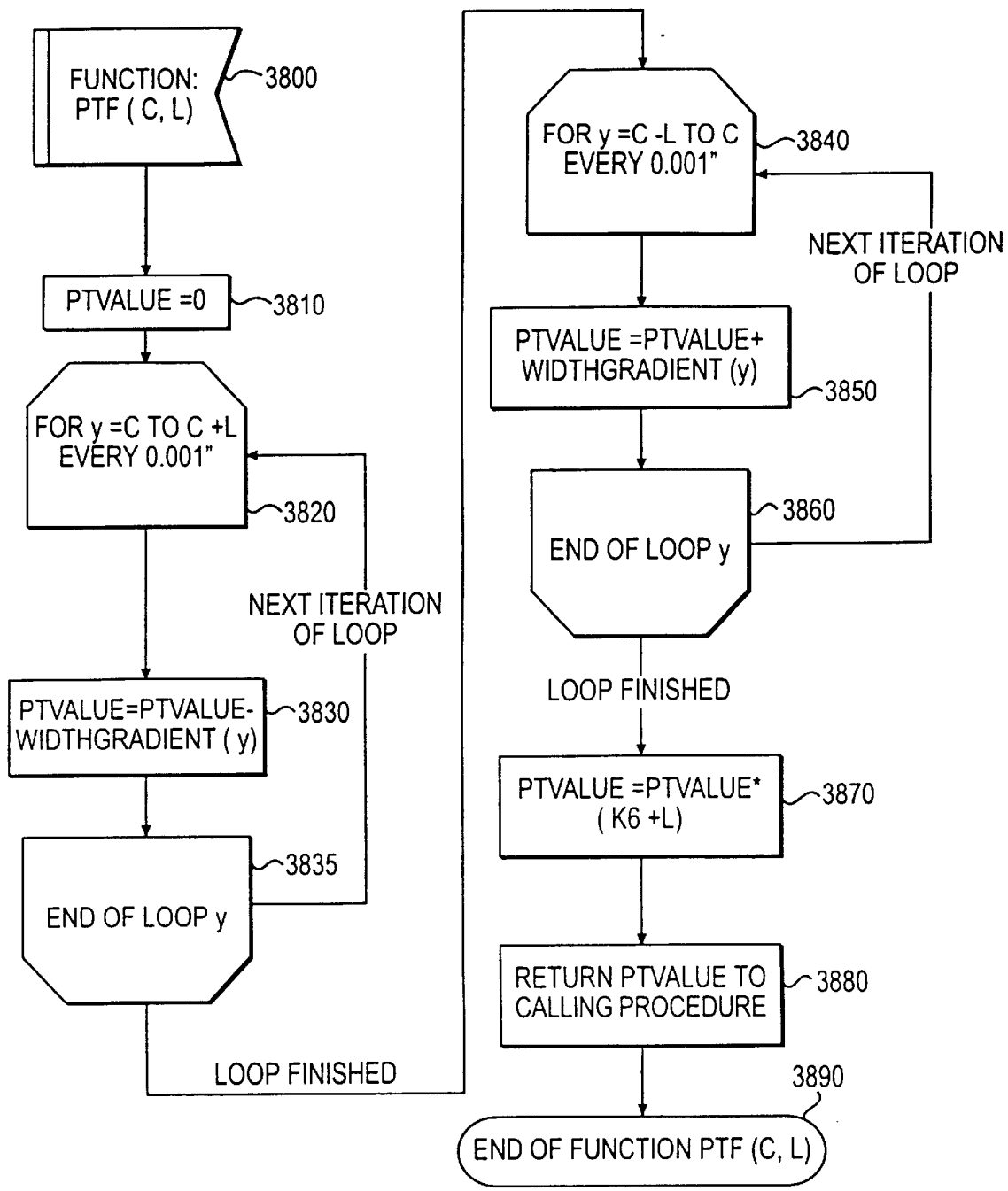
FIG. 38 is a flowchart of the PTF( ) (Find Peak) function.

Referencing FIG. 38, the function PTF( ) 3800 sets PTValue to 0 in step 3810. At step 3820 a for loop is started between C and C+L every 0.001" indexed by y. In this loop at step 3830 PTValue is set to PTValue−WidthGradient(y). The loop ends in step 3835. Another loop is started at step 3840 which loops between y equal to C−L to C every 0.001". At step 3850 the PTValue is set to PTValue+WidthGradient (y). The loop ends at step 3860. PTValue is set to PTValue * (K6+L) where K6 is a constant and PTValue is returned to the calling procedure at step 3880.

Figure 39:
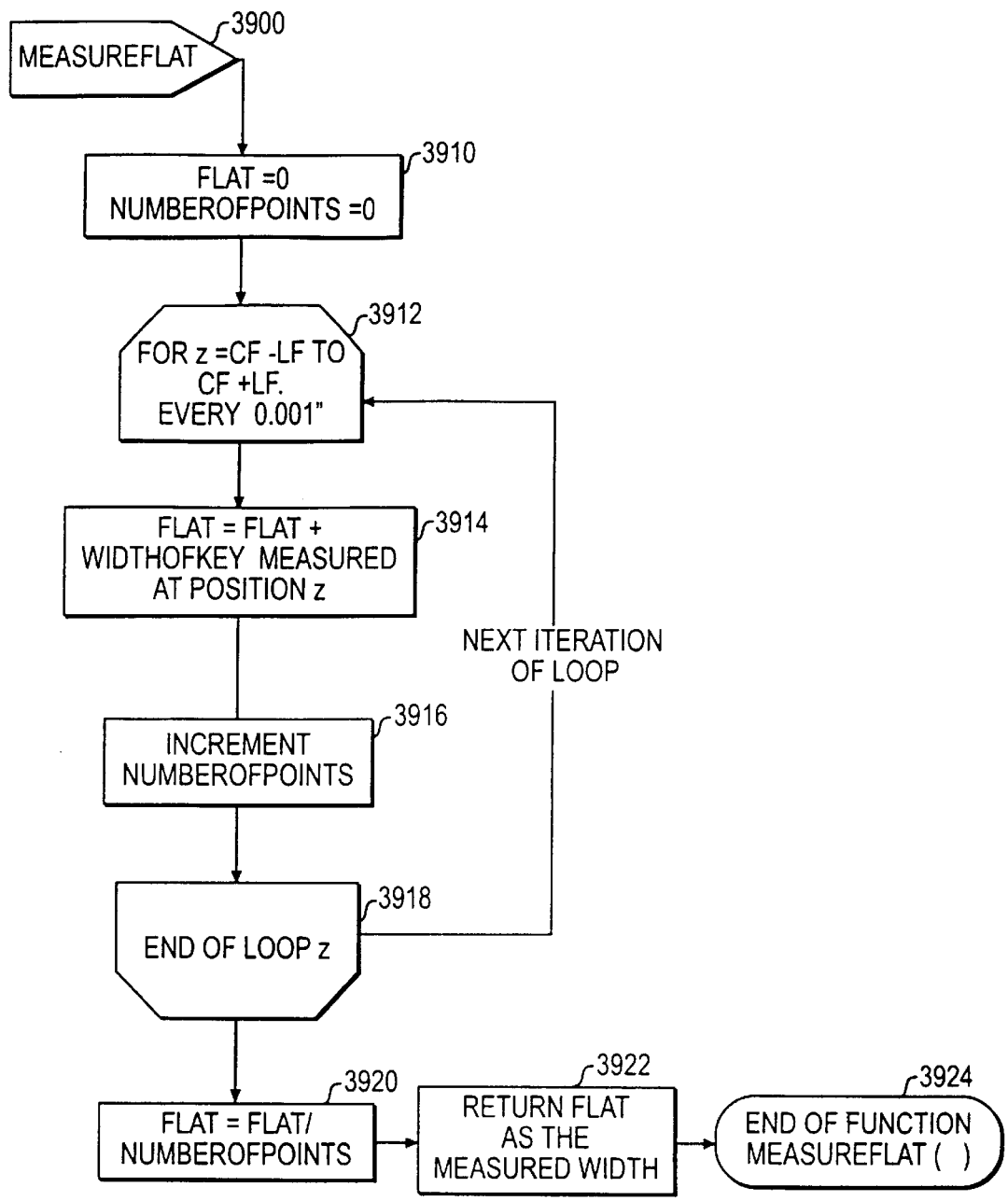
FIG. 39 is a flowchart of the MeasureFlat( ) function.

Referencing FIG. 39, the function MeasureFlat( )3900 at step 3910 sets Flat to 0 and NumberOfPoints to 0. A loop is started at step 3912 which loops between CF−LF and CF+LF every 0.001". Flat is set to Flat+WidthOfKey measured at position z in step 3914 and NumberofPoints is incremented in step 3916. The loop ends in step 3918. Flat is then set to Flat/NumberofPoints and Flat is returned as the measured width in step 3922.

Figure 40:
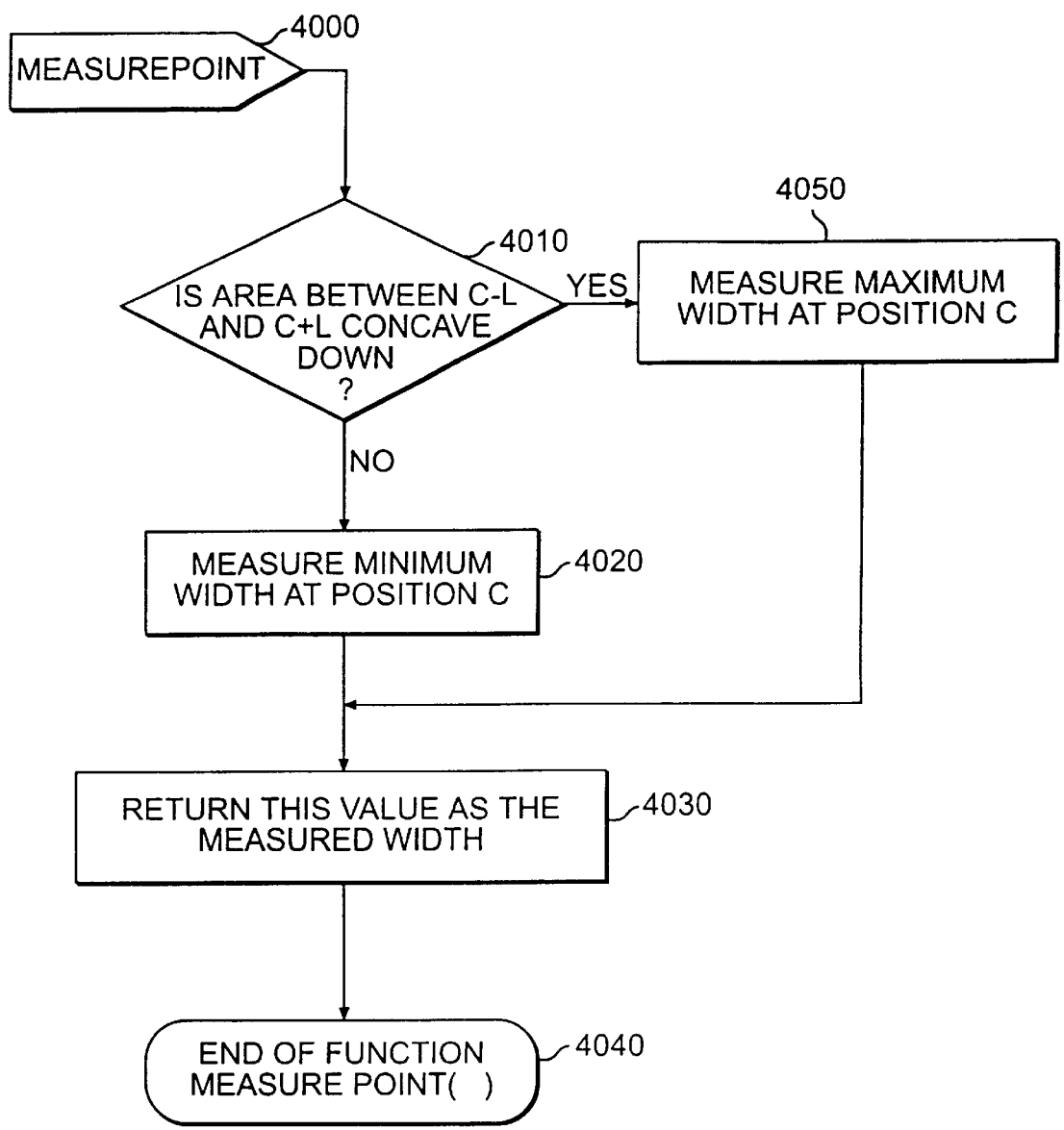
FIG. 40 is a flowchart of the MeasurePoint( ) function.

Referencing FIG. 40, the function MeasurePoint( ) at 4000 checks if the area between C−L and C+L is concave down at step 4010. If so then the maximum width of the peak at position C is measured at step 4050. If the area is not concave down, then the minimum width of the valley at position C is measured in step 4020. The measured value is returned as the measured width in step 4030.

The method of measurement for determining the bitting width depends on the type of key. For single sided keys, the width is measured as the actual width of the entire blade at the point to be measured. For double sided keys, the width is measured from the centerline of the key, as found in the surface measurement routines, out to the cut position on either edge of the blade.

The function SnapToFactorySpec( ) at 3610 loops through all bit position width measurements indexed by v at step 3612. The function then chooses the best nominal width from the manufacturer's specification to be substituted for the current width measurement at step 3614. If for example, the width measurement is 0.202 and the manufacturer's width specifications are 0.2, 0.3 and 0.4 then the function chooses 0.2 to replace 0.202.

In the case that bitting cannot be corrected to original factory nominal dimensions, the key will be duplicated instead of regenerated. For single sided keys, the width is measured every 0.01 inches along the length. For double sided keys, the cut widths on each edge are measured with respect to the centerline of the key every 0.01 inches along the length. These arrays of dimensions are passed to the cutting routines which exactly duplicate the cut pattern onto the blank.

```
[3300]  GetBitting( )
[3310]      Loop through all bit position from manufacturer's
                specifications
[3312]          FindAndMeasureBitting( )
[3316]          SnapToFactorySpec( )
[3318]      End Loop
[3320]  End of GetBitting( )
[3400]  FindAndMeasureBitting( )
[3412]      x1 = Left edge of current bit position along the length
                of the key;
[3412]      x2 = Right edge of current bit position along the
                length of the key;
[3414]      Loop from x1 + 0.01 to x2 − 0.01 every +0.001"
                index by C;
[3416]          Loop from 0.01" to min (C − x1, x2 − C) every
                    +0.001" index by L;
[3418]              Calculate PF(C, L);
[3418]              Store Maximum PF as CP and LP;
[3420]              Calculate FF(C, L);
[3420]              Store Minimum FF as CF and LF;
[3422]          End Loop L;
[3424]      End Loop C;
[3510]      if (Minimum FF < L10)
[3512]          Record Minimum FF;
[3514]          MeasureFlat( );
                else
[3516]          if (Maximum PTF > L11)
[3518]              Record Maximum PTF;
[3520]              MeasurePoint( );
                    else
[3522]              Record Minimum FF;
[3524]              MeasureFlat( );
        /* End FindAndMeasureBitting */
[3700]  FF(C, L)
[3710]      FlatValue = 0;
[3720]      for (x == C − L to C + L every 0.001")
[3730]          FlatValue = FlatValue + (WidthGradient(x))²;
[3740]      end for loop;
[3750]      FlatValue = FlatValue/(K5 + L);
```

-continued

```
[3760]      Return FlatValue;
[3770]  End function FF(C, L);
[3800]  PTF(C, L)
[3810]      PTValue = 0;
[3820]      for (y == C to C + L every 0.001")
[3830]          PTValue = PTValue - WidthGradient(y);
[3835]      end for loop;
[3840]      for (y == C - L to C every 0.001")
[3850]          PTValue = PTValue + WidthGradient(y);
[3860]      end for loop;
[3870]      PTValue = PTValue * (K6 + L);
[3880]      Return PTValue;
[3890]  End function PTF(C,L);
[3900]  MeasureFlat( )
[3910]      Flat = 0;
[3910]      NumberOfPoints = 0;
[3912]      for (z == CF - LF to CF + LF every 0.001")
[3914]          Flat = Flat + WidthOfKey measured at position z;
[3916]          increment NumberOfPoints;
[3918]      end for loop;
[3920]      Flat = Flat/NumberOfPoints;
[3922]      Return Flat as the measured width;
[3924]  End function MeasureFlat;
[4000]  MeasurePoint( )
[4010]      if (area between C - L and C + L concave down)
[4050]          Measure maximum width at position C;
[4020]      else
[4020]          Measure minimum width at position C;
[4030]      Return measured value as the measured width;
[4040]  End function MeasurePoint;
[3610]  SnapToFactorySpec( )
[3612]      Loop through all width measurements indexed by v;
[3614]          Choose the best nominal width to be substituted;
[3616]      End Loop;
[3618]  End SnapToFactorySpec( );
```

Figure 41:
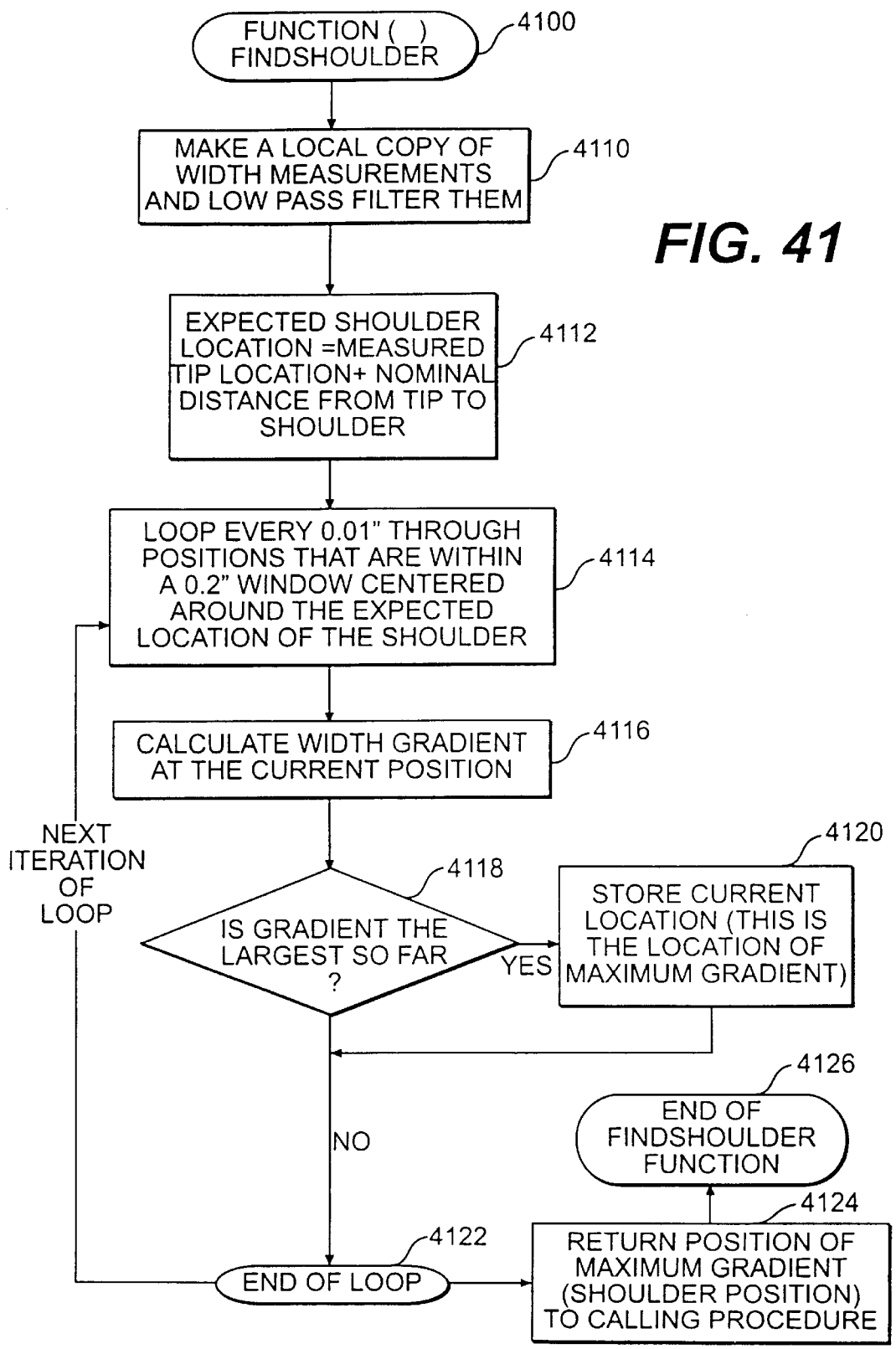
FIG. 41 is a flowchart of the FindShoulder( )function.

Referring to FIG. 41 and the pseudo code below, the function FindShoulder( ) locates the shoulder of the key.

```
[4100]  FindShoulder( )
[4110]      Local copy of width measurements is made;
[4110]      Low pass filter width measurements;
[4112]      Expected Shoulder Location = Tip Position +
             Nominal Tip to Shoulder Distance;
[4114]      Loop through widths that are within a 0.2" window
             centered
                around the Expected Shoulder Location;
[4116]          Calculate width gradient at the current position;
[4118]          if (gradient the largest so far)
[4120]              Store current location;
[4122]      End of loop
[4124]      Return position of maximum gradient;
[4126]  /* End FindShoulder( ) */
```

The function FindShoulder( ) first makes a copy of the width measurements of the master key and smooths out high frequency measurement noise by passing them through a low pass filter at step 4110. This function then obtains the expected shoulder location by adding the tip position, as measured by the function Profile( ), to the nominal distance from the tip to the shoulder (this data is obtained from the manufacturer's specifications stored in the fourth memory means 2340) at step 4112. The function then loops through positions on the key that are within a 0.2" window centered around the expected location of the shoulder at step 4114 and calculates width gradients for each position at step 4116. The largest gradient, which corresponds to the position of the shoulder, is stored at step 4120. Once the loop is finished at step 4122 the position of the maximum gradient is returned at step 4124 to the calling procedure.

Although the present invention has been described with reference to specific details of certain embodiments thereof, it is not intended that such details should be regarded as limitations upon the scope of the invention except as and to the extent that they are included in the accompanying claims.

What is claimed is:

1. A device for aligning a key in a key cutting system, the key having a longitudinal reference axis, a blade with opposed sides defining a blade width and a tip at one end of the blade, the device comprising:

a frame having an alignment axis;

two opposed alignment jaws, each alignment jaw independently and laterally movable in the frame along a first axis of movement relative to the alignment axis of the frame, the alignment jaws moveable between an engaged position, in which the alignment jaws are spaced apart from each other a desired separation distance so that each alignment jaw contacts at least a selected portion of a respective side of the key when the key is disposed therebetween, and a disengaged position, in which the alignment jaws are spaced apart from each other farther than the desired separation distance, and wherein when the alignment jaws are in the engaged position and the key is disposed therebetween, the longitudinal reference axis of the key is positioned substantially in parallel to the alignment axis of the frame;

a clamp having a first gripping jaw and a second gripping jaw, one of the first and second gripping jaws configured to move towards the other of the first and second gripping jaws along a second axis of movement that is substantially perpendicular to the first axis of movement and configured to engage the key after the alignment jaws have moved to the engaged position and to securely hold the key such that the opposed sides of the key are exposed for cutting when the alignment jaws return to the disengaged position;

a motor disposed on the frame and coupled to at least one of the alignment jaws;

a controller operable to energize the motor for a predetermined output based upon the width of the key blade, whereby the desired separation distance between the alignment jaws is obtained;

a rack fixedly attached to a portion of the at least one alignment jaw, the rack having a longitudinal axis, a lower side defining a plurality of gear teeth therein, and an opposite upper side; and a detector operable to sense when the at least one alignment jaw is at a home position, from which position the controller calculates the position of the at least one alignment jaw by energizing the motor for a desired time, wherein the detector comprises:

a switch disposed on the frame adjacent the rack and having a magnetic sensor that generates an electrical signal;

a magnet fixedly attached to a portion of the rack so that the magnet moves as the rack moves such that when at least a portion of the magnet moves in front of the magnetic sensor of the switch, the magnetic sensor generates the electrical signal; and means for communicating the electrical signal from the magnetic sensor of the switch to the controller, thereby signaling the controller that the at least one alignment jaw is disposed at the home position.

2. The device of claim 1, further comprising:

a support membet slidably engagable with the upper side of the rack; and a pinion mounted on the frame and having a periphery that defines a plurality of gear teeth therealong, wherein the gear teeth of the pinion matingly engage with the gear teeth of the rack, whereby when the controller energizes the motor, the motor rotates the pinion so that the rack is moved in a selected direction along the longitudinal axis of the rack as the gear teeth of the pinion intermesh with the gear teeth of the rack.

3. The device of claim 2, further comprising a preventing means for preventing lateral movement of the at least one alignment jaw when the motor is de-energized.

4. The device of claim 3, wherein the preventing means comprises:
a worm rotatable mounted on the frame and having an outer surface defining a circumscribing groove therein and a lower end coupled to a portion of the motor so that the motor is operable to rotate the worm;
a gear rotatable mounted on the frame and having an edge defining a plurality of gear teeth therein, each of the gear teeth of a size to be complementarily received in the groove of the worm so that rotation of the worm causes a rotation of the gear as the gear teeth of the gear interface with the groove of the worm; and
means for movably coupling the gear to the pinion so that rotation of the gear causes a corresponding rotation of the pinion.

5. The device of claim 4, wherein the controller comprises a computer subsystem that directs predetermined amount of electrical energy to the motor for a desired time so that the motor rotates the worm a desired number of rotations in a selected direction.

6. The device of claim 3, wherein the motor comprises an electric linear actuator having a rotational output when energized and wherein the preventing means comprises:
a rod having a longitudinal axis, a first end and a second end, in which the first end is fixedly attached to the at least one alignment jaw, and wherein a portion of the rod intermediate the first and second ends is threaded; and
means for movably coupling the threaded portion of the rod to the motor so that when the motor is energized, the rod rotates and moves longitudinally.

7. The device of claim 6, wherein the controller comprises a computer subsystem that directs a predetermined amount of electrical energy to the linear actuator motor for a desired time so that the linear actuator motor rotates the rod a desired number of rotations in a selected direction.

8. A device for aligning a key in a key cutting system, the key having a longitudinal reference axis, a blade with opposed sides defining a blade width and a tip at one end of the blade, the device comprising:
a frame having an alignment axis;
two opposed alignment jaws, each alignment jaw independently and laterally movable in the frame along a first axis of movement relative to the alignment axis of the frame, the alignment jaws moveable between an engaged position, in which the alignment jaws are spaced apart from each other a desired separation distance so that each alignment jaw contacts at least a selected portion of a respective side of the key when the key is disposed therebetween, and a disengaged position, in which the alignment jaws are spaced apart from each other farther than the desired separation distance, and wherein when the alignment jaws are in the engaged position and the key is disposed therebetween, the longitudinal reference axis of the key is positioned substantially in parallel to the alignment axis of the frame;
a clamp having a first gripping jaw and a second gripping jaw, one of the first and second gripping jaws configured to move towards the other of the first and second gripping jaws along a second axis of movement that is substantially perpendicular to the first axis of movement and configured to engage the key after the alignment jaws have moved to the engaged position and to securely hold the key such that the opposed sides of the key are exposed for cutting when the alignment jaws return to the disengaged position;
a motor disposed on the frame and coupled to at least one of the alignment jaws via a pinion;
a controller operable to energize the motor for a predetermined output based upon the blade width of the key, whereby the desired separation distance between the alignment jaws is obtained;
a worm rotatably mounted on the frame and having an outer surface defining a circumscribing groove therein and a lower end coupled to a portion of the motor so that the motor is operable to rotate the worm;
a gear rotatably mounted on the frame and having an edge defining a plurality of gear teeth therein, each of the gear teeth of a size to be complementarily received in the groove of the worm so that rotation of the worm causes a rotation of the gear as the gear teeth of the gear interface with the groove of the worm; and
means for movably coupling the gear to the pinion so that rotation of the gear causes a corresponding rotation of the pinion.

9. The device of claim 8, further comprising a detector operable to sense when the at least one alignment jaw is at a home position, from which position the controller calculates the position of the at least one alignment jaw by energizing the motor for a desired time.

10. The device of claim 9, wherein the at least one alignment jaw includes a rack and wherein the detector comprises:
a photo switch disposed on the frame adjacent the rack and having an optical sensor that generates an electrical signal;
a photo-switch plate fixedly attached to a portion of the rack so that the photo-switch plate moves as the rack moves such that when at least a portion of the photo-switch plate moves in front of the optical sensor of the photo switch, the optical sensor generates the electrical signal; and
means for communicating the electrical signal from the optical sensor of the photo switch to the controller, thereby signaling the controller that the at least one alignment jaw is disposed at the home position.

11. A device for aligning a key in a key cutting device, the key having a longitudinal reference axis, a blade with opposed sides defining a blade width and a tip at one end of the blade defining a blade length, the device comprising:
a frame having an alignment axis;
two opposed alignment jaws, each alignment jaw independently and laterally movable in the frame relative to the alignment axis of the frame, the alignment jaws moveable between an engaged position, in which the alignment jaws are spaced apart from each other a desired separation distance so that each alignment jaw contacts at least a selected portion of a respective side of the key when the key is disposed therebetween, and a disengaged position, in which the alignment jaws are spaced apart from each other farther than the desired separation distance, and wherein when the alignment jaws are in the engaged position and the key is disposed therebetween, the longitudinal reference axis of the key is positioned substantially in parallel to the alignment axis of the frame;

a motor disposed on the frame and coupled to at least one of the alignment jaws;

a controller operable to energize the motor for a predetermined output based upon the blade width of the key, whereby the desired separation distance between the alignment jaws is obtained; and a tip alignment mechanism movable along the alignment axis of the frame between an operable position, in which the tip alignment mechanism contacts the tip of the key when the key is disposed between the alignment jaws, and an inoperable position, in which the tip alignment mechanism is spaced apart from the tip of the key when the key is disposed between the alignment jaws, the tip alignment mechanism including a tip alignment mechanism motor coupled to the tip alignment mechanism, the controller operable to energize the tip alignment mechanism motor for a predetermined output based upon the blade length of the key.

12. The device of claim 11, wherein the tip alignment mechanism further includes:

a tip alignment mechanism rack fixedly attached to a portion of the tip alignment mechanism, the tip alignment mechanism rack having a lower side defining a plurality of gear teeth therein and an opposite upper side;

a tip alignment mechanism support member slidably engagable with the upper side of the tip alignment mechanism rack; and a tip alignment mechanism pinion rotatably mounted on the frame and having a periphery that defines a plurality of gear teeth therein, wherein the gear teeth of the tip alignment mechanism pinion matingly engage with the gear teeth of the tip alignment mechanism pinion so that the tip alignment mechanism rack moves along the alignment axis as the gear teeth of the tip alignment mechanism pinion intermesh with the gear teeth of the tip alignment mechanism rack.

13. The device of claim 12, further comprising a detector for sensing when the tip alignment mechanism is at a tip alignment mechanism home position, from which position the controller calculates the position of the tip alignment mechanism by energizing the tip alignment mechanism motor.

14. A method of aligning a key in a key cutting device, the key having a blade having a width and a tip at one end of the blade, comprising the steps of:

moving at least one of two opposed alignment jaws in the device to a home position in a frame, the at least one alignment jaw moving laterally relative to an alignment axis in the frame;

detecting when the at least one alignment jaw is in the home position;

moving the at least one alignment jaw toward the other alignment jaw and away from the home position so that the at least one alignment jaw reaches a predetermined position in which the two alignment jaws are spaced apart from each other a desired separation distance based on the dimension of the key;

monitoring the position of the at least one alignment jaw by calculating the distance that the at least one alignment jaw moves relative to the home position so that the at least one alignment jaw moves to a predetermined position;

moving a tip alignment mechanism along the alignment axis of the frame between a tip alignment mechanism home position and a predetermined position in which the tip of the key contacts a portion of the tip alignment mechanism when the key is positioned between the two alignment jaws;

determining when the tip alignment mechanism is at the tip alignment mechanism home position; and monitoring the position of the tip alignment mechanism relative to the tip alignment mechanism home position by calculating an amount of distance that the tip alignment mechanism moves relative to the tip alignment mechanism home position.

* * * * *

UNITED STATES PATENT AND TRADEMARK OFFICE
CERTIFICATE OF CORRECTION

PATENT NO.   : 6,588,995 B2
DATED        : July 8, 2003
INVENTOR(S)  : Wills et al.

It is certified that error appears in the above-identified patent and that said Letters Patent is hereby corrected as shown below:

<u>Title page,</u>
Item [57], ABSTRACT,
Line 10, "patten" should read -- pattern --.

<u>Column 43,</u>
Lines 14 and 18, "rotatable" should read -- rotatably --.

<u>Column 45,</u>
Line 41, "mechanism pinion" should read -- mechanism rack, whereby the tip alignment mechanism motor rotates the tip alignment mechanism pinion --.

Signed and Sealed this

Twenty-first Day of October, 2003

JAMES E. ROGAN
*Director of the United States Patent and Trademark Office*